US009246345B2

(12) United States Patent
Ukai et al.

(10) Patent No.: US 9,246,345 B2
(45) Date of Patent: Jan. 26, 2016

(54) POWER SUPPLY SYSTEM, CONTROLLER OF POWER SUPPLY SYSTEM, METHOD OF OPERATING POWER SUPPLY SYSTEM, AND METHOD OF CONTROLLING POWER SUPPLY SYSTEM

(75) Inventors: Kunihiro Ukai, Nara (JP); Hiroaki Kaneko, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 476 days.

(21) Appl. No.: 13/695,753

(22) PCT Filed: Jul. 28, 2011

(86) PCT No.: PCT/JP2011/004266
§ 371 (c)(1),
(2), (4) Date: Nov. 1, 2012

(87) PCT Pub. No.: WO2012/014474
PCT Pub. Date: Feb. 2, 2012

(65) Prior Publication Data
US 2013/0127249 A1    May 23, 2013

(30) Foreign Application Priority Data

Jul. 28, 2010 (JP) .................................. 2010-169076

(51) Int. Cl.
*H02J 7/00* (2006.01)
*H02J 3/32* (2006.01)
*H02J 3/46* (2006.01)

(52) U.S. Cl.
CPC .............. *H02J 7/0063* (2013.01); *H02J 3/32* (2013.01); *H02J 3/46* (2013.01); *Y10T 307/527* (2015.04)

(58) Field of Classification Search
CPC ......... H02J 7/0063; H02J 7/0024; H02J 3/38; H02J 3/46; H02J 7/00; A61N 1/36032; A61N 1/378; H04R 25/606
USPC .......................................................... 307/48
See application file for complete search history.

(56) References Cited

U.S. PATENT DOCUMENTS 5,666,006 A * 9/1997 Townsley et al. ............... 307/66
2002/0113441 A1 * 8/2002 Obayashi .................. H02J 1/14
290/40 C (Continued)

FOREIGN PATENT DOCUMENTS

CN    101741306 A    6/2010
EP    1638184 A2    3/2006

(Continued)

OTHER PUBLICATIONS

Chinese Office Action issued in Chinese Application No. 201180022516.0 dated Jul. 2, 2014, w/English translation.

(Continued)

*Primary Examiner* — Thienvu Tran
*Assistant Examiner* — Brian K Baxter
(74) *Attorney, Agent, or Firm* — McDermott Will & Emery LLP

(57) ABSTRACT

A power supply system of the present invention includes: a power generation system (101); a power storage unit (107) configured to supply electric power to the power generation system (101) and an external electric power load (105); and a controller (110) configured to, in a case where it is predicted that at least one of the sum of activation electric power of the power generation system (101) and power consumption of the external electric power load (105) when activating the power generation system (101) and the sum of stop electric power of the power generation system (101) and the power consumption of the external electric power load (105) when stopping the power generation of the power generation system (101) exceeds the upper limit electric power receivable from an electric power system (104), supply the electric power of the power storage unit (107) to at least one of the power generation system (101) and the external electric power load (105) such that the electric power amount supplied from the electric power system (104) does not exceed the upper limit electric power.

22 Claims, 43 Drawing Sheets

(56) References Cited

U.S. PATENT DOCUMENTS

| | | | |
|---|---|---|---|
| 2004/0217652 A1 | 11/2004 | Bitoh | |
| 2007/0227499 A1* | 10/2007 | Asada | H02P 9/30 123/339.18 |
| 2008/0007227 A1 | 1/2008 | Noda | |
| 2008/0054847 A1* | 3/2008 | Elias et al. | 320/130 |
| 2008/0197804 A1* | 8/2008 | Onishi et al. | 320/108 |
| 2009/0026841 A1 | 1/2009 | Nakanishi | |
| 2009/0094469 A1* | 4/2009 | Kitamrua | 713/320 |
| 2009/0164393 A1* | 6/2009 | Takano | G06Q 50/06 705/412 |
| 2009/0164823 A1* | 6/2009 | Aaltonen et al. | 713/340 |
| 2009/0224603 A1* | 9/2009 | Perper et al. | 307/43 |
| 2009/0267567 A1* | 10/2009 | Chou | 320/134 |
| 2009/0315403 A1* | 12/2009 | Ichikawa | B60L 3/0046 307/82 |
| 2010/0001585 A1* | 1/2010 | Nagata | H02J 3/14 307/24 |
| 2010/0023174 A1* | 1/2010 | Nagata | H02J 3/32 700/287 |
| 2010/0026244 A1* | 2/2010 | Iida et al. | 320/134 |
| 2010/0056228 A1* | 3/2010 | Brown et al. | 455/572 |
| 2010/0072953 A1* | 3/2010 | Mitsutani | B60L 11/1816 320/152 |
| 2010/0096927 A1* | 4/2010 | Miyauchi | H01M 8/00 307/64 |
| 2010/0264875 A1* | 10/2010 | Hoffman et al. | 320/111 |
| 2011/0006736 A1* | 1/2011 | Robinson et al. | 320/134 |
| 2011/0089905 A1* | 4/2011 | Yano | B60K 6/46 320/132 |
| 2011/0160019 A1* | 6/2011 | Harada | B60K 6/445 477/7 |
| 2011/0279096 A1* | 11/2011 | Sonntag | 320/166 |
| 2012/0092897 A1* | 4/2012 | Hara et al. | 363/16 |
| 2012/0139477 A1* | 6/2012 | Oglesbee et al. | 320/107 |
| 2013/0043844 A1* | 2/2013 | Tashiro | B60L 15/2045 320/128 |

FOREIGN PATENT DOCUMENTS

| | | |
|---|---|---|
| EP | 1667261 A1 | 6/2006 |
| EP | 1933442 A2 | 6/2008 |
| JP | 2002-034162 A | 1/2002 |
| JP | 2004-180469 A | 6/2004 |
| JP | 2006-019169 A | 1/2006 |

OTHER PUBLICATIONS

European Extended Search Report issued in corresponding European Application No. 11812076.5, dated Dec. 11, 2013.
International Search Report issued in International Patent Application No. PCT/JP2011/004266 dated Nov. 1, 2011.

* cited by examiner

A

A

A

A

B

A

A

B

POWER SUPPLY SYSTEM, CONTROLLER OF POWER SUPPLY SYSTEM, METHOD OF OPERATING POWER SUPPLY SYSTEM, AND METHOD OF CONTROLLING POWER SUPPLY SYSTEM

RELATED APPLICATIONS

This application is the U.S. National Phase under 35 U.S.C. §371 of International Application No. PCT/JP2011/004266 filed on Jul. 28, 2011, which in turn claims the benefit of Japanese Application No. 2010-169076, filed on Jul. 28, 2010, the disclosures of which Applications are incorporated by reference herein.

TECHNICAL FIELD

The present invention relates to a power supply system including a power generation system and a storage battery configured to supply electric power to the power generation system and an external electric power load, a method of operating the power supply system, and a method of controlling the power supply system.

BACKGROUND ART

Conventionally, in a power generation system, such as a fuel cell or a gas engine, if the sum of activation electric power necessary to activate the power generation system and power consumption of an external electric power load of the power generation system exceeds contract electric power, a breaker trips, and the power generation system is forced to stop its activation. In order to prevent the breaker from tripping when activating the power generation system, a power generation system is proposed, which does not execute the activation if the sum of the activation electric power of the power generation system and the power consumption of the external electric power load exceeds the contract electric power (see PTL 1, for example).

CITATION LIST

Patent Literature

PTL 1: Japanese Laid-Open Patent Application Publication No. 2006-019169

SUMMARY OF INVENTION

Technical Problem

However, a first problem is that in the power generation system disclosed in PTL 1, the power generation system cannot be activated if the power consumption of the external electric power load is continuously large, such as if the sum may exceed the upper limit (for example, the contract electric power) of the electric power supplied from an electric power system by the activation of the power generation system.

A second problem is that in the above conventional power generation system, even if it is determined before the activation of the power generation system that the sum will not exceed the upper limit electric power supplied from the electric power system, and the activation of the power generation system is started, the power consumption of the external electric power load subsequently increases and exceeds the upper limit electric power, and the activation of the power generation system is stopped.

The same problem as when activating the power generation system occurs when stopping the power generation of the power generation system.

A third problem is that for example, the electric power cannot be obtained from the power generation system when the power generation of the power generation system is stopped, and therefore, if the power generation of the power generation system is stopped when the power consumption of the external electric power load is large, the sum may exceed the upper limit (for example, the contract electric power) of the electric power supplied from the electric power system.

A fourth problem is that even if it is determined before the power generation stop of the power generation system that the sum will not exceed the upper limit electric power supplied from the electric power system, and the power generation of the power generation system is stopped, the power consumption of the external electric power load subsequently increases and exceeds the upper limit electric power, and a processing operation executed after the power generation stop of the power generation system is stopped.

The present invention provides a power supply system and a power supply system controller, each of which solves at least one of the first to fourth conventional problems and in each of which at least one of an activation performance and a stop performance improves more than before.

Solution to Problem

To solve the conventional problems, a power supply system according to the present invention includes: a power generation system; a power storage unit configured to supply electric power to the power generation system and an external electric power load; and a controller configured to execute at least one of a first control operation in which in a case where it is predicted that a sum of activation electric power of the power generation system and power consumption of the external electric power load exceeds upper limit electric power receivable from an electric power system when activating the power generation system, the electric power of the power storage unit is supplied to at least one of the power generation system and the external electric power load such that the electric power supplied from the electric power system does not exceed the upper limit electric power and a second control operation in which in a case where it is predicted that a sum of stop electric power of the power generation system and the power consumption of the external electric power load exceeds the upper limit electric power receivable from the electric power system when stopping power generation of the power generation system, the electric power of the power storage unit is supplied to at least one of the power generation system and the external electric power load such that the electric power supplied from the electric power system does not exceed the upper limit electric power.

With this, the sum is prevented from exceeding the upper limit electric power receivable from the electric power system while improving at least one of the activation performance and stop performance of the power generation system more than those of the conventional power generation systems.

A controller of a power supply system according to the present invention is a controller of a power supply system, the power supply system including a power generation system, an external electric power load, and a power storage unit configured to supply electric power to the power generation system and the external electric power load, wherein the controller of the power supply system is configured to execute at least one of a first control operation in which in a case where it is predicted that a sum of activation electric power of the power generation system and power consumption of the external electric power load exceeds upper limit electric power receivable from an electric power system when activating the power generation system, electric power of the power storage unit is supplied to at least one of the power generation system and the external electric power load such that the electric power supplied from the electric power system does not exceed the upper limit electric power and a second control operation in which in a case where it is predicted that a sum of stop electric power of the power generation system and the power consumption of the external electric power load exceeds the upper limit electric power receivable from the electric power system when stopping power generation of the power generation system, the electric power of the power storage unit is supplied to at least one of the power generation system and the external electric power load such that the electric power supplied from the electric power system does not exceed the upper limit electric power.

With this, the sum is prevented from exceeding the upper limit electric power receivable from the electric power system while improving at least one of the activation performance and stop performance of the power generation system more than those of the conventional power generation systems.

A method of operating a power supply system according to the present invention executes at least one of a first control operation comprising the steps of: predicting whether or not a sum of activation electric power of a power generation system and power consumption of an external electric power load exceeds upper limit electric power receivable from an electric power system when activating the power generation system; and when it is predicted that the sum exceeds the upper limit electric power, supplying electric power of a power storage unit to at least one of the power generation system and the external electric power load such that the electric power supplied from the electric power system does not exceed the upper limit electric power and a second control operation comprising the steps of: predicting whether or not a sum of stop electric power of the power generation system and the power consumption of the external electric power load exceeds the upper limit electric power receivable from the electric power system when stopping power generation of the power generation system; and when it is predicted that the sum exceeds the upper limit electric power, supplying the electric power of the power storage unit to at least one of the power generation system and the external electric power load such that the electric power supplied from the electric power system does not exceed the upper limit electric power.

With this, the sum is prevented from exceeding the upper limit electric power receivable from the electric power system while improving at least one of the activation performance and stop performance of the power generation system more than those of the conventional power generation systems.

A method of controlling a power supply system according to the present invention executes at least one of a first control operation comprising the steps of: predicting whether or not a sum of activation electric power of a power generation system and power consumption of an external electric power load exceeds upper limit electric power receivable from an electric power system when activating the power generation system; and when it is predicted that the sum exceeds the upper limit electric power, supplying electric power of a power storage unit to at least one of the power generation system and the external electric power load such that the electric power supplied from the electric power system does not exceed the upper limit electric power and a second control operation comprising the steps of: predicting whether or not a sum of stop electric power of the power generation system and the power consumption of the external electric power load exceeds the upper limit electric power receivable from the electric power system when stopping power generation of the power generation system; and when it is predicted that the sum exceeds the upper limit electric power, supplying the electric power of the power storage unit to at least one of the power generation system and the external electric power load such that the electric power supplied from the electric power system does not exceed the upper limit electric power.

With this, the sum is prevented from exceeding the upper limit electric power receivable from the electric power system while improving at least one of the activation performance and stop performance of the power generation system more than those of the conventional power generation systems.

The above object, other objects, features and advantages of the present invention will be made clear by the following detailed explanation of preferred embodiments with reference to the attached drawings.

Advantageous Effects of Invention

According to the power supply system of the present invention, the controller of the power supply system, the method of operating the power supply system, and the controller of the power supply system, the above-described sum is prevented from exceeding the upper limit electric power receivable from the electric power system while improving at least one of the activation performance and stop performance of the power generation system more than those of the conventional power generation systems.

DESCRIPTION OF EMBODIMENTS

Figure 1:
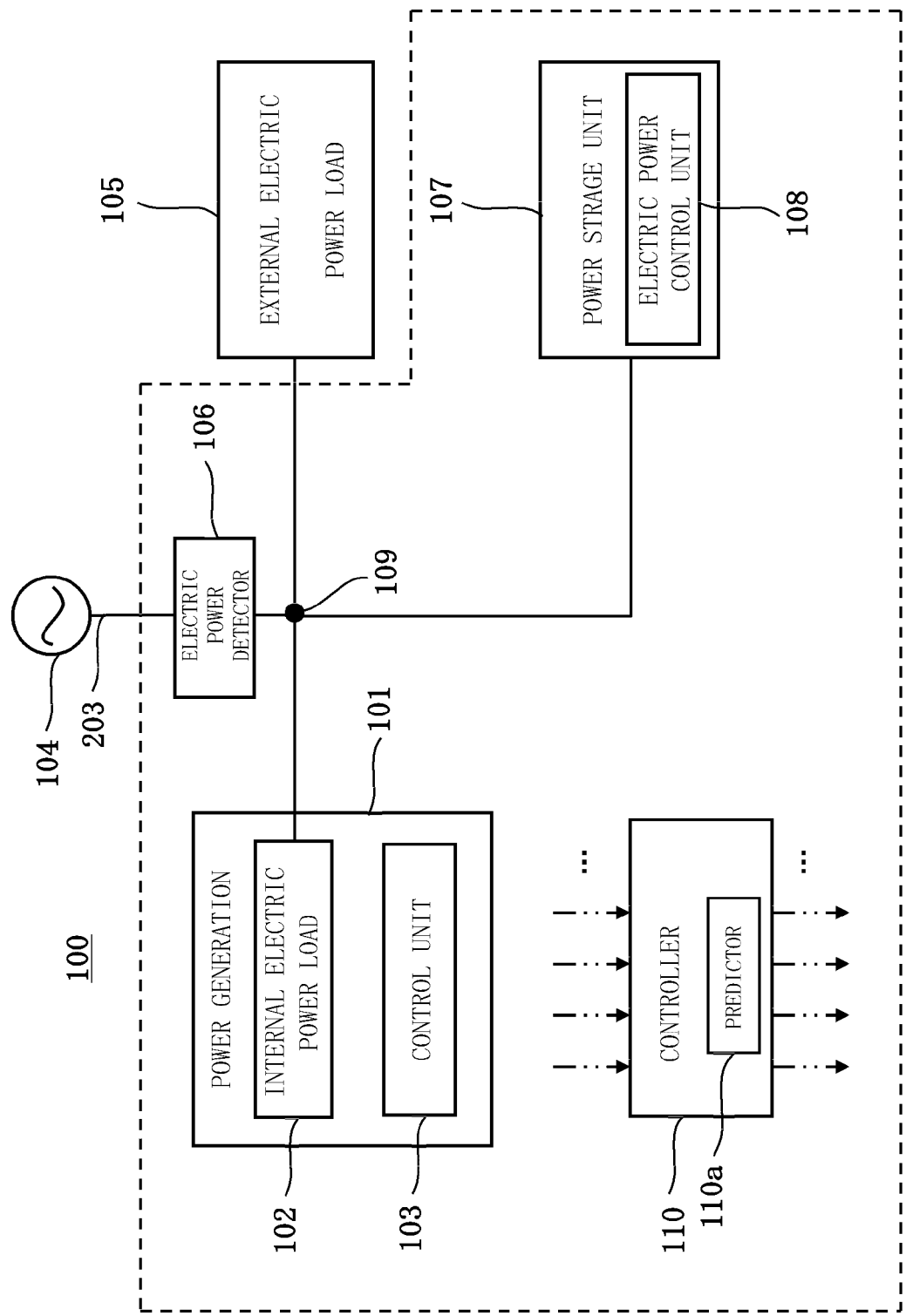
FIG. 1 is one example of a block diagram schematically showing the schematic configurations of a power supply system according to Embodiment 1 and a controller of the power supply system.

Hereinafter, embodiments of the present invention will be specifically explained in reference to the drawings. In the drawings, the same reference signs are used for the same or corresponding components, and a repetition of the same explanation is avoided. Moreover, in the drawings, components necessary to explain the present invention are shown, and the other components may not be shown. Further, the present invention is not limited to the embodiments below.

Embodiment 1

A power supply system according to Embodiment 1 includes: a power generation system; a power storage unit configured to supply electric power to the power generation system and an external electric power load; and a controller (a controller of the power supply system), and the controller is configured to execute at least one of a first control operation in which in a case where it is predicted that a sum of activation electric power of the power generation system and power consumption of the external electric power load exceeds upper limit electric power receivable from an electric power system when activating the power generation system, the electric power of the power storage unit is supplied to at least one of the power generation system and the external electric power load such that the electric power supplied from the electric power system does not exceed the upper limit electric power and a second control operation in which in a case where it is predicted that a sum of stop electric power of the power generation system and the power consumption of the external electric power load exceeds the upper limit electric power receivable from the electric power system when stopping power generation of the power generation system, the electric power of the power storage unit is supplied to at least one of the power generation system and the external electric power load such that the electric power supplied from the electric power system does not exceed the upper limit electric power.

With this, the above sum is prevented from exceeding the upper limit electric power receivable from the electric power system while improving at least one of the activation performance and stop performance of the power generation system more than those of conventional power supply systems.

Here, the expression "when activating the power generation system" denotes at least one of "when the power generation system is about to be activated" and "when an activation operation of the power generation system is being executed". The following will mainly explain "when the power generation system is about to be activated".

Moreover, the expression "when stopping power generation of the power generation system" denotes at least one of "when the power generation of the power generation system is about to stop" and "when a processing operation executed after the power generation stop of the power generation system is being executed". The following will mainly explain "when the power generation system is about to stop".

Configuration of Power Supply System

FIG. 1 is one example of a block diagram schematically showing the schematic configurations of a power supply system according to Embodiment 1 and a controller of the power supply system.

As shown in FIG. 1, a power supply system 100 according to Embodiment 1 includes a power generation system 101, a power storage unit 107, and a controller (a controller of the power supply system) 110. The controller 110 operates such that in a case where it is predicted that the sum of the activation electric power of the power generation system 101 and the power consumption of an external electric power load 105 exceeds the upper limit electric power receivable from an electric power system 104 when activating the power generation system 101, the electric power of the power storage unit 107 is supplied to at least one of the power generation system 101 and the external electric power load 105 such that the electric power supplied from the electric power system 104 does not exceed the upper limit electric power.

Here, the upper limit electric power receivable from the electric power system 104 may be contract electric power that is maximum electric power usable based on the contract with an electric power company or electric power that is set based on the contract of a breaker which trips when exceeding this set electric power.

The power generation system 101 includes an internal electric power load 102 that is a device configured to operate the power generation system 101 and a control unit 103 configured to control the power generation system 101. The power generation system 101 may have any configuration as long as it is configured to generate electric power and supply the generated electric power to the external electric power load 105. Examples of the power generation system 101 include a gas turbine and a fuel cell system. Any type of fuel cell may be used as a fuel cell of the fuel cell system. Examples of the fuel cell include a polymer electrolyte fuel cell, a solid-oxide fuel cell, and a phosphoric-acid fuel cell. In a case where the power generation system 101 is a fuel cell system, the internal electric power load 102 is, for example, an electric heater configured to increase the temperature inside the fuel cell.

The control unit 103 may have any configuration as long as it is a device configured to control respective devices constituting the power generation system 101. Examples of the control unit 103 include a microprocessor and a CPU. The control unit 103 may include not only a calculation processing portion, such as a microprocessor or a CPU, but also a storage portion, such as a memory, and a timer portion.

The power storage unit 107 includes an electric power control unit 108 configured to control output electric power output from the power storage unit 107. The power storage unit 107 may have any configuration as long as it is configured to supply the electric power to the power generation system 101 and the external electric power load 105. Examples of the power storage unit 107 include secondary batteries, such as a lead battery, a lithium battery, and a nickel-hydrogen battery. As the secondary battery, an assembled battery in which a plurality of cells are connected in series may be used, or a battery in which a plurality of cells and/or assembled batteries are connected in parallel may be used.

In order to prevent the above sum from exceeding the upper limit electric power receivable from the electric power system 104 in the middle of the activation operation of the power generation system 101, it is preferable that a power storage amount of the power storage unit 107 be equal to or larger than the power consumption of the internal electric power load 102 in the activation operation of the power generation system 101. Regarding the power storage amount, the larger, the better.

The electric power control unit 108 may have any configuration as long as it is a device configured to control the output electric power output from the power storage unit 107. The electric power control unit 108 may be constituted by, for example, a DC/AC converter.

The power storage unit 107 includes an electric power detector (not shown) configured to detect the output electric power (discharge electric power) of the power storage unit 107. The controller 110 is configured to obtain the output electric power of the power storage unit 107 detected by the electric power detector (not shown).

The electric power system 104 is connected to the power generation system 101 and the power storage unit 107 through a wire 203 at an interconnection point 109. An electric power detector 106 is provided on an electric path (the wire 203) located on the electric power system 104 side of the interconnection point 109. The electric power detector 106 detects a current value supplied to at least one of the external electric power load 105 and the internal electric power load 102 of the power generation system 101. The controller 110 is configured to obtain the current value detected by the electric power detector 106. One example of the external electric power load 105 is a home-use electrical apparatus.

The controller 110 includes a calculating portion, a storage portion, a communication portion, and a clock portion (all not shown). The calculating portion is constituted by a CPU or a microprocessor, and the storage portion is constituted by a semiconductor memory. A predictor 110a is realized by predetermined software stored in the storage portion. The predictor 110a predicts whether or not the sum of the activation electric power of the power generation system 101 and the power consumption of the external electric power load 105 exceeds the upper limit electric power receivable from the electric power system 104 when activating the power generation system (in the present embodiment, when the power generation system is about to be activated).

The controller 110 may have any configuration as long as it is configured to control respective devices constituting the power supply system 100. As shown in FIG. 1, the controller 110 may be provided outside the power generation system 101 and the power storage unit 107. Moreover, the controller 110 may be incorporated in the power generation system 101 or the power storage unit 107. Further, the controller 110 may be divided and incorporated in the power generation system 101 and the power storage unit 107.

Operations of Power Supply System

Figure 2A:
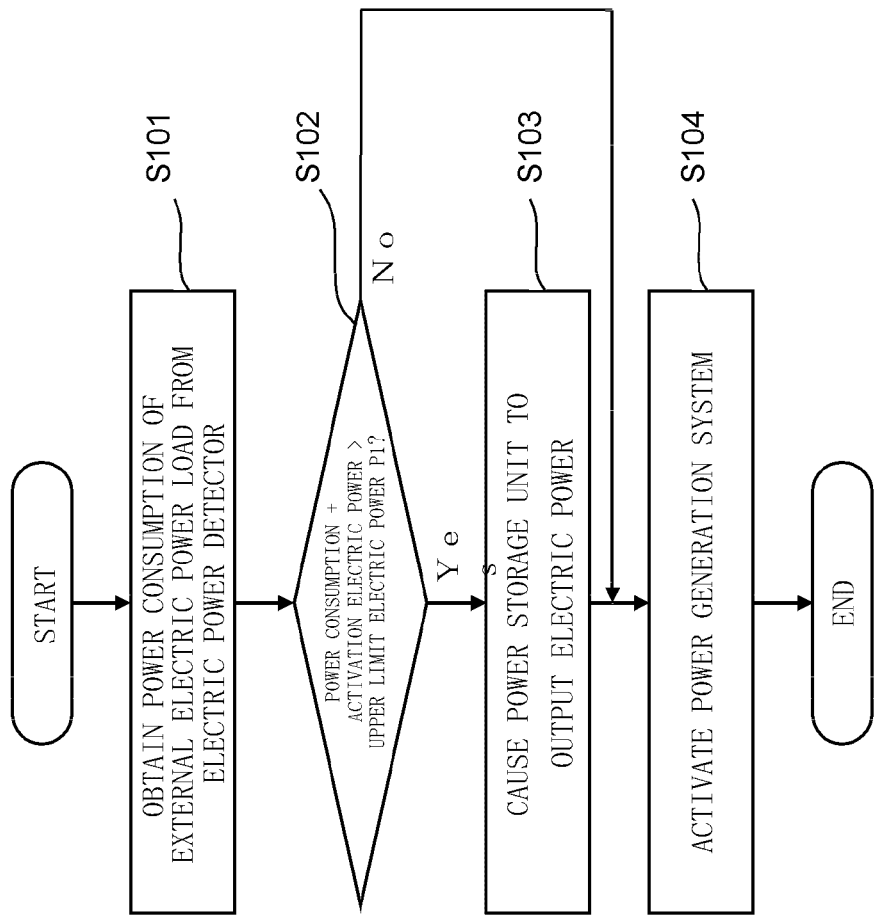
FIG. 2A is one example of a flow chart schematically showing an activation operation of a power generation system of the power supply system according to Embodiment 1.

FIG. 2A is one example of a flow chart schematically showing the operation (the first control operation) executed when activating the power generation system of the power supply system according to Embodiment 1.

First, the power generation system 101 is not yet activated, and the electric power is being supplied from the electric power system 104 to the external electric power load 105. Then, when the power generation system 101 is about to be activated, the controller 110 obtains from the electric power detector 106 the electric power (power consumption) consumed by the external electric power load 105 (Step S101).

Here, the expression "when the power generation system 101 is about to be activated" denotes at least one of "when an activation request of the power generation system 101 is generated" and "when an activation schedule of the power generation system 101 is coming up". Moreover, the expression "when the activation request is generated" denotes "when a preset activation start time of the power generation system 101 has come", "when a user operates a remote controller to instruct an activation start of the power generation system 101", or the like. Further, the expression "when the activation schedule is coming up" denotes "when the preset activation start time of the power generation system 101 is getting closer", or the like.

In Embodiment 1, a predetermined time (for example, one minute) before the operation start time, the electric power detector 106 detects the power consumption of the external electric power load 105, and the controller 110 (the predictor 110a) predicts whether or not the sum of the activation electric power of the power generation system 101 and the power consumption of the external electric power load 105 exceeds the upper limit electric power receivable from the electric power system 104. The above predetermined time is set as a time at which the power consumption of the external electric power load 105 when the activation is started is predictable. The prediction by the controller 110 (the predictor 110a) regarding whether or not the sum of the activation electric power of the power generation system 101 and the power consumption of the external electric power load 105 exceeds the upper limit electric power receivable from the electric power system 104 may be executed based, for example, on a past use history and may be executed in any manner as long as the prediction can be executed.

Next, the controller 110 determines whether or not the sum of the power consumption of the external electric power load 105 obtained in Step S101 and the activation electric power of the power generation system 101 exceeds consumable upper limit electric power P1 supplied from the electric power system 104 (Step S102). When the sum of the power consumption and the activation electric power exceeds the upper limit electric power P1 (Yes in Step S102), the controller 110 proceeds to Step S103. When the above sum is equal to or lower than the upper limit electric power P1 (No in Step S102), the controller 110 proceeds to Step S104.

Here, the "activation electric power" denotes electric power necessary to activate the power generation system 101. Specifically, the "activation electric power" denotes the power consumption of the internal electric power load 102 in the activation operation of the power generation system 101, and the value thereof is suitably set. The activation electric power may be, for example, maximum power consumption of the internal electric power load 102 during the activation of the power generation system 101 or the power consumption of the internal electric power load 102 which operates at the initial stage of the activation. The upper limit electric power P1 may be, for example, contract electric power that is maximum electric power usable based on the contract with an electric power company or electric power which is set based on the contract of a breaker and by which the breaker trips.

In Step S103, the controller 110 causes the electric power control unit 108 to output the electric power from the power storage unit 107. With this, the power storage unit 107 supplies the electric power by the electric power control unit 108 to the external electric power load 105 and the activated power generation system 101 (specifically, the internal electric power load 102). At this time, the electric power control unit 108 controls the output electric power of the power storage unit 107 such that the electric power obtained by subtracting the electric power supplied to at least one of the external electric power load 105 and the power generation system 101 from the sum of the power consumption of the external electric power load 105 and the activation electric power of the power generation system 101 (to be specific, power consumption+activation electric power−supplied electric power) becomes equal to or lower than the upper limit electric power P1. In the control of the power storage unit 107, the electric power control unit 108 may cause the power storage unit 107 to supply the electric power to at least the external electric power load 105.

Next, the controller 110 proceeds to Step S104 and outputs an activation permission signal (activation command signal) of the power generation system 101 to the control unit 103. With this, the control unit 103 starts the activation of the power generation system 101.

As above, in the power supply system 100 according to Embodiment 1 and the controller 110 of the power supply system 100, the activation of the power generation system 101 can be started even in a case where the power consumption of the external electric power load 105 is large and it is predicted that when activating the power generation system 101, the above sum exceeds the upper limit electric power P1 supplied from the electric power system 104. With this, in the power supply system 100 according to Embodiment 1 and the controller 110 of the power supply system 100, the activation performance improves more than those of the conventional power generation systems.

The power supply system 100 according to Embodiment 1 may be configured such that the supply of the electric power from the electric power system 104 is stopped when the power consumption of the external electric power load 105 exceeds the upper limit electric power P1 as described above. In this configuration, for example, a breaker trips to stop the supply of the electric power. Moreover, the power supply system 100 according to Embodiment 1 may be configured such that even if the power consumption of the external electric power load 105 increases, the supply of the electric power from the electric power system 104 continues so as not to exceed the upper limit electric power P1. In this configuration, for example, even if the power consumption of the external electric power load 105 exceeds the upper limit electric power P1, the supply of the electric power from the electric power system 104 continues so as not to exceed the upper limit electric power P1.

Next, one example of the operation (the second control operation) executed when stopping the power generation of the power supply system 100 according to Embodiment 1 will be explained.

Figure 2B:
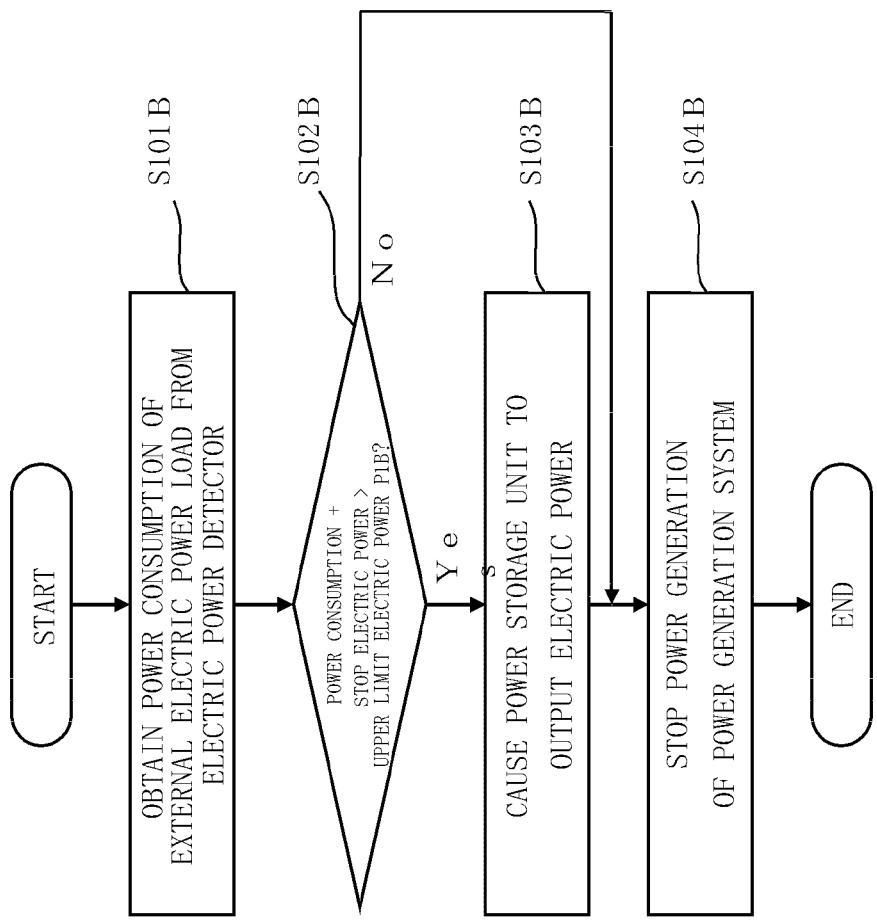
FIG. 2B is one example of a flow chart schematically showing an operation executed when stopping power generation of the power generation system of the power supply system according to Embodiment 1.

FIG. 2B is one example of a flow chart schematically showing the operation executed when stopping the power generation of the power generation system of the power supply system according to Embodiment 1.

First, the power generation system 101 is executing a power generating operation and is not executing the power generation stop. Then, when the power generation of the power generation system is about to stop, the controller 110 obtains from the electric power detector 106 the electric power (power consumption) consumed by the external electric power load 105 (Step S101B).

Here, the expression "when the power generation of the power generation system 101 is about to stop" denotes at least one of "when a stop request of the power generation system is generated" and "when a power generation stop schedule of the power generation system is coming up". Moreover, the expression "when the stop request of the power generation system is generated" denotes "when a preset power generation stop start time of the power generation system has come", "when a user operates a remote controller to instruct a power generation stop of the power generation system 101", or the like. Further, the expression "when the power generation stop schedule is coming up" denotes "when the preset power generation stop start time of the power generation system is getting closer", or the like.

Next, the controller 110 determines (to be specific, predicts) whether or not the sum of the power consumption of the external electric power load 105 obtained in Step S101B and the stop electric power of the power generation system 101 exceeds consumable upper limit electric power P1B supplied from the electric power system 104 (Step S102B). When the sum of the power consumption and the activation electric power exceeds the upper limit electric power P1B (Yes in Step S102B), the controller 110 proceeds to Step S103B. When the above sum is equal to or lower than the upper limit electric power P1B (No in Step S102B), the controller 110 proceeds to Step S104B.

Here, the "stop electric power" denotes electric power necessary for the processing operation executed after the power generation stop of the power generation system 101. Specifically, the "stop electric power" denotes the power consumption of the internal electric power load 102 configured to operate in the processing operation executed after the power generation stop of the power generation system 101, and the value thereof is suitably set. The stop electric power may be, for example, maximum power consumption of the internal electric power load 102 in the processing operation executed after the power generation stop of the power generation system 101. As the processing operation executed after the power generation stop of the power generation system 101, a known processing operation executed after the power generation stop of the power generation system 101 can be adopted arbitrarily.

In Step S103B, the controller 110 causes the electric power control unit 108 to output the electric power from the power storage unit 107. With this, the power storage unit 107 supplies the electric power to the external electric power load 105 and the power generation system 101 (specifically, the internal electric power load 102) by the electric power control unit 108.

At this time, the electric power control unit 108 controls the output electric power of the power storage unit 107 such that the electric power obtained by subtracting the electric power supplied to the external electric power load 105 and the power generation system 101 from the sum of the power consumption of the external electric power load 105 and the stop electric power of the power generation system 101 (to be specific, power consumption+stop electric power−supplied electric power) becomes equal to or lower than the upper limit electric power P1B. In the control of the power storage unit 107, the electric power control unit 108 may cause the power storage unit 107 to supply the electric power to at least the external electric power load 105.

Next, the controller 110 proceeds to Step S104B and outputs to the control unit 103 a signal (power generation stop command signal) for permitting the power generation stop of the power generation system 101. With this, the control unit 103 starts the power generation stop of the power generation system 101. Specifically, the supply of the electric power from the power generation system 101 to the external electric power load 105 is stopped, and the power generation system 101 stops the power generation. Then, an operation stop (processing operation executed after the power generation stop of the power generation system 101) of each device constituting the power generation system 101 is executed.

As above, in the power supply system 100 according to Embodiment 1 and the controller 110 of the power supply system 100, the power generation stop of the power generation system 101 can be started even in a case where the power consumption of the external electric power load 105 is large and it is predicted that when stopping the operation of the power generation system 101, the above sum exceeds the upper limit electric power P1B supplied from the electric power system 104.

The power supply system 100 according to Embodiment 1 may be configured such that the supply of the electric power from the electric power system 104 is stopped when the power consumption of the external electric power load 105 exceeds the upper limit electric power P1B as described above. In this configuration, for example, a breaker trips to stop the supply of the electric power. Moreover, the power supply system 100 according to Embodiment 1 may be configured such that even if the power consumption of the external electric power load 105 increases, the supply of the electric power from the electric power system 104 continues so as not to exceed the upper limit electric power P1B. In this configuration, for example, even if the power consumption of the external electric power load 105 exceeds the upper limit electric power P1B, the supply of the electric power from the electric power system 104 continues so as not to exceed the upper limit electric power P1B.

The foregoing has explained the control operations of the power storage unit 107 executed by the controller 110 of the power supply system 100 when activating the power generation system 101 and stopping the power generation of the power generation system 101. However, the power supply system 100 of Embodiment 1 may be configured such that the controller 119 executes at least one of these control operations (the first control operation and the second control operation). To be specific, the controller 110 may be configured to execute only one of the first control operation and the second control operation or may be configured to execute both the first control operation and the second control operation.

Modification Example 1

The power supply system of Modification Example 1 is one example in which the power generation system is a fuel cell system.

Figure 3:
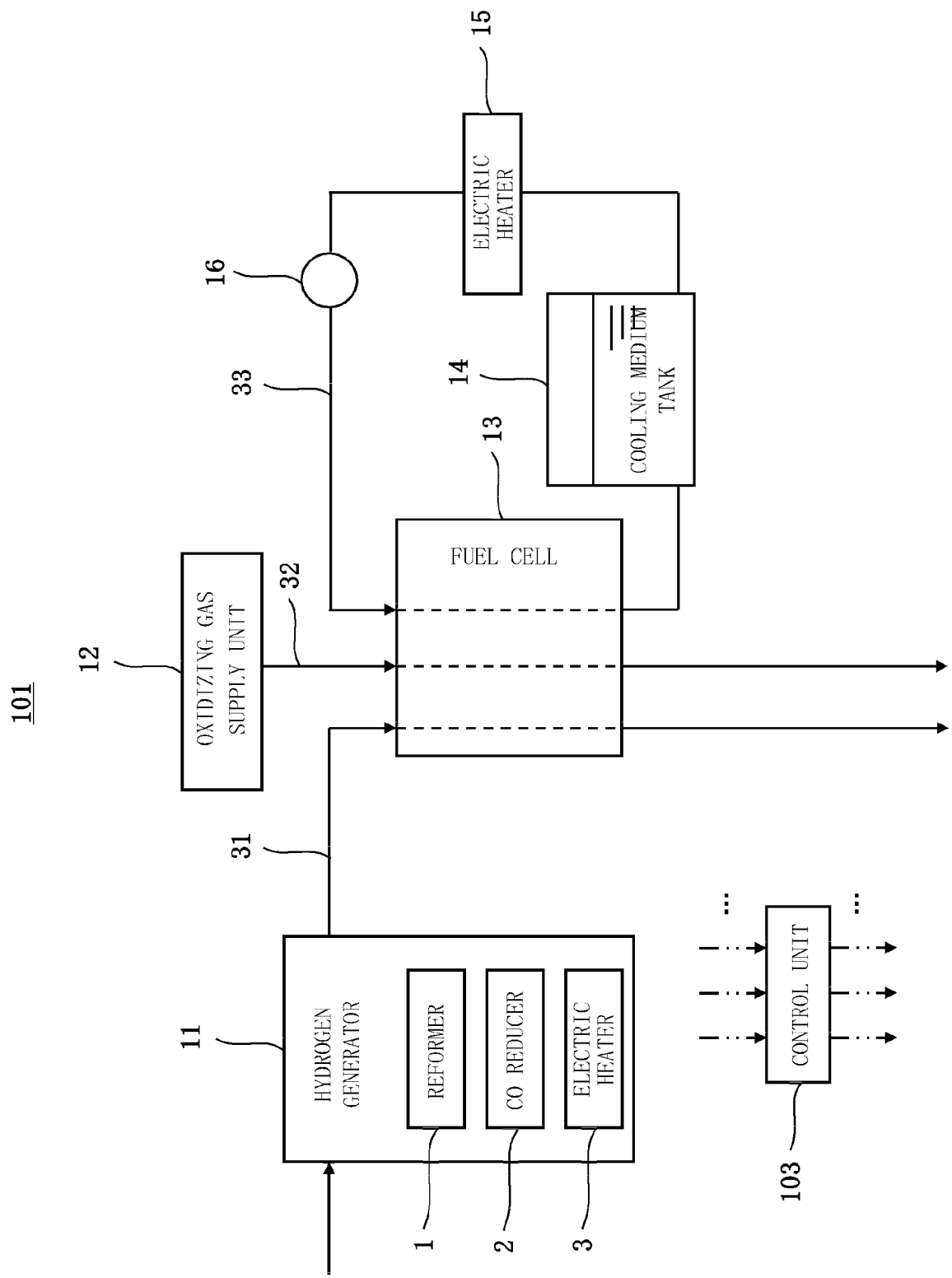
FIG. 3A is one example of a block diagram schematically showing the schematic configuration of the power generation system of Modification Example 1 in the power supply system according to Embodiment 1.
FIG. 3B is one example of a block diagram schematically showing the schematic configuration of the power generation system of Modification Example 2 in the power supply system according to Embodiment 1.

FIG. 3A is one example of a block diagram schematically showing the schematic configuration of the power generation system of Modification Example in the power supply system according to Embodiment 1.

As shown in FIG. 3A, the power generation system 101 of Modification Example 1 is a fuel cell system and includes as the internal electric power load an electric heater configured to increase the temperatures of devices constituting the fuel cell system when activating the fuel cell system. Specifically, the power generation system (the fuel cell system) 101 of Modification Example 1 includes a hydrogen generator 11, an oxidizing gas supply unit 12, a fuel cell 13, a cooling medium tank 14, an electric heater 15, a cooling medium delivery unit 16, and a control unit 103.

The hydrogen generator 11 includes a reformer 1, a CO reducer 2, and an electric heater 3 and is configured to generate a hydrogen-rich fuel gas and supply the generated fuel gas to the fuel cell 13. The reformer 1 includes a reforming catalyst and causes a reforming reaction between a raw material and water to generate a hydrogen-containing gas. Any raw material may be used as long as the hydrogen-containing gas can be generated by the reforming reaction using the raw material and the steam. A material containing an organic compound containing at least carbon and hydrogen as constituent elements may be used as the raw material. Examples of the raw material include hydrocarbons, such as ethane and propane, and alcohol-based raw materials, such as methanol.

The CO reducer 2 is configured to reduce carbon monoxide contained in the hydrogen-containing gas generated by the reformer 1. Examples of the CO reducer 2 include a shift converter configured to reduce the carbon monoxide by a shift reaction and a CO remover configured to reduce the carbon monoxide by an oxidation reaction and a methanation reaction. The electric heater 3 is configured to increase the temperature of, for example, the CO reducer 2 when activating the fuel cell system. The electric heater 3 may be configured to increase not only the temperature of the CO reducer 2 but also the temperature of the reformer 1 or may be configured to increase only the temperature of the reformer 1.

Then, the hydrogen-containing gas whose carbon monoxide is reduced by the CO reducer 2 is supplied as the fuel gas through a fuel gas supply passage 31 to an anode of the fuel cell 13. In the present modification example, the carbon monoxide contained in the hydrogen-containing gas generated by the reformer 1 is reduced by the CO reducer 2, and the hydrogen-containing gas is supplied to the fuel cell 13. However, the present modification example is not limited to this, and the CO reducer 2 may not be included. In this case, the electric heater 3 may be configured to increase the temperature of the reformer 1 or may not be provided.

The fuel cell system 101 includes an oxidizing gas supply passage 32 through which an oxidizing gas flows and the oxidizing gas supply unit 12 configured to supply the oxidizing gas. Examples of the oxidizing gas supply unit 12 include fans, such as a blower and a sirocco fan. The oxidizing gas (for example, air) is supplied from the oxidizing gas supply unit 12 to a cathode of the fuel cell 13.

In the fuel cell 13, the fuel gas supplied to the anode and the oxidizing gas supplied to the cathode electrochemically react with each other. Thus, electricity and heat are generated. Any type of fuel cell may be used as the fuel cell 13, and examples of the fuel cell 13 include a polymer electrolyte fuel cell, a solid-oxide fuel cell, and a phosphoric-acid fuel cell. In a case where the fuel cell is a solid-oxide fuel cell, the fuel cell system 101 is not provided with the CO reducer 2 and is configured such that the reformer 1 and the fuel cell 13 are incorporated in one container.

The fuel cell system 101 includes a cooling medium passage 33, the cooling medium tank 14, the electric heater 15, and the cooling medium delivery unit 16. The cooling medium passage 33 is a passage through which a cooling medium which recovers the heat generated by the fuel cell 13 flows. The cooling medium tank 14 is a tank provided on the cooling medium passage 33 and configured to store the cooling medium. The electric heater 15 heats the cooling medium in the cooling medium passage 33 and may be provided anywhere on the cooling medium passage 33. For example, as shown in FIG. 3A, the electric heater 15 may be provided on the cooling medium passage 33 and outside the fuel cell 13 and the cooling medium tank 14 or may be provided in the cooling medium tank 14. The electric heater 15 operates when activating the fuel cell system. The electric heater 15 heats the cooling medium, and the heated cooling medium circulates in the cooling medium passage 33 to increase the temperature of the fuel cell 13.

The cooling medium delivery unit 16 is a device configured to cause the cooling medium to circulate in the cooling medium passage 33. One example of the cooling medium delivery unit 16 is a pump. Examples of the cooling medium include water and antifreezing fluids (for example, ethylene glycol-containing liquid).

As with the power supply system 100 according to Embodiment 1, in the power supply system 100 of Modification Example 1 configured as above, the control operation (the first control operation) of the power storage unit 107 is executed when activating the power generation system 101.

Therefore, the power supply system 100 of Modification Example 1 has the same operational advantages as the power supply system 100 of Embodiment 1.

Especially, in Modification Example 1, since the electric heater 15 is configured to increase the temperatures of the devices constituting the fuel cell system 101 in the activation operation, the activation electric power is high. Therefore, in the fuel cell system 101 of Modification Example 1, the improvement effect of the activation performance by the control of the controller 110 of the power supply system 100 is more significant than the conventional power generation systems.

As the electric heaters for increasing the temperatures of the devices constituting the fuel cell system at the time of the activation, the fuel cell system 101 of the present example includes the electric heater 3 and the electric heater 15. However, the present modification example is not limited to this. For example, the fuel cell system 101 may be configured to include one of the electric heater 3 and the electric heater 15 or may be configured to include an electric heater other than the electric heater 3 and the electric heater 15.

Known various processing operations may be adopted as the processing operation executed after the power generation stop of the fuel cell system 101 in the power supply system 100 of Modification Example 1. Examples of the processing operation executed after the power generation stop of the fuel cell system 101 include a circulating operation of the cooling medium in the cooling medium passage 33 by the cooling medium delivery unit 16, a material gas purging operation with respect to at least one of a gas passage in the hydrogen generator 11 and a gas passage in the fuel cell 13 by a material gas supply unit (not shown), and an operation of the electric heater 15. The electric heater 15 may operate in the circulating operation of the cooling medium.

As with the power supply system 100 according to Embodiment 1, in the power supply system 100 of Modification Example 1 configured as above, the control operation (the second control operation) of the power storage unit 107 is executed when stopping the power generation system 101. Therefore, the power supply system 100 of Modification Example 1 has the same operational advantages as the power supply system 100 of Embodiment 1.

Especially, in Modification Example 1, in a case where the electric heater 15 is configured to increase the temperatures of the devices constituting the fuel cell system 101 in the processing operation executed after the power generation stop of the fuel cell system 101, the stop electric power is high. Therefore, in the fuel cell system 101 of Modification Example 1, the improvement effect of the stop performance by the control of the controller 110 of the power supply system 100 is more significant than the conventional power generation systems.

In the power supply system 100 of Modification Example 1, the controller 110 may be configured to execute at least one of the control operation of the power storage unit 107 when activating the power generation system 101 and the control operation of the power storage unit 107 when stopping the power generation of the power generation system 101. To be specific, the controller 110 may be configured to execute only one of the control operation of the power storage unit 107 when activating the power generation system 101 and the control operation of the power storage unit 107 when stopping the power generation of the power generation system 101 or may be configured to execute both the control operation of the power storage unit 107 when activating the power generation system 101 and the control operation of the power storage unit 107 when stopping the power generation of the power generation system 101.

Modification Example 2

The power supply system of Modification Example 2 is another example in which the power generation system is a fuel cell system.

Figure 3B:
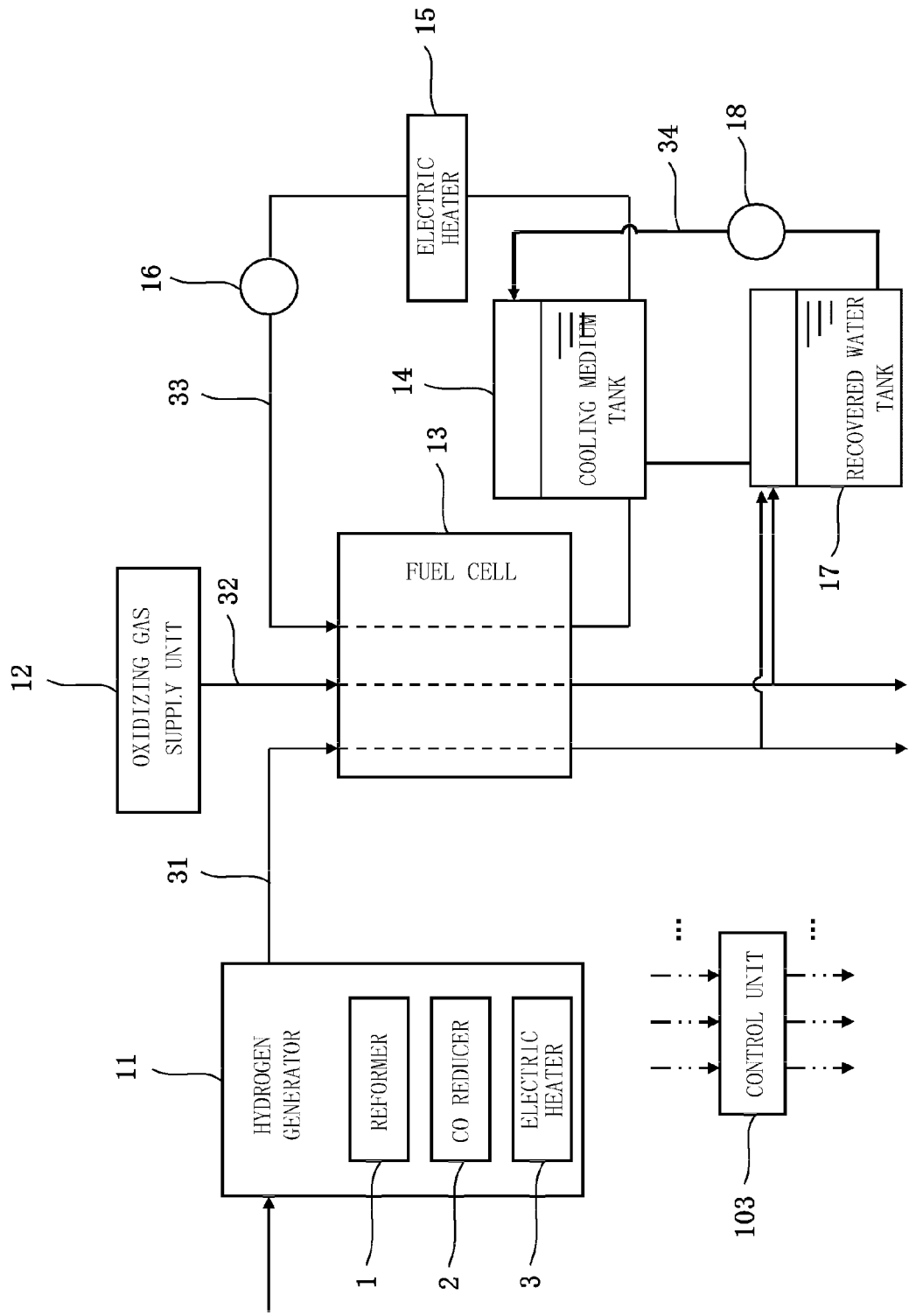

FIG. 3B is one example of a block diagram schematically showing the schematic configuration of the power generation system of Modification Example 2 in the power supply system according to Embodiment 1.

As shown in FIG. 3B, the power generation system 101 of Modification Example 2 is the same in basic configuration as the fuel cell system of Modification Example 1 but is different from the fuel cell system of Modification Example 1 in that the power generation system 101 of Modification Example 2 further includes a recovered water tank 17 and a delivery unit 18. The electric heater 15 may be provided at the recovered water tank 17.

The recovered water tank 17 is a tank configured to store water recovered from an exhaust gas discharged in the fuel cell system 101. The exhaust gas may be any exhaust gas. Examples of the exhaust gas include a flue gas discharged from a combustor configured to heat the reformer 1 and at least one of the fuel gas and oxidizing gas discharged from the fuel cell 13.

The fuel cell system 101 includes a circulation passage 34 connecting the cooling medium tank 14 and the recovered water tank 17. Therefore, in the present example, water is used as the cooling medium, and the circulation passage 34 is configured such that the cooling water in the cooling medium tank 14 and the recovered water in the recovered water tank 17 circulate therein. The delivery unit 18 configured to deliver the water in the circulation passage 34 is provided on a portion of the circulation passage 34. One example of the delivery unit 18 is a pump.

In a case where the fuel cell 13 is a solid-oxide fuel cell, the cooling medium passage 33 is configured as not a passage through which the cooling medium for cooling the fuel cell 13 flows but a passage through which the cooling medium for cooling the flue gas discharged from the fuel cell 13 and generated by combusting the fuel gas flows.

Known various processing operations may be adopted as the processing operation executed after the power generation stop of the fuel cell system 101 in the power supply system 100 of Modification Example 2. Examples of the processing operation executed after the power generation stop of the fuel cell system 101 include the circulating operation of the cooling medium in the cooling medium passage 33 by the cooling medium delivery unit 16, the circulating operation of water between the cooling medium tank 14 and the recovered water tank 17 by the delivery unit 18, the material gas purging operation with respect to at least one of the gas passage in the hydrogen generator 11 and the gas passage in the fuel cell 13 by the material gas supply unit (not shown), and the operation of the electric heater 15. The electric heater 15 may operate in at least one of the circulating operation of the cooling medium and the circulating operation of the water between the cooling medium tank 14 and the recovered water tank 14.

As with the power supply system of Embodiment 1, in the power supply system 100 of Modification Example 2 configured as above, the control operations (the first control operation and the second control operation) of the power storage unit 107 are executed when activating the power generation system 101 and when stopping the power generation system 101. Therefore, although the power supply system 100 of Modification Example 2 operates in the same manner as the power supply system 100 of Embodiment 1, the power supply system 100 of Modification Example 2 has the same operational advantages as the power supply system 100 of Modification Example 1.

In the power supply system 100 of Modification Example 2, the controller 110 may be configured to execute at least one of the control operation of the power storage unit 107 when activating the fuel cell system 101 and the control operation of the power storage unit 107 when stopping the power generation of the fuel cell system 101. To be specific, the controller 110 may be configured to execute only one of the control operation of the power storage unit 107 when activating the fuel cell system 101 and the control operation of the power storage unit 107 when stopping the power generation of the fuel cell system 101 or may be configured to execute both the control operation of the power storage unit 107 when activating the fuel cell system 101 and the control operation of the power storage unit 107 when stopping the power generation of the fuel cell system 101.

Embodiment 2

In the power supply system according to Embodiment 2, the controller is configured to determine based on the power storage amount of the power storage unit whether to permit or deny the activation of the power generation system.

In addition, in the power supply system according to Embodiment 2, the controller may be configured to determine based on the power storage amount of the power storage unit whether to permit or deny the stop of the power generation of the power generation system.

Figure 4:
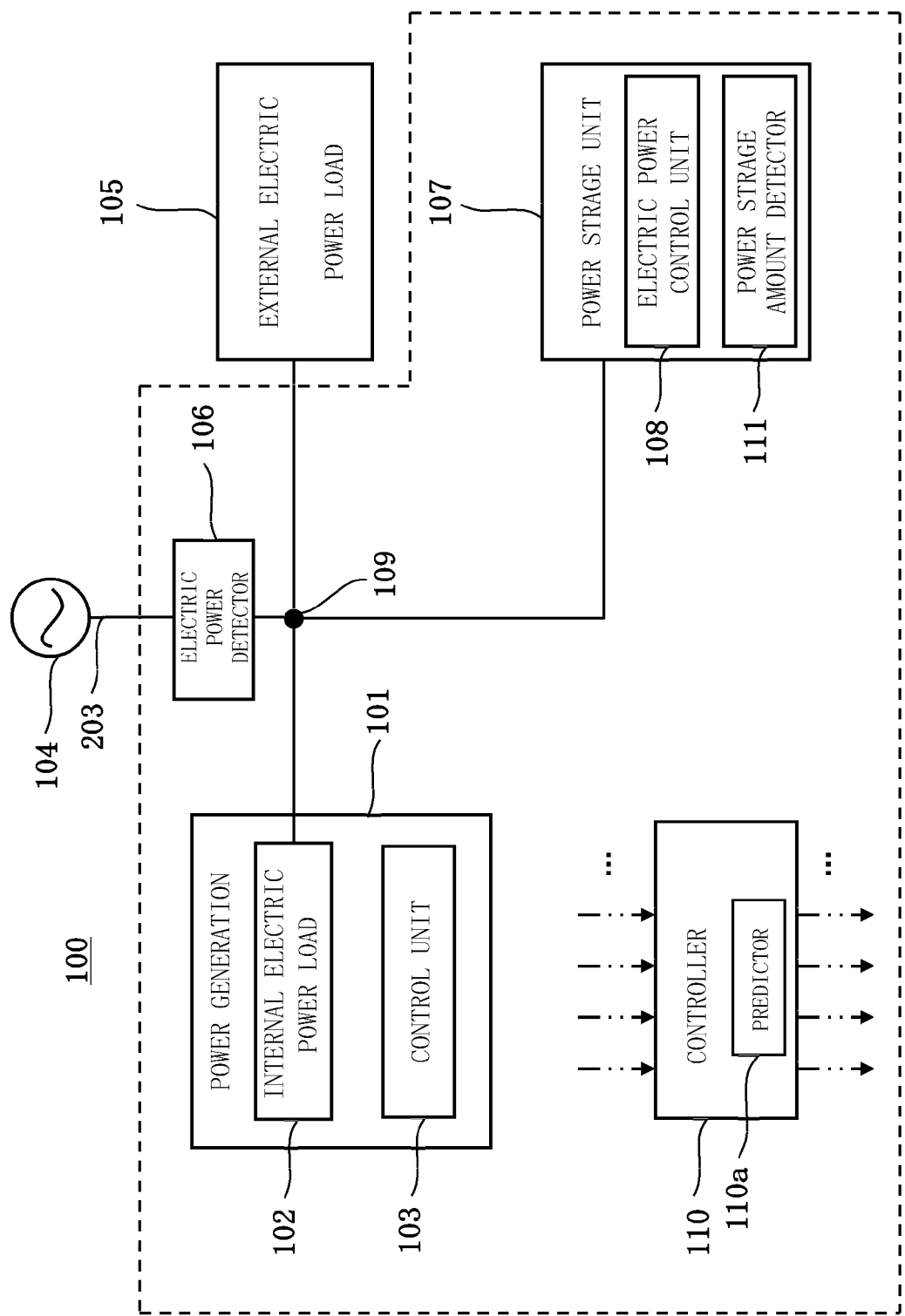
FIG. 4 is one example of a block diagram schematically showing the schematic configuration of the power supply system according to Embodiment 2.

FIG. 4 is one example of a block diagram schematically showing the schematic configuration of the power supply system according to Embodiment 2.

As shown in FIG. 4, the power supply system 100 according to Embodiment 2 includes a power storage amount detector 111 configured to detect the power storage amount of the power storage unit 107. Since the other components of the power supply system 100 according to Embodiment 2 are the same as those of the power supply system 100 according to Embodiment 1, detailed explanations thereof are omitted.

Next, the activation operation of the power generation system 101 of the power supply system 100 according to Embodiment 2 will be explained in reference to FIG. 5A.

Figure 5:
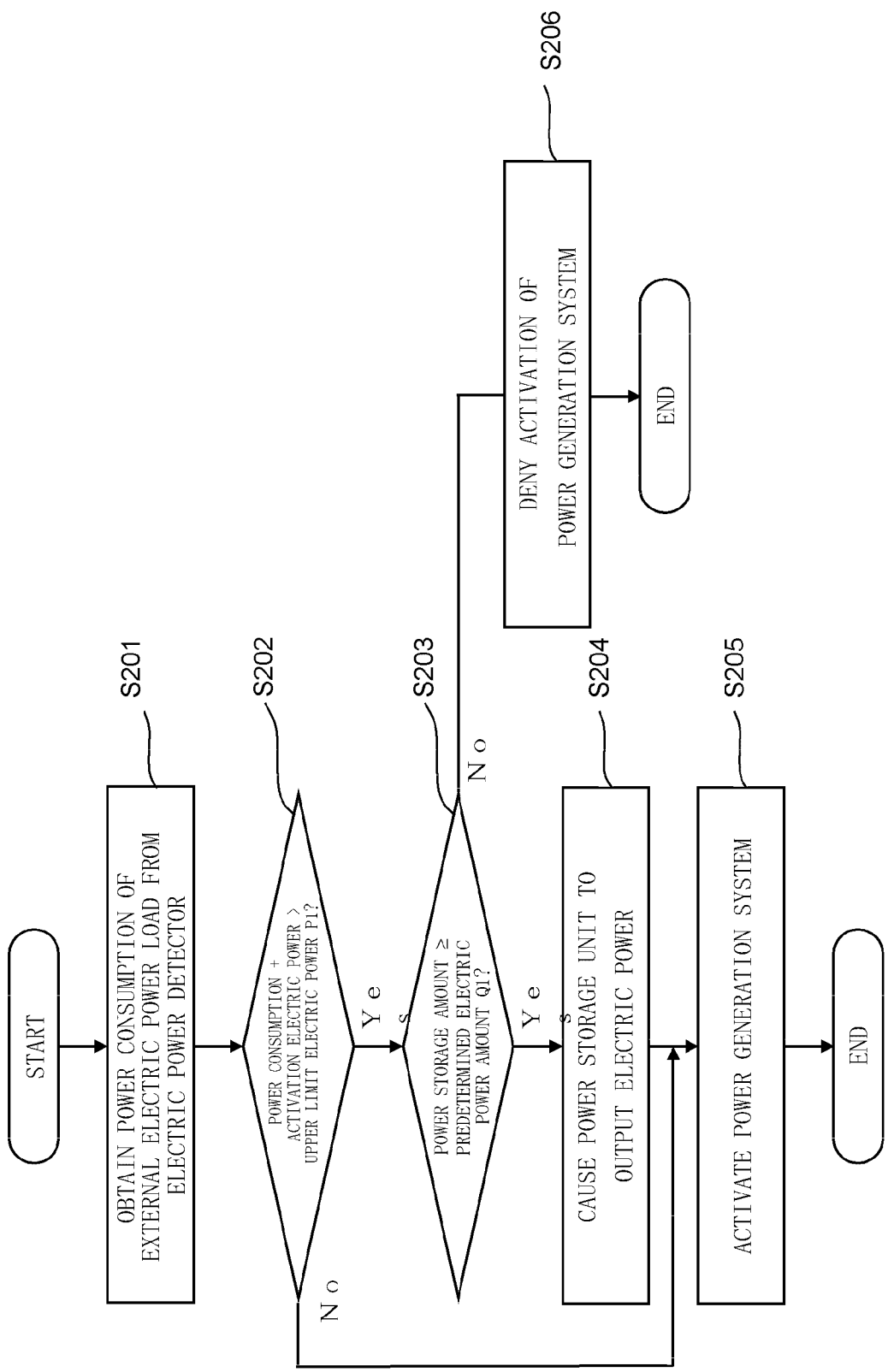
FIG. 5A is one example of a flow chart schematically showing an operation executed when activating the power generation system in the power supply system according to Embodiment 2.
FIG. 5B is one example of a flow chart schematically showing an operation executed when stopping the power generation of the power generation system in the power supply system according to Embodiment 2.
Figure 5:
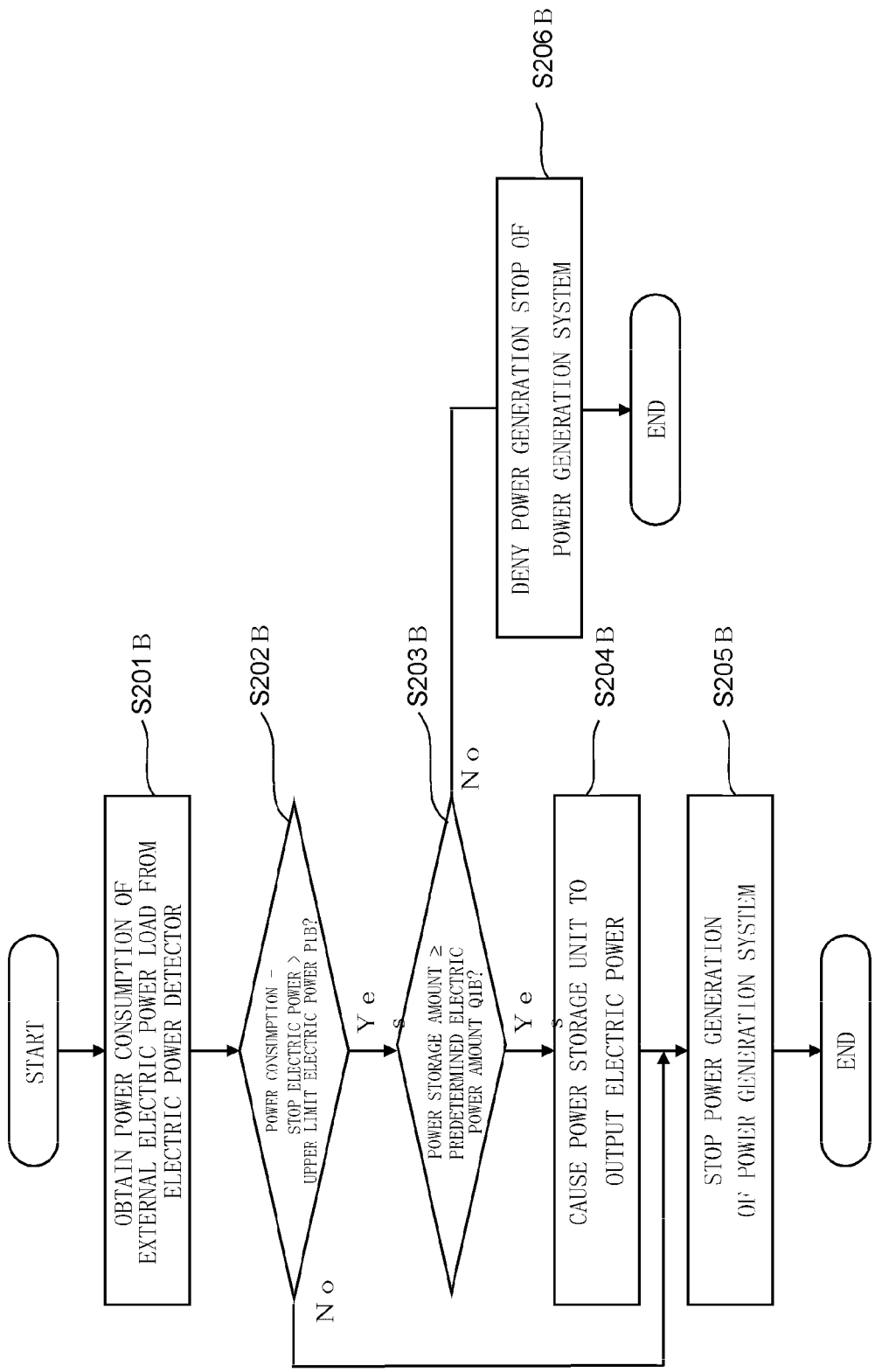

FIG. 5A is one example of a flow chart schematically showing the operation executed when activating the power generation system in the power supply system according to Embodiment 2.

First, as shown in FIG. 5A, as with the power supply system 100 according to Embodiment 1, when the power generation system 101 is about to be activated, the controller 110 obtains from the electric power detector 106 the electric power (power consumption) consumed by the external electric power load 105 (Step S201).

Next, the controller 110 determines whether or not the sum of the power consumption of the external electric power load 105 obtained in Step S201 and the activation electric power of the power generation system 101 exceeds the consumable upper limit electric power P1 supplied from the electric power system 104 (Step S202). When the sum of the power consumption and the activation electric power exceeds the upper limit electric power P1 (Yes in Step S202), the controller 110 proceeds to Step S203. When the above sum is equal to or lower than the upper limit electric power P1 (No in Step S202), the controller 110 proceeds to Step S205.

In Step S203, the controller 110 determines whether or not the power storage amount of the power storage unit 107 is equal to or larger than a predetermined electric power amount Q1. When the power storage amount of the power storage unit 107 is equal to or larger than the predetermined electric power amount Q1 (Yes in Step S203), the controller 110 proceeds to Step S204. When the power storage amount of the power storage unit 107 is smaller than the predetermined electric power amount Q1 (No in Step S203), the controller 110 proceeds to Step S206. The predetermined electric power amount Q1 may be set arbitrarily. For example, the predetermined electric power amount Q1 may be an electric power amount necessary for the activation of the power generation system 101. The electric power amount necessary for the activation may be, for example, a cumulative power consumption amount consumed by the internal electric power load in a period from the start of the activation operation to the completion thereof.

In Step S204, the controller 110 causes the electric power control unit 108 to output the electric power from the power storage unit 107. With this, the power storage unit 107 supplies the electric power by the electric power control unit 108 to the external electric power load 105 and the activated power generation system 101.

At this time, the electric power control unit 108 controls the power storage unit 107 such that the electric power obtained by subtracting the electric power supplied to the external electric power load 105 and the power generation system 101 from the sum of the power consumption of the external electric power load 105 and the activation electric power of the power generation system 101 (to be specific, power consumption+activation electric power−supplied electric power) becomes equal to or lower than the upper limit electric power P1. In the control of the power storage unit 107, the electric power control unit 108 may cause the power storage unit 107 to supply the electric power to at least the external electric power load 105.

Next, the controller 110 proceeds to Step S205 and outputs the activation permission signal of the power generation system 101 to the control unit 103. With this, the control unit 103 starts the activation of the power generation system 101.

In contrast, in Step S206, the controller 110 denies the activation of the power generation system 101 to output an activation denial signal to the control unit 103 or does not activate the power generation system 101 by not outputting the activation permission signal. In this case, it is preferable that the controller 110 be configured to inform a user that the activation of the power generation system 101 cannot be executed. Examples of this informing method include a method of displaying an error on a remote controller and a method of emitting a warning sound indicating the error.

The power storage amount detector 111 obtains from the electric power detector (not shown) of the power storage unit 107 the output electric power (discharge electric power) of the power storage unit 107 and input electric power (charge electric power) input to the power storage unit, and the power storage amount of the power storage unit 107 is determined based on the obtained values.

When the activation of the power generation system 101 is denied in Step S206, the power supply system 100 (the controller 110 of the power supply system 100) according to Embodiment 2 may return to Step S201 and repeat the above flow until the power generation system is activated in Step S205 (to be specific, may cause the power generation system 101 to stand by for the activation).

The power supply system 100 (the controller 110 of the power supply system 100) according to Embodiment 2 configured as above has the same operational advantages as the power supply system 100 (the controller 110 of the power supply system 100) according to Embodiment 1. In the power supply system 100 according to Embodiment 2, since the power generation system 101 is not activated when the power storage amount of the power storage unit 107 is relatively small, the activation operation is prevented from being stopped. To be specific, the activation performance of the power supply system 100 (the controller 110 of the power supply system 100) according to Embodiment 2 improves more than that of the power supply system 100 (the controller 110 of the power supply system 100) according to Embodiment 1.

Next, the operation executed when stopping the power generation of the power generation system of the power supply system 100 according to Embodiment 2 will be explained in reference to FIG. 5B.

FIG. 5B is one example of a flow chart schematically showing the operation executed when stopping the power generation of the power generation system in the power supply system according to Embodiment 2.

As shown in FIG. 5B, as with Embodiment 1, the operation executed when stopping the power generation of the power generation system 101 is executed in the power supply system according to Embodiment 2, and respective steps of the operation executed when stopping the power generation may be the same as those of the above-described operation executed when activating the power generation system 101. Therefore, the following will explain steps in which operations different from the operations explained in Embodiment 1 and the above-described operation executed when activating the power generation system 101 are executed. Specifically, Steps S203B and S206B will be explained.

In Step S203B, the controller 110 determines whether or not the power storage amount of the power storage unit 107 is equal to or larger than a predetermined electric power amount Q1B. The predetermined electric power amount Q1B may be set arbitrarily. For example, the predetermined electric power amount Q1B may be an electric power amount necessary for the operation executed when stopping the power generation of the power generation system 101.

In Step S206B, the controller 110 denies the power generation stop of the power generation system 101 to output to the control unit 103 a signal for denying the power generation stop or does not execute the power generation stop of the power generation system 101 by not outputting a signal for permitting the power generation stop. In this case, it is preferable that the controller 110 inform a user that the power generation stop of the power generation system 101 cannot be executed.

When the power generation stop of the power generation system 101 is denied in Step S206B, the controller 110 may return to Step S201B and repeat the above flow until the power generation of the power generation system 101 is stopped in Step S205B (to be specific, may cause the power generation system 101 to stand by for the power generation stop).

As above, in the power supply system 100 according to Embodiment 2, since the power generation of the power generation system 101 is not stopped when the power storage amount of the power storage unit 107 is relatively small, the processing operation executed after the power generation stop is prevented from being stopped. To be specific, the stop performance of the power supply system 100 according to Embodiment 2 improves more than that of the power supply system 100 according to Embodiment 1.

In the power supply system 100 according to Embodiment 2, the controller 110 may be configured to execute at least one of the control operation of the power storage unit 107 when activating the power generation system 101 and the control operation of the power storage unit 107 when stopping the power generation of the power generation system 101. To be specific, the controller 110 may be configured to execute only one of the control operation of the power storage unit 107 when activating the power generation system 101 and the control operation of the power storage unit 107 when stopping the power generation of the power generation system 101 or may be configured to execute both the control operation of the power storage unit 107 when activating the power generation system 101 and the control operation of the power storage unit 107 when stopping the power generation of the power generation system 101.

Modification Example

Figure 6:
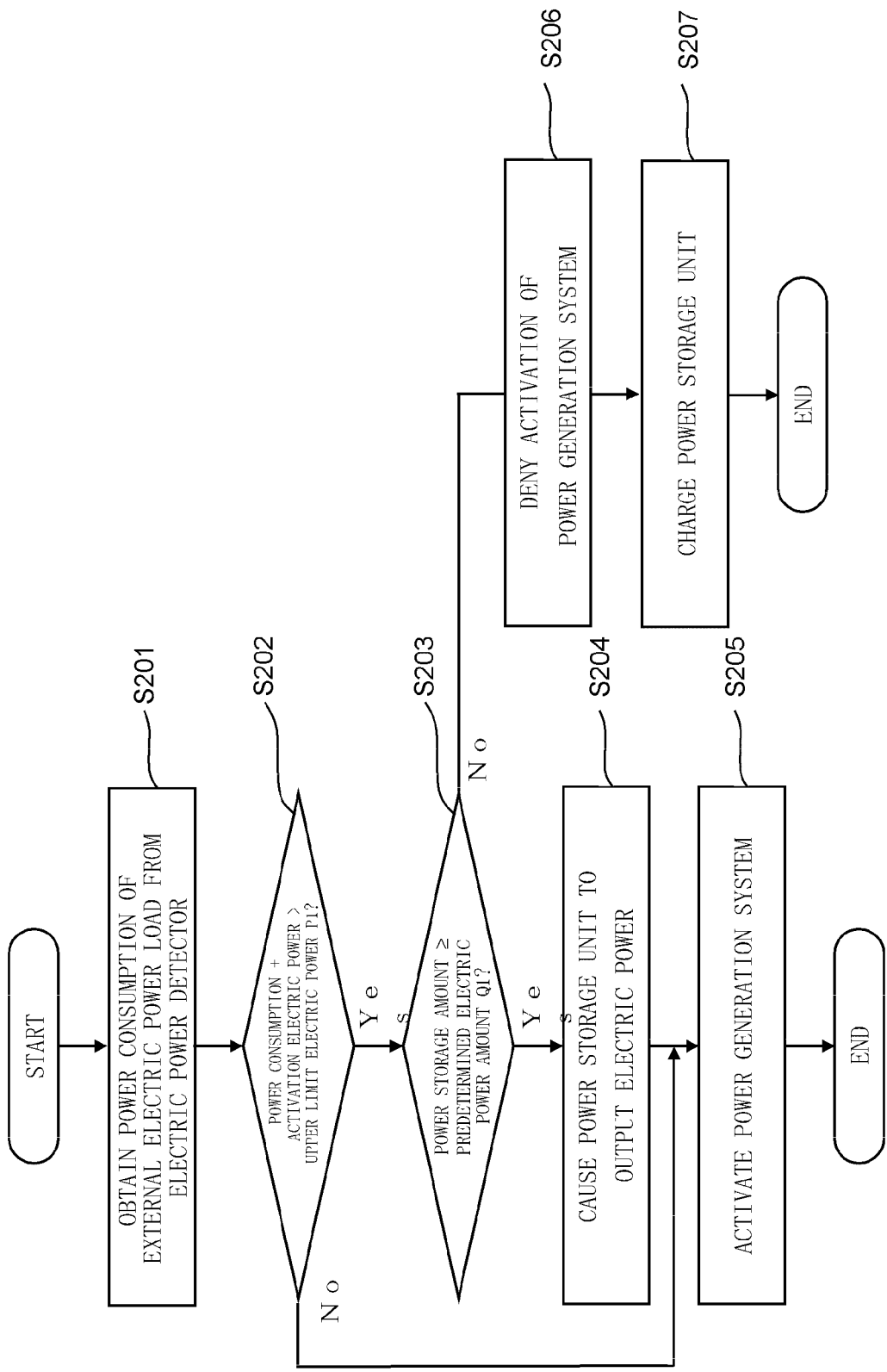
FIG. 6A is one example of a flow chart schematically showing the operation executed when activating the power generation system in the power supply system of Modification Example of the power supply system according to Embodiment 2.
FIG. 6B is one example of a flow chart schematically showing the operation executed when stopping the power generation of the power generation system in the power supply system of Modification Example.

FIG. 6A is one example of a flow chart schematically showing the operation executed when activating the power generation system in the power supply system of Modification Example of the power supply system according to Embodiment 2.

As shown in FIG. 6A, in the activation operation of the power generation system 101 in the power supply system 100 of the present modification example, the operation executed when the power storage amount of the power storage unit 107 is smaller than the predetermined electric power amount Q1 is different from that of the power generation system 101 of the power supply system 100 according to Embodiment 2.

Specifically, when the power storage amount of the power storage unit 107 is smaller than the predetermined electric power amount Q1 (No in Step S203), the controller 110 denies the activation of the power generation system 101 (Step S206) and causes the electric power control unit 108 to charge the power storage unit 107 by the electric power supplied from the electric power system 104 (Step S207). With this, the electric power control unit 108 supplies the electric power from the electric power system 104 to cells of a storage battery constituting the power storage unit 107 or assembled batteries of the storage battery constituting the power storage unit 107 such that the supplied electric power does not exceed the upper limit electric power P1. Thus, the power storage unit 107 is charged. The power storage unit 107 may be charged in such a manner that, for example, a capacitor is provided in the power storage unit 107, the electric power from the electric power system 104 is stored in the capacitor, and the stored electric power is supplied to the cells of the storage battery or the assembled batteries of the storage battery.

The power supply system 100 (the controller 110 of the power supply system 100) of the present modification example configured as above has the same operational advantages as the power supply system 100 (the controller 110 of the power supply system 100) according to Embodiment 2. In the power supply system 100 (the controller 110 of the power supply system 100) of the present modification example, even in a case where the power storage amount of the power storage unit 107 is small and the activation is denied, the next activation is prevented from being denied by the same reason. Therefore, the activation performance of the power generation system 101 further improves.

When the activation of the power generation system 101 is denied in Step S206, the power supply system 100 (the controller 110 of the power supply system 100) of the present modification example may return to Step S201 and repeat the above flow until the power generation system is activated in Step S205 (to be specific, may cause the power generation system 101 to stand by for the activation). Moreover, when the activation of the power generation system 101 is denied in Step S206, the power supply system 100 (the controller 110 of the power supply system 100) of the present modification example may return to Step S203 and repeat the above flow until the power generation system is activated in Step S205 (to be specific, may cause the power generation system 101 to stand by for the activation).

Next, the operation executed when stopping the power generation of the power supply system 100 of the present modification example will be explained in reference to FIG. 6B.

Figure 6B:
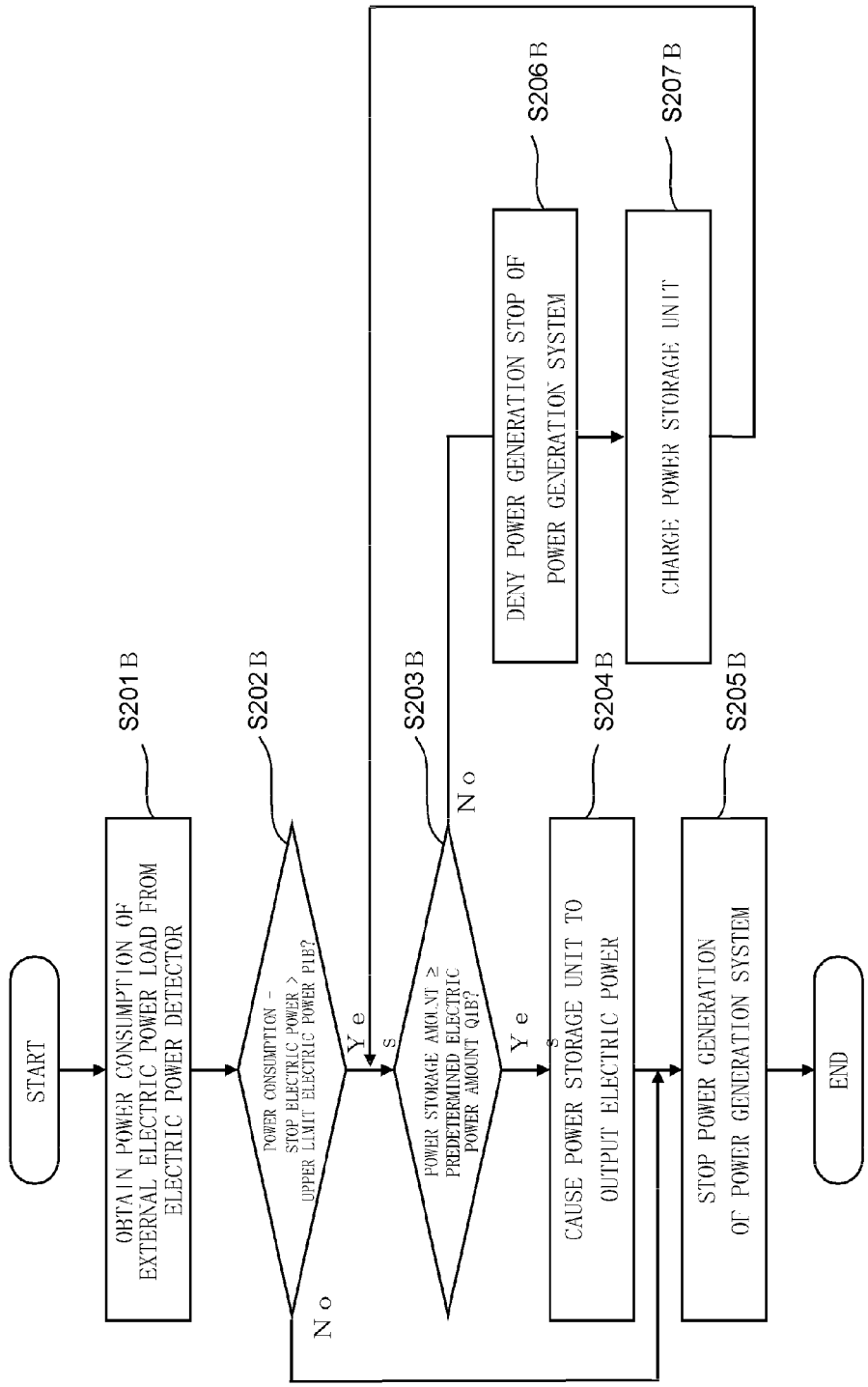

FIG. 6B is one example of a flow chart schematically showing the operation executed when stopping the power generation of the power generation system in the power supply system of the present modification example.

As shown in FIG. 6B, in the operation executed when stopping the power generation of the power generation system 101 in the power supply system 100 of the present modification example, the operation executed when the power storage amount of the power storage unit 107 is smaller than the predetermined electric power amount Q1B is different from that of the power generation system 101 of the power supply system 100 according to Embodiment 2.

Specifically, when the power storage amount of the power storage unit 107 is smaller than the predetermined electric power amount Q1 (No in Step S203B), the controller 110 denies the power generation stop of the power generation system 101 (Step S206B) and causes the electric power control unit 108 to charge the power storage unit 107 by the electric power supplied from the electric power system 104 (Step S207B). With this, the electric power control unit 108 supplies the electric power from the electric power system 104 to the cells of the storage battery constituting the power storage unit 107 or the assembled batteries of the storage battery constituting the power storage unit 107 such that the supplied electric power does not exceed the upper limit electric power P1. Thus, the power storage unit 107 is charged. The power storage unit 107 may be charged in such a manner that, for example, a capacitor is provided in the power storage unit 107, the electric power from the electric power system 104 is stored in the capacitor, and the stored electric power is supplied to the cells of the storage battery or the assembled batteries of the storage battery.

Then, the controller 110 again returns to Step S203B and repeats the above steps until the power storage amount of the power storage unit 107 becomes equal to or higher than the predetermined electric power amount Q1B.

As above, according to the power supply system 100 (the controller 110 of the power supply system 100) of the present modification example, even in a case where the power storage amount of the power storage unit 107 is small and the power generation stop is denied, the stop performance improves more than that of the power supply system 100 (the controller 110 of the power supply system 100) according to Embodiment 2 by charging the power storage unit 107.

In the power supply system 100 of the present modification example, the controller 110 may be configured to execute at least one of the control operation of the power storage unit 107 when activating the power generation system 101 and the control operation of the power storage unit 107 when stopping the power generation of the power generation system 101. To be specific, the controller 110 is configured to execute only one of the control operation of the power storage unit 107 when activating the power generation system 101 and the control operation of the power storage unit 107 when stopping the power generation of the power generation system 101 or may be configured to execute both the control operation of the power storage unit 107 when activating the power generation system 101 and the control operation of the power storage unit 107 when stopping the power generation of the power generation system 101.

Embodiment 3

In the power supply system according to Embodiment 3, the controller is configured to switch an activation mode of the power generation system based on the power storage amount of the power storage unit between a first activation mode in which the activation electric power of the power generation system is relatively high and a second activation mode in which the activation electric power of the power generation system is relatively low.

In addition, in the power supply system according to Embodiment 3, the controller may be configured to switch a stop mode of the power generation system based on the power storage amount of the power storage unit between a first stop mode in which the stop electric power of the power generation system is relatively high and a second stop mode in which the stop electric power of the power generation system is relatively low.

The power supply system 100 according to Embodiment 3 is the same in basic configuration as the power supply system 100 according to Embodiment 2 but is different from the power supply system 100 according to Embodiment 2 regarding the activation operation of the power generation system 101. Hereinafter, an explanation will be made in reference to FIG. 7A.

Figure 7:
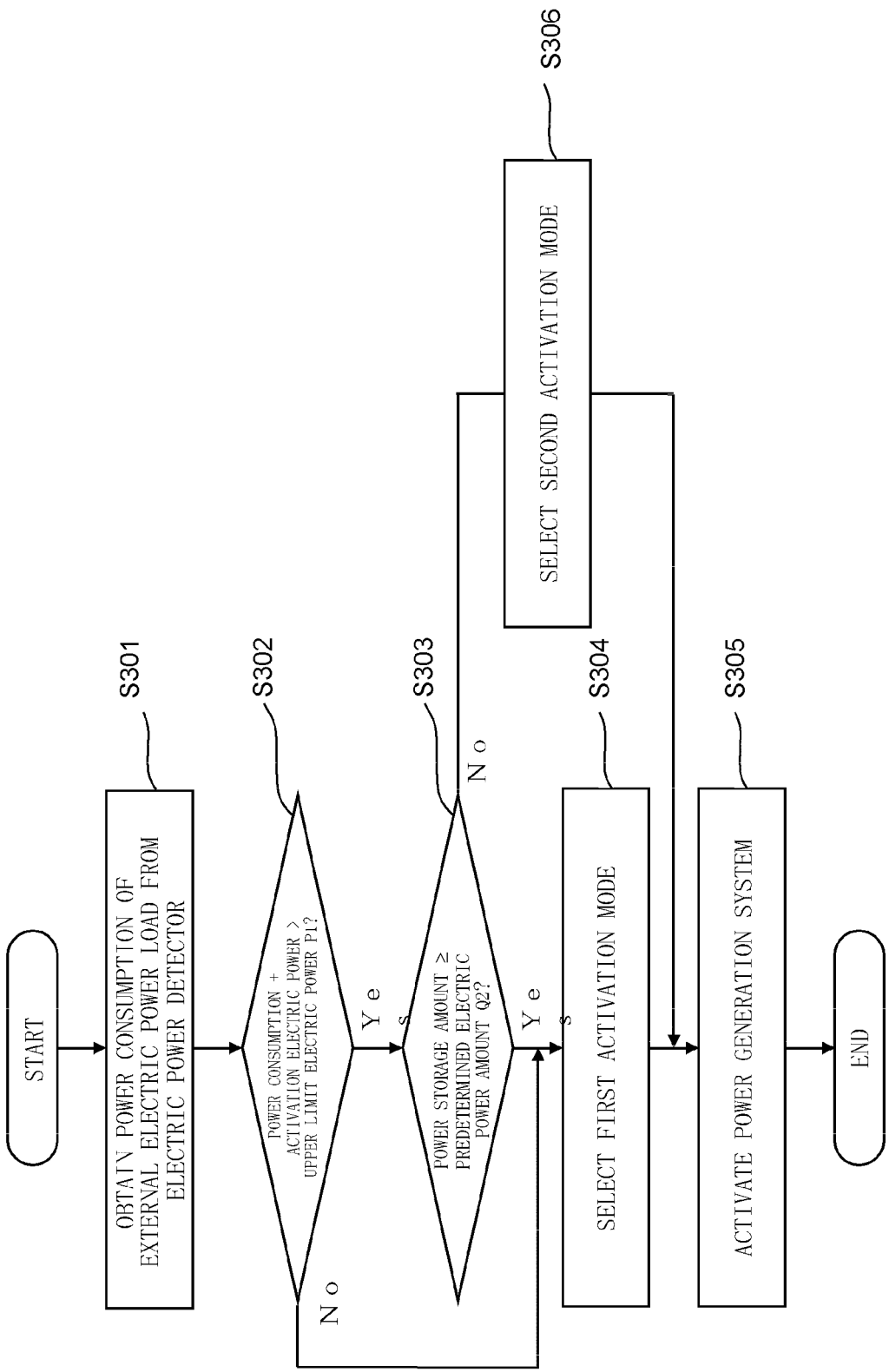
FIG. 7A is one example of a flow chart schematically showing the operation executed when activating the power generation system in the power supply system according to Embodiment 3.
FIG. 7B is one example of a flow chart schematically showing the operation executed when stopping the power generation of the power generation system in the power supply system according to Embodiment 3.
Figure 7:
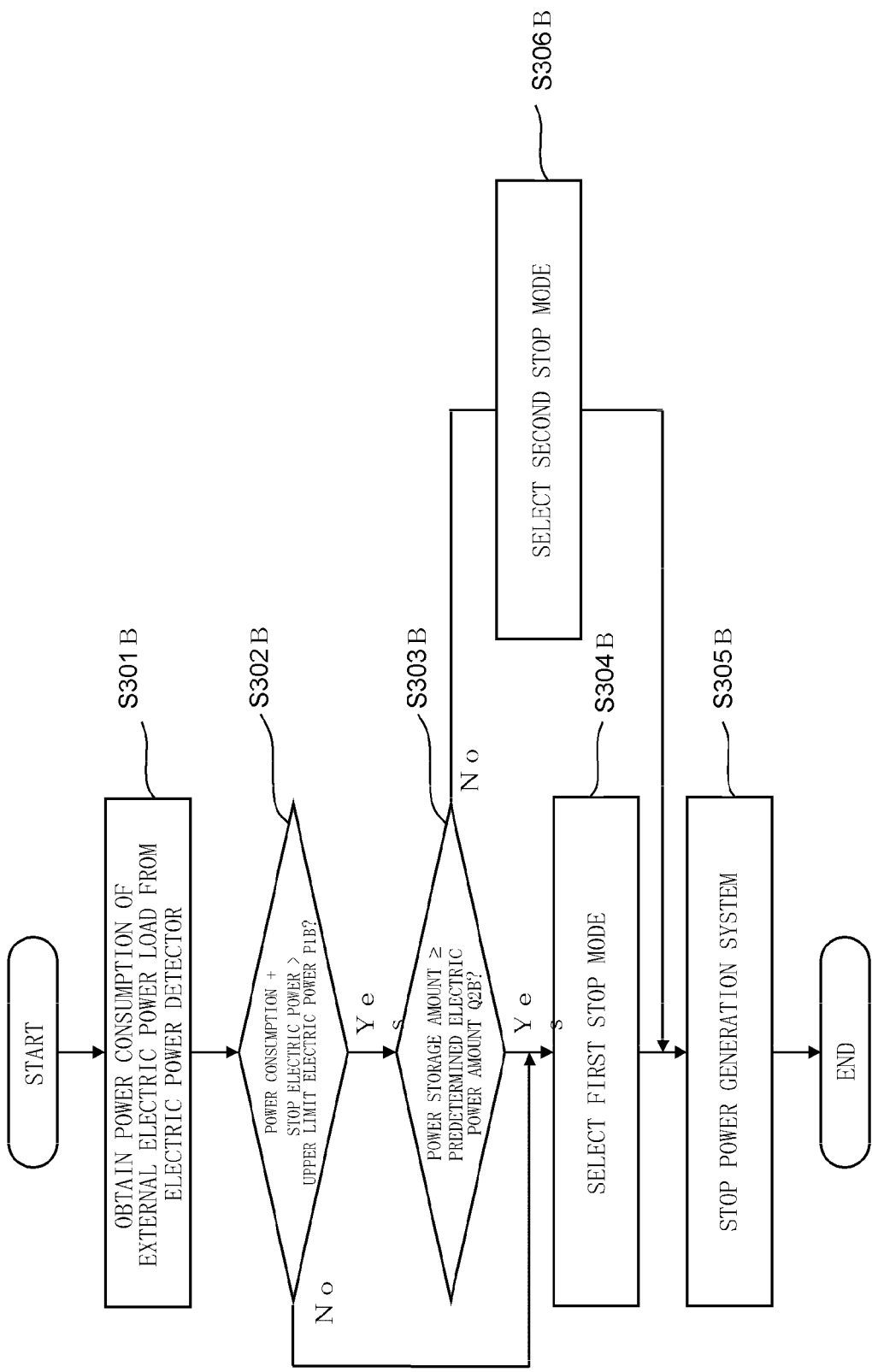

FIG. 7A is one example of a flow chart schematically showing the operation executed when activating the power generation system in the power supply system according to Embodiment 3.

First, as shown in FIG. 7A, as with the power supply system 100 according to Embodiment 1, when the power generation system 101 is about to be activated, the controller 110 obtains from the electric power detector 106 the electric power (power consumption) consumed by the external electric power load 105 (Step S301).

Next, the controller 110 determines whether or not the sum of the power consumption of the external electric power load 105 obtained in Step S301 and the activation electric power of the power generation system 101 exceeds the consumable upper limit electric power P1 supplied from the electric power system 104 (Step S302). When the sum of the power consumption and the activation electric power exceeds the upper limit electric power P1 (Yes in Step S302), the controller 110 proceeds to Step S303. When the above sum is equal to or lower than the upper limit electric power P1 (No in Step S302), the controller 110 proceeds to Step S304. Used as the activation electric power in Step S302 is the activation electric power used when the power generation system 101 is activated by the first activation mode.

In Step S303, the controller 110 determines whether or not the power storage amount of the power storage unit 107 is equal to or larger than a predetermined electric power amount Q2. When the power storage amount of the power storage unit 107 is equal to or larger than the predetermined electric power amount Q2 (Yes in Step S303), the controller 110 proceeds to Step S304. When the power storage amount of the power storage unit 107 is smaller than the predetermined electric power amount Q2 (No in Step S303), the controller 110 proceeds to Step S306. The predetermined electric power amount Q2 may be set arbitrarily. For example, the predetermined electric power amount Q2 may be the electric power amount necessary to activate the power generation system 101 by the first activation mode. The electric power amount necessary for the first activation mode may be, for example, a cumulative power consumption amount consumed by the internal electric power load in a period from the start of the activation operation by the first activation mode to the completion thereof.

The controller 110 selects the first activation mode in Step S304 and proceeds to Step S305. In contrast, the controller 110 selects the second activation mode in Step S306 and proceeds to Step S305. Here, the first activation mode denotes an activation mode (activation method) of the power generation system 101, the activation mode being a mode in which the activation electric power of the power generation system 101 is relatively high. The second activation mode denotes an activation mode (activation method) of the power generation system 101, the activation mode being a mode in which the activation electric power of the power generation system 101 is relatively low. For example, the first activation mode is an activation mode in which the electric power supplied to the internal electric power load 102 is higher than that of the second activation mode and the activation operation of the power generation system 101 is completed more quickly than that of the second activation mode. Specifically, in a case where the internal electric power load is an electrically-operated auxiliary device, such as a pump or a fan, the activation operation by the first activation mode is executed in such a manner that the operation amount of the electrically-operated auxiliary device is larger than that of the second activation mode.

Then, in Step S305, the controller 110 outputs the activation permission signal of the power generation system 101 to the control unit 103. With this, the control unit 103 starts the activation of the power generation system 101.

The power supply system 100 (the controller 110 of the power supply system 100) according to Embodiment 3 configured as above has the same operational advantages as the power supply system 100 (the controller 110 of the power supply system 100) according to Embodiment 2. Moreover, in the power supply system 100 (the controller 110 of the power supply system 100) according to Embodiment 3, even if the power storage amount of the power storage unit 107 is not large, the power generation system 101 is activated by the second activation mode in which the activation electric power is relatively low. Therefore, the activation performance of the power supply system 100 (the controller 110 of the power supply system 100) according to Embodiment 3 improves more than that of the power supply system 100 (the controller 110 of the power supply system 100) according to Embodiment 2.

Next, the operation executed when stopping the power generation of the power supply system 100 according to Embodiment 3 will be explained in reference to FIG. 7B.

FIG. 7B is one example of a flow chart schematically showing the operation executed when stopping the power generation of the power generation system in the power supply system according to Embodiment 3.

As shown in FIG. 7B, as with Embodiment 2, the operation executed when stopping the power generation of the power generation system 101 is executed in the power supply system according to Embodiment 3, and respective steps of the operation executed when stopping the power generation may be the same as those of the above-described operation executed when activating the power generation system 101. Therefore, the following will explain steps in which operations different from the operations explained in Embodiment 2 and the above-described operation executed when activating the power generation system 101 are executed. Specifically, Steps S303B to S306B will be explained.

In Step S303B, the controller 110 determines whether or not the power storage amount of the power storage unit 107 is equal to or larger than a predetermined electric power amount Q2B. When the power storage amount of the power storage unit 107 is equal to or larger than the predetermined electric power amount Q2B (Yes in Step S303B), the controller 110 proceeds to Step S304B. When the power storage amount of the power storage unit 107 is smaller than the predetermined electric power amount Q2B (No in Step S303B), the controller 110 proceeds to Step S306B. The predetermined electric power amount Q2B may be set arbitrarily. For example, the predetermined electric power amount Q2B may be an electric power amount necessary to stop the power generation system 101 by the first stop mode. The electric power amount necessary for the first stop mode may be, for example, a cumulative power consumption amount consumed by the internal electric power load in a period from the start of the processing operation executed after the power generation stop of the power generation system 101 by the first stop mode to the completion of thereof.

The controller 110 selects the first stop mode in Step S304B and proceeds to Step S305B. In contrast, the controller 110 selects the second stop mode in Step S306B and proceeds to Step S305B. Here, the first stop mode denotes a stop mode (stop method) of the power generation system 101, the stop mode being a mode in which the stop electric power of the power generation system 101 is relatively high. The second stop mode denotes a stop mode of the power generation system 101, the stop mode being a mode in which the stop electric power of the power generation system 101 is relatively low.

For example, the first stop mode is a stop mode in which the electric power supplied to the internal electric power load 102 is higher than that of the second stop mode and the processing operation executed after the power generation stop of the power generation system 101 is completed more quickly than that of the second stop mode. Specifically, for example, in a case where the internal electric power load is an electrically-operated auxiliary device, such as a pump or a fan, the processing operation executed after the power generation stop by the first stop mode is executed in such a manner that the operation amount of the electrically-operated auxiliary device is larger than that of the second stop mode.

In a case where the power generation system 101 is a fuel cell system, and below-described operations are included as the processing operation executed after the power generation stop of the fuel cell system, one example of the second stop mode is a mode of temporarily cancelling the operations and/or suppressing the amount of electric power supplied to devices configured to execute the operations. Examples of the operations include the circulating operation of the cooling medium in the cooling medium passage 33 by the cooling medium delivery unit 16, the circulating operation of the water between the cooling medium tank 14 and the recovered water tank 17 by the delivery unit 18, the material gas purging operation with respect to at least one of the gas passage in the hydrogen generator 11 and the gas passage in the fuel cell 13 by the material gas supply unit, and the operation of the electric heater 15 (see Modification Examples 1 and 2 of Embodiment 1).

Then, in Step S305B, the controller 110 outputs to the control unit 103 a signal for permitting the power generation stop of the power generation system 101. With this, the control unit 103 stops the power generation of the power generation system 101, and then, a predetermined processing operation executed after the power generation stop of the power generation system 101 is executed.

As above, in the power supply system 100 (the controller 110 of the power supply system 100) according to Embodiment 3, even in a case where the power storage amount of the power storage unit 107 is not large, the power generation of the power generation system 101 is stopped and the processing operation executed after the power generation stop is executed by the second stop mode in which the stop electric power is relatively low. Therefore, the stop performance of the power supply system 100 (the controller 110 of the power supply system 100) according to Embodiment 3 improves more than that of the power supply system 100 (the controller 110 of the power supply system 100) according to Embodiment 2.

In the power supply system 100 according to Embodiment 3, the controller 110 may be configured to execute at least one of the control operation of the power storage unit 107 when activating the power generation system 101 and the control operation of the power storage unit 107 when stopping the power generation of the power generation system 101. To be specific, the controller 110 may be configured to execute only one of the control operation of the power storage unit 107 when activating the power generation system 101 and the control operation of the power storage unit 107 when stopping the power generation of the power generation system 101 or may be configured to execute both the control operation of the power storage unit 107 when activating the power generation system 101 and the control operation of the power storage unit 107 when stopping the power generation of the power generation system 101.

Modification Example 1

In the power supply system of Modification Example 1 of the power supply system according to Embodiment 3, the controller causes the electric power system to charge the power storage unit in the second activation mode.

In addition, in the power supply system of Modification Example 1, the controller may cause the electric power system to charge the power storage unit in the second stop mode.

Figure 8:
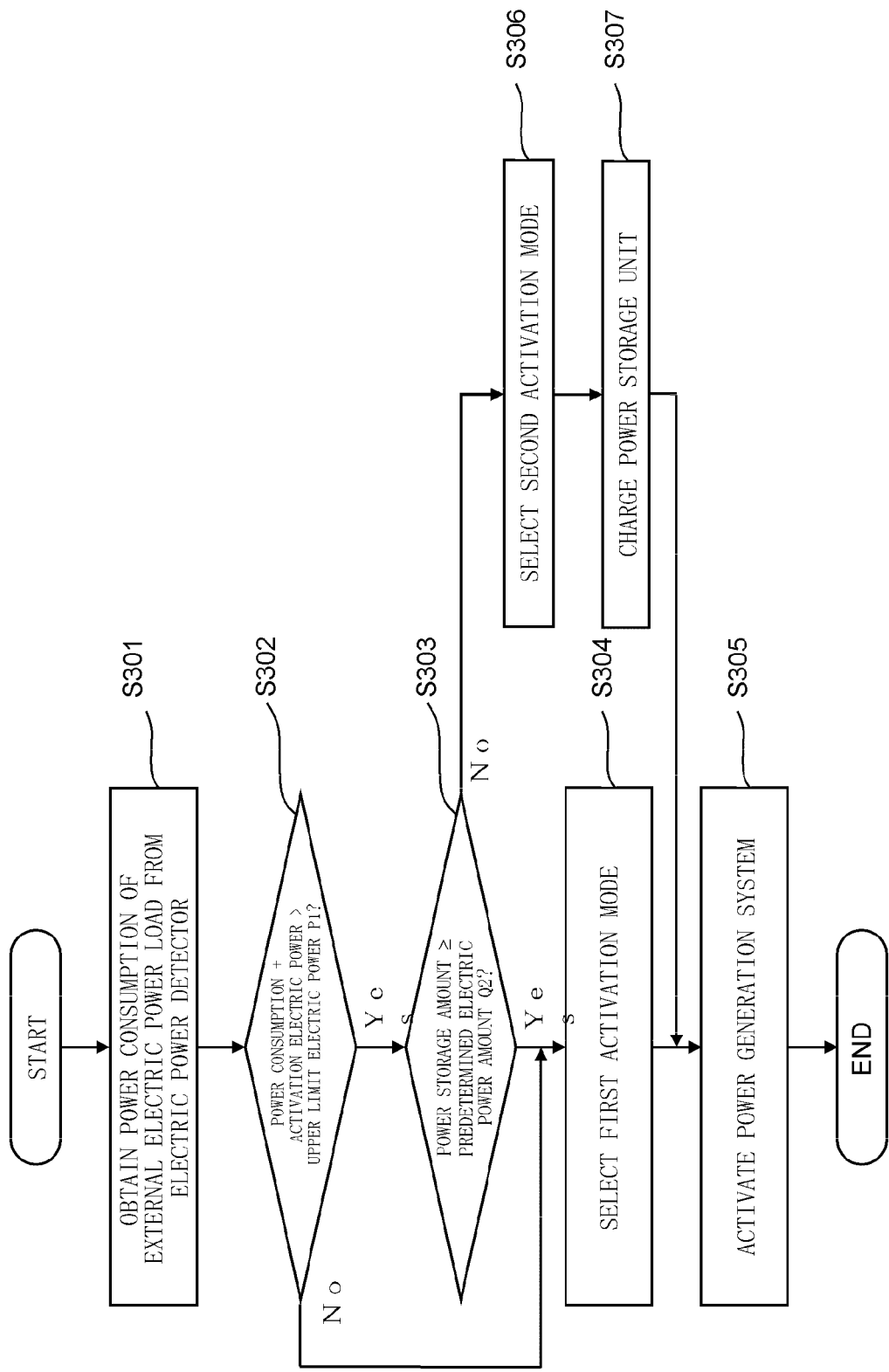
FIG. 8A is one example of a flow chart schematically showing the operation executed when activating the power generation system in the power supply system of Modification Example 1.
FIG. 8B is one example of a flow chart schematically showing the operation executed when stopping the power generation of the power generation system in the power supply system of Modification Example 1.
Figure 8:
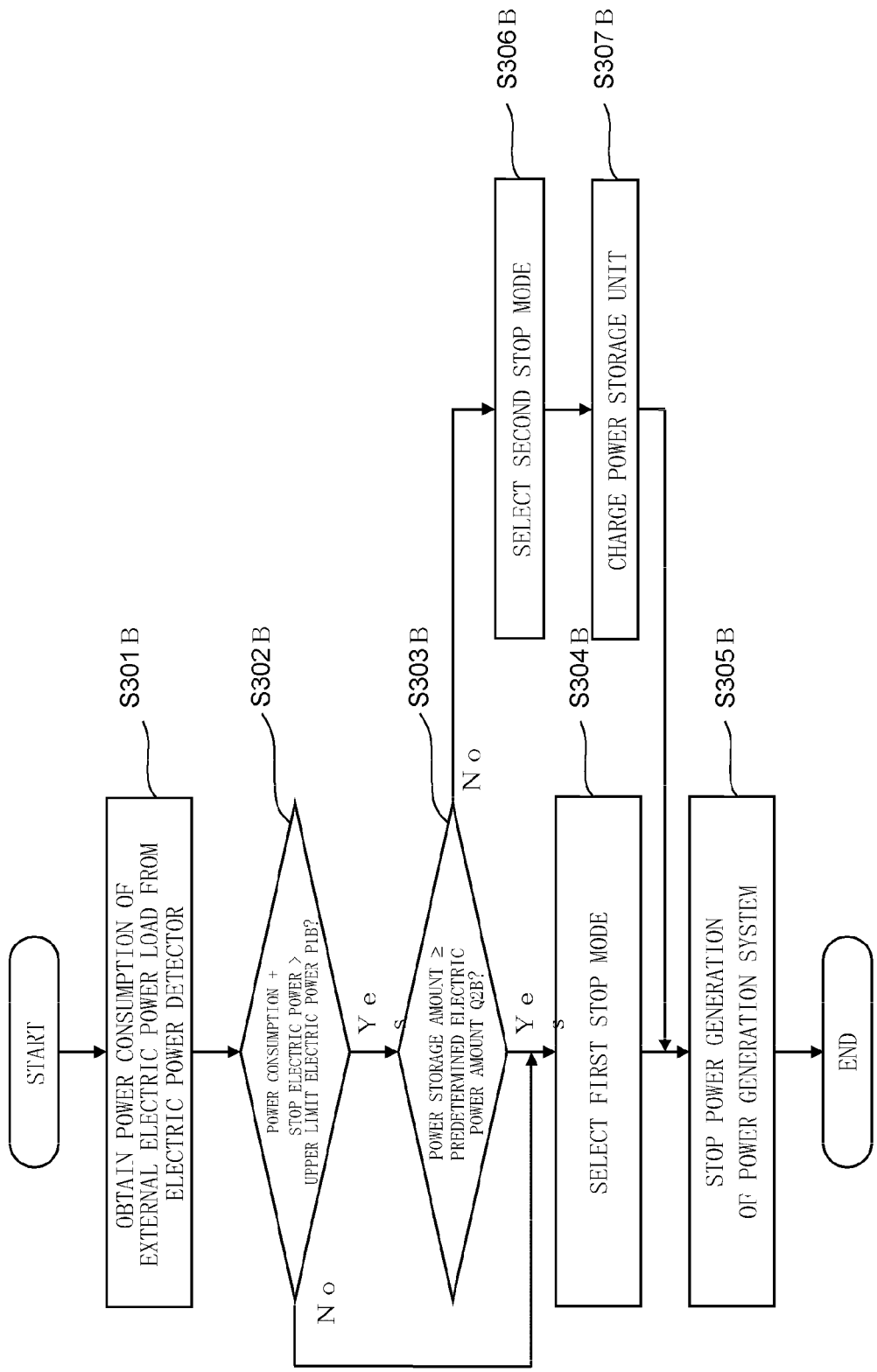

FIG. 8A is one example of a flow chart schematically showing the operation executed when activating the power generation system in the power supply system of Modification Example 1.

As shown in FIG. 8A, the activation operation of the power generation system 101 in the power supply system 100 of Modification Example 1 is different from the activation operation of the power generation system 101 in the power supply system 100 according to Embodiment 3 regarding the operation executed when the second activation mode is selected.

Specifically, when the power storage amount of the power storage unit 107 is smaller than the predetermined electric power amount Q2 (No in Step S303), the controller 110 selects the second activation mode (Step S306). Next, the controller 110 causes the electric power control unit 108 of the power storage unit 107 to charge the power storage unit 107 (Step S307). With this, the electric power control unit 108 supplies the electric power from the electric power system 104 to the cells of the storage battery constituting the power storage unit 107 or the assembled batteries of the storage battery constituting the power storage unit 107 such that the supplied electric power does not exceed the upper limit electric power P1. Thus, the power storage unit 107 is charged.

Then, the controller 110 outputs the activation permission signal of the power generation system 101 to the control unit 103, and the control unit 103 starts the activation of the power generation system 101 (Step S305).

Next, the operation executed when stopping the power generation of the power supply system 100 of Modification Example 1 will be explained in reference to FIG. 8B.

FIG. 8B is one example of a flow chart schematically showing the operation executed when stopping the power generation of the power generation system in the power supply system of Modification Example 1.

As shown in FIG. 8B, the operation executed when stopping the power generation of the power generation system 101 in the power supply system 100 of Modification Example 1 is different from the operation executed when stopping the power generation of the power generation system 101 in the power supply system 100 according to Embodiment 3 regarding the operation executed when the second stop mode is selected.

Specifically, when the second stop mode is selected (Step S306B), the controller 110 causes the electric power control unit 108 of the power storage unit 107 to charge the power storage unit 107 (Step S307B). With this, the electric power control unit 108 supplies the electric power from the electric power system 104 to the cells of the storage battery constituting the power storage unit 107 or the assembled batteries of the storage battery constituting the power storage unit 107 such that the supplied electric power does not exceed the upper limit electric power P1B. Thus, the power storage unit 107 is charged.

The power supply system 100 of Modification Example 1 configured as above has the same operational advantages as the power supply system 100 according to Embodiment 3.

In the power supply system 100 of Modification Example 1, the controller 110 may be configured to execute at least one of the control operation of the power storage unit 107 when activating the power generation system 101 and the control operation of the power storage unit 107 when stopping the power generation of the power generation system 101. To be specific, the controller 110 may be configured to execute only one of the control operation of the power storage unit 107 when activating the power generation system 101 and the control operation of the power storage unit 107 when stopping the power generation of the power generation system 101 or may be configured to execute both the control operation of the power storage unit 107 when activating the power generation system 101 and the control operation of the power storage unit 107 when stopping the power generation of the power generation system 101.

Modification Example 2

In the power supply system of Modification Example 2 of the power supply system according to Embodiment 3, the controller is configured to switch to the first activation mode when the power storage amount of the power storage unit increases by charging.

In addition, in the power supply system of Modification Example 2, the controller may be configured to switch to the first stop mode when the power storage amount of the power storage unit increases by charging.

Figure 9:
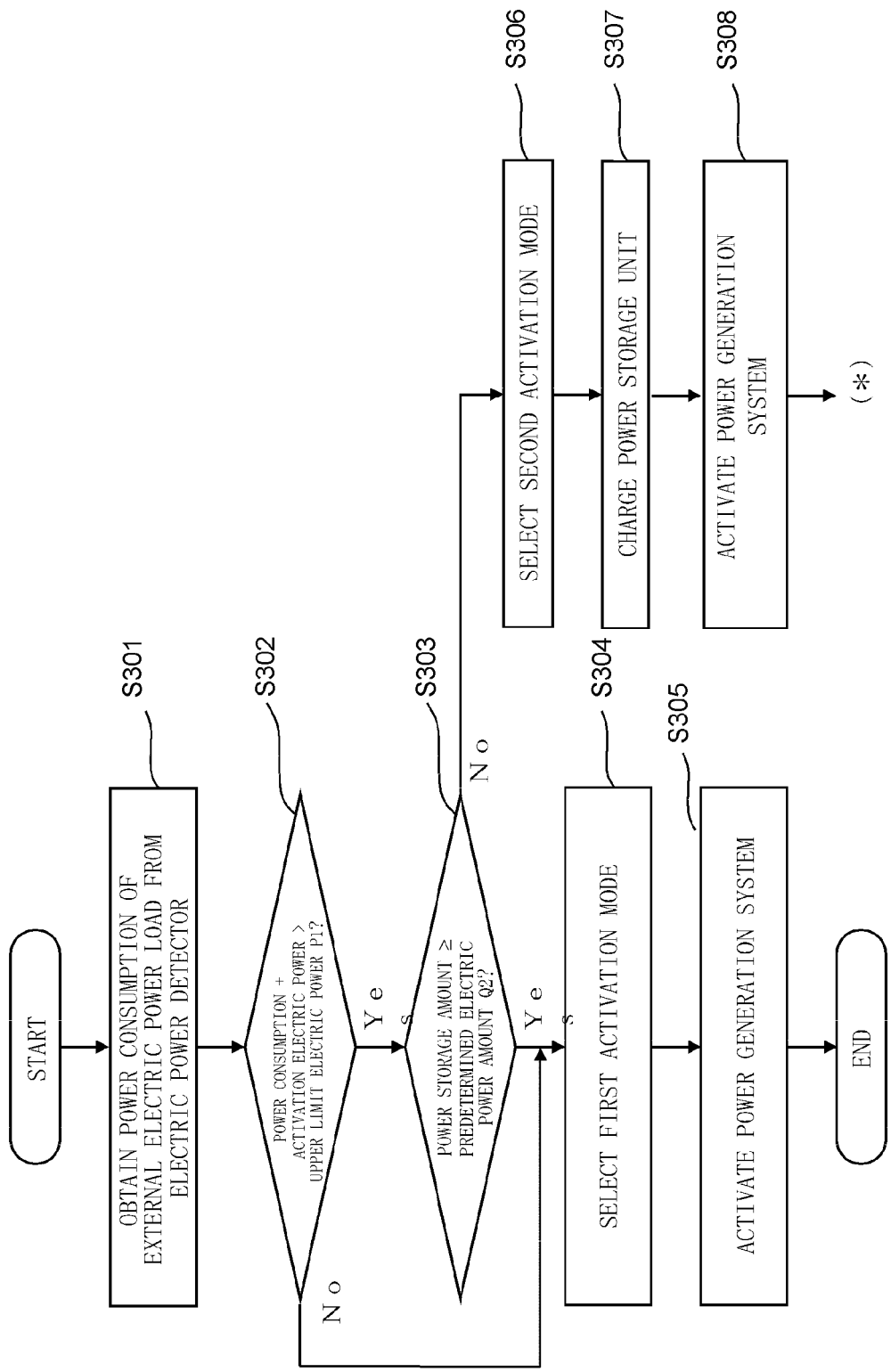
FIG. 9A is one example of a flow chart schematically showing the operation executed when activating the power generation system in the power supply system of Modification Example 2.
FIG. 9B is one example of a flow chart schematically showing the operation executed when activating the power generation system in the power supply system of Modification Example 2.
FIG. 9C is one example of a flow chart schematically showing the operation executed when stopping the power generation of the power generation system in the power supply system of Modification Example 2.
FIG. 9D is one example of a flow chart schematically showing the operation executed when stopping the power generation of the power generation system in the power supply system of Modification Example 2.
Figure 9:
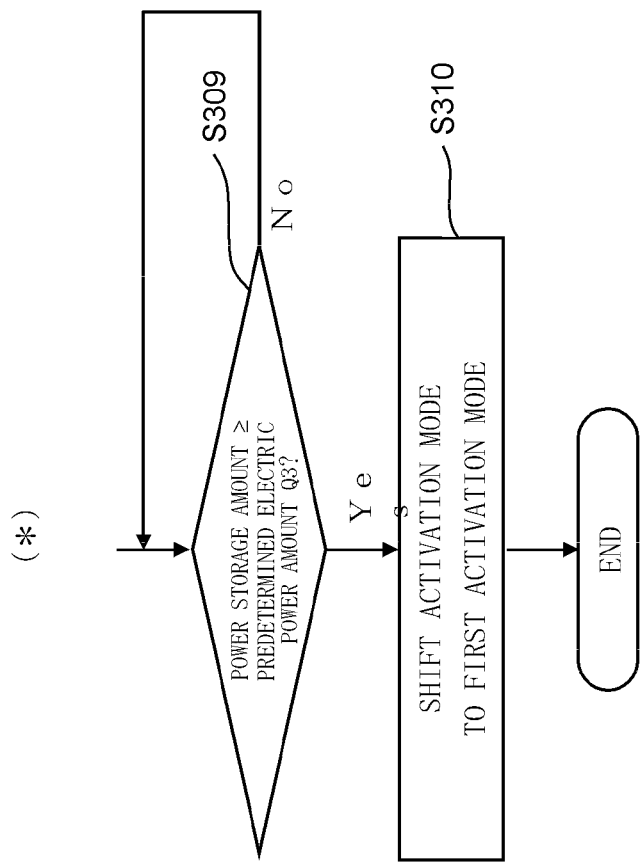

Each of FIGS. 9A and 9B is one example of a flow chart schematically showing the operation executed when activating the power generation system in the power supply system of Modification Example 2.

As shown in FIGS. 9A and 9B, the activation operation of the power generation system 101 in the power supply system 100 of Modification Example 2 is different from the activation operation of the power generation system 101 in the power supply system 100 according to Embodiment 3 regarding the operation executed when the second activation mode is selected. Specifically, the activation operation of the power generation system 101 in the power supply system 100 of Modification Example 2 is the same as the activation operation of the power generation system 101 in the power supply system 100 of Modification Example 1 up to the step (Step S308) in which the controller 110 outputs the activation permission signal of the power generation system 101 and activates the power generation system 101.

In the power supply system 100 of Modification Example 2, the controller 110 outputs an activation start command of the power generation system 101 in Step S308 and then determines whether or not the power storage amount of the power storage unit 107 is equal to or larger than a predetermined electric power amount Q3 (Step S309).

Then, when the power storage amount of the power storage unit 107 is equal to or larger than the predetermined electric power amount Q3 (Yes in Step S309), the controller 110 commands the control unit 103 that the control unit 103 shifts the activation mode of the power generation system 101 to the first activation mode (Step S310).

With this, the control unit 103 shifts the activation mode of the power generation system 101 from the second activation mode to the first activation mode. When the activation mode shifts to the first activation mode, for example, the operation amount of the electrically-operated auxiliary device that is the internal electric power load may be increased by the control unit 103.

The predetermined electric power amount Q3 may be set arbitrarily. For example, the predetermined electric power amount Q3 may be an electric power amount necessary to switch the activation mode of the power generation system 101 to the first activation mode and continue the activation operation. The electric power amount necessary to continue the activation operation by the first activation mode may be, for example, a cumulative power consumption amount consumed by the internal electric power load in a period until the completion of the activation operation continuously executed by the first activation mode.

The power supply system 100 (the controller 110 of the power supply system 100) of Modification Example 2 configured as above has the same operational advantages as the power supply system 100 (the controller 110 of the power supply system 100) according to Embodiment 3. Moreover, in the power supply system 100 (the controller 110 of the power supply system 100) of Modification Example 2, when the power storage unit 107 is charged and the power storage amount of the power storage unit 107 becomes equal to or larger than a predetermined electric power amount, the activation mode shifts to the first activation mode. Therefore, an activation time of the power generation system 101 of the power supply system 100 (the controller 110 of the power supply system 100) of Modification Example 2 can be made shorter than that of the power supply system 100 (the controller 110 of the power supply system 100) according to Embodiment 3.

Next, the operation executed when stopping the power generation of the power supply system 100 of Modification Example 2 will be explained in reference to FIGS. 9C and 9D.

Figure 9C:
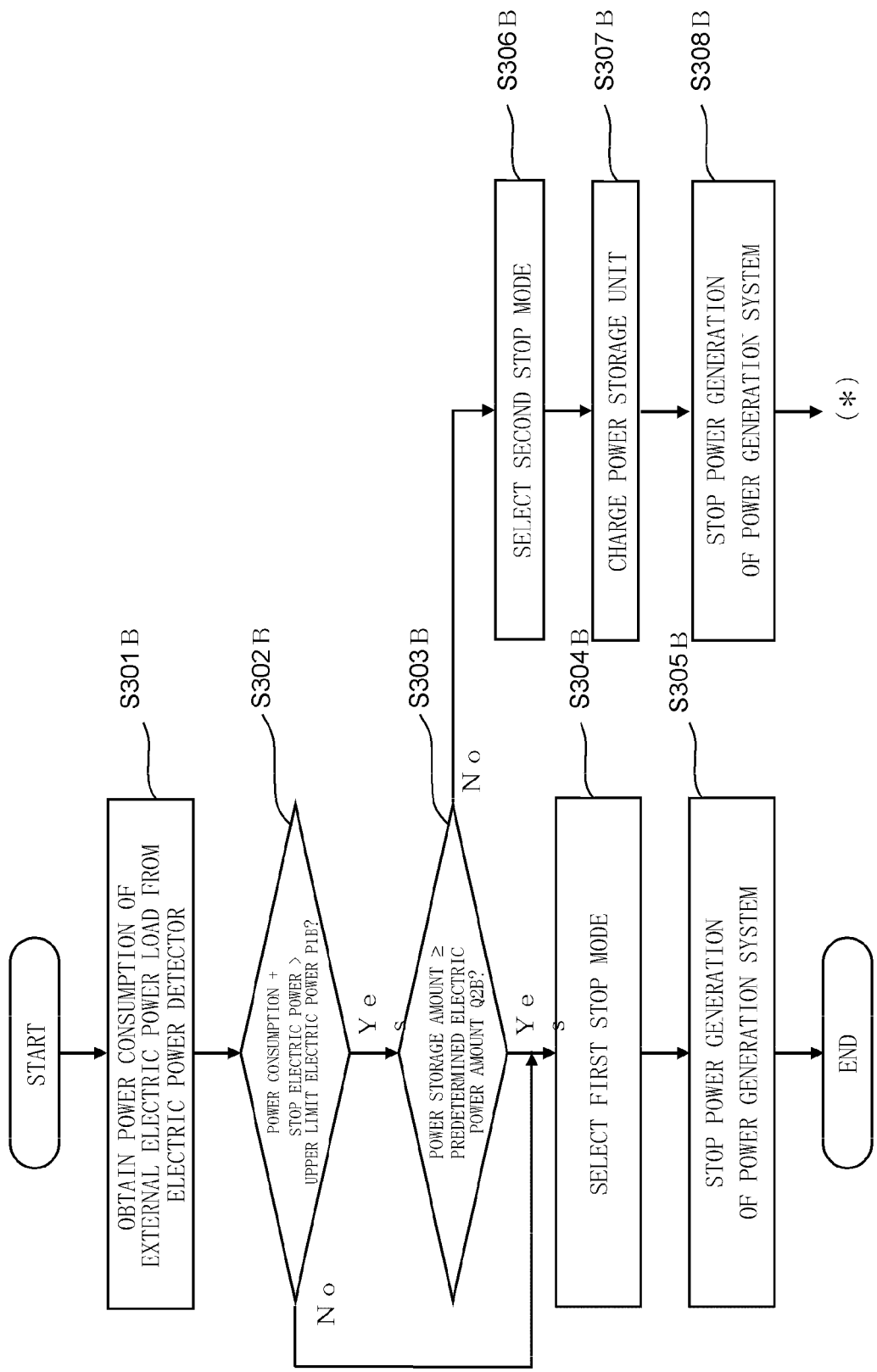
Figure 9D:
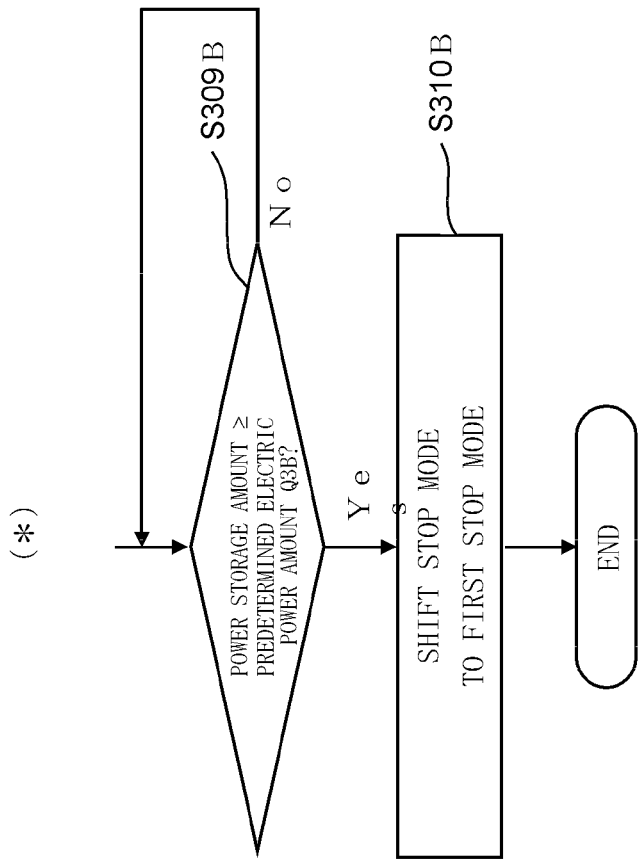

Each of FIGS. 9C and 9D is one example of a flow chart schematically showing the operation executed when stopping the power generation of the power generation system in the power supply system of Modification Example 2.

As shown in FIGS. 9C and 9D, the operation executed when stopping the power generation of the power generation system 101 in the power supply system 100 of Modification Example 2 is different from the operation executed when stopping the power generation of the power generation system 101 in the power supply system 100 according to Embodiment 3 regarding the operation executed when the second stop mode is selected.

Specifically, the operation executed when stopping the power generation of the power generation system 101 in the power supply system 100 of Modification Example 2 is the same as the operation executed when stopping the power generation of the power generation system 101 in the power supply system 100 of Modification Example 1 up to the step (Step S308B) in which the controller 110 outputs a signal for permitting the power generation stop of the power generation system 101 and stops the power generation of the power generation system 101.

In the power supply system 100 of Modification Example 2, the controller 110 outputs a command for stopping the power generation of the power generation system 101 in Step S308B and determines whether or not the power storage amount of the power storage unit 107 is equal to or larger than the predetermined electric power amount QB3 (Step S309B).

Then, when the power storage amount of the power storage unit 107 is equal to or larger than the predetermined electric power amount Q3B (Yes in Step S309B), the controller 110 commands the control unit 103 that the control unit 103 shifts the stop mode of the power generation system 101 to the first stop mode (Step S310B).

With this, the control unit 103 switches the stop mode of the power generation system 101 from the second stop mode to the first stop mode. When the stop mode shifts to the first stop mode, for example, the operation amount of the electrically-operated auxiliary device that is the internal electric power load is increased by the control unit 103.

The predetermined electric power amount Q3B may be set arbitrarily. For example, the predetermined electric power amount Q3B may be an electric power amount necessary to switch the stop mode of the power generation system 101 to the first stop mode and continue the processing operation executed after the power generation stop. The electric power amount necessary to continue the processing operation executed after the power generation stop by the first stop mode may be, for example, a cumulative power consumption amount consumed by the internal electric power load in a period until the completion of the processing operation executed after the power generation stop, the processing operation being continuously executed by the first stop mode.

As above, in the power supply system 100 (the controller 110 of the power supply system 100) of Modification Example 2, when the power storage unit 107 is charged and the power storage amount of the power storage unit 107 becomes equal to or larger than a predetermined electric power amount, the stop mode shifts to the first stop mode. Therefore, an execution time of the processing operation executed after the power generation stop of the power generation system 101 of the power supply system 100 (the controller 110 of the power supply system 100) of Modification Example 2 can be made shorter than that of the power supply system 100 (the controller 110 of the power supply system 100) according to Embodiment 3.

In the power supply system 100 of Modification Example 2, the controller 110 may be configured to execute at least one of the control operation of the power storage unit 107 when activating the power generation system 101 and the control operation of the power storage unit 107 when stopping the power generation of the power generation system 101. To be specific, the controller 110 may be configured to execute only one of the control operation of the power storage unit 107 when activating the power generation system 101 and the control operation of the power storage unit 107 when stopping the power generation of the power generation system 101 or may be configured to execute both the control operation of the power storage unit 107 when activating the power generation system 101 and the control operation of the power storage unit 107 when stopping the power generation of the power generation system 101.

Modification Example 3

In the power supply system of Modification Example 3 of the power supply system according to Embodiment 3, the controller is configured to switch to the first activation mode when the power consumption of the external electric power load decreases.

In addition, in the power supply system of Modification Example 3, the controller may be configured to switch to the first stop mode when the power consumption of the external electric power load decreases.

Figure 10A:
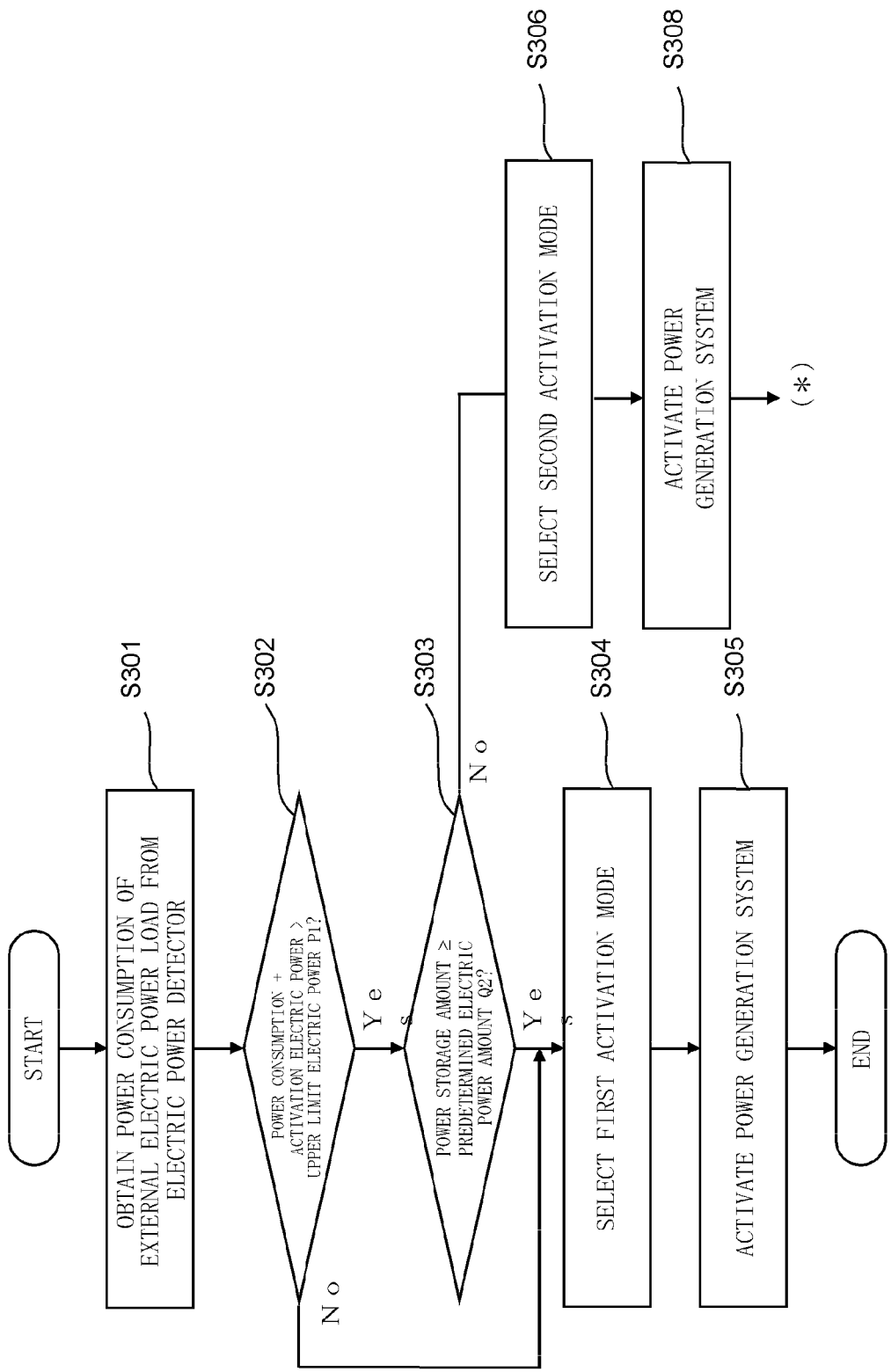
FIG. 10A is one example of a flow chart schematically showing the operation executed when activating the power generation system in the power supply system of Modification Example 3.
Figure 10B:
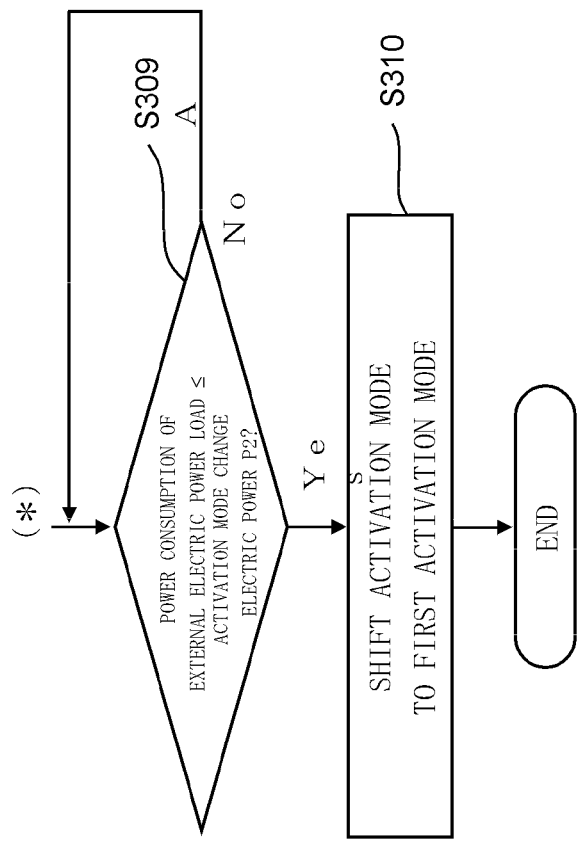
FIG. 10B is one example of a flow chart schematically showing the operation executed when activating the power generation system in the power supply system of Modification Example 3.

Each of FIGS. 10A and 10B is one example of a flow chart schematically showing the operation executed when activating the power generation system in the power supply system of Modification Example 3.

As shown in FIGS. 10A and 10B, the activation operation of the power generation system 101 in the power supply system 100 of Modification Example 3 is different from the activation operation of the power generation system 101 in the power supply system 100 according to Embodiment 3 regarding the operation executed when the second activation mode is selected. Specifically, the activation operation of the power generation system 101 in the power supply system 100 of Modification Example 3 is the same as the activation operation of the power generation system 101 in the power supply system 100 according to Embodiment 3 up to the step (Step S308) in which the controller 110 outputs the activation permission signal of the power generation system 101 and activates the power generation system 101.

In the power supply system 100 of Modification Example 3, the controller 110 outputs the activation start command of the power generation system 101 in Step S308 and then obtains from the electric power detector 106 the electric power (power consumption) consumed by the power generation system 101 and the external electric power load 105. Next, the controller 110 determines whether or not the power consumption of the external electric power load 105 in the obtained power consumption is equal to or higher than an activation mode change electric power P2 (Step S309A).

Here, the activation mode change electric power P2 is set as a power consumption value of the external electric power load 105, the power consumption value being a value which does not exceed the upper limit electric power P1 even if the activation operation is switched to the first activation mode. Specifically, the activation mode change electric power P2 is set as an electric power value that is smaller than a value obtained by subtracting the activation electric power of the first activation mode from the upper limit electric power P1.

It is preferable that the activation electric power of the first activation mode be a maximum value of the electric power consumed by the internal electric power load 102 after the activation mode is switched to the first activation mode. The power consumption of the external electric power load 105 can be calculated by subtracting the power consumption of the internal electric power load 102 of the power generation system 101 from the power consumption obtained by the electric power detector 106. However, a method of figuring out the power consumption of the internal electric power load 102 is optional. For example, the controller 110 may calculate the power consumption of the internal electric power load 102 based on a control value for the internal electric power load 102, the control value being obtained from the control unit 103 of the power generation system 101. Moreover, the controller 110 may obtain input electric power from an electric power detector, not shown, incorporated in the power generation system 101, the input electric power being input to the internal electric power load 102.

Then, when the power consumption of the external electric power load 105 becomes equal to or lower than the activation mode change electric power P2 (Yes in Step S309A), the controller 110 causes the control unit 103 to shift to the first activation mode (Step S310).

The power supply system 100 (the controller 110 of the power supply system 100) of Modification Example 3 configured as above has the same operational advantages as the power supply system 100 (the controller 110 of the power supply system 100) according to Embodiment 3. In the power supply system 100 (the controller 110 of the power supply system 100) of Modification Example 3, when the power consumption of the external electric power load 105 decreases, the activation mode is switched to the first activation mode. With this, the activation time of the power generation system 101 of the power supply system 100 (the controller 110 of the power supply system 100) of Modification Example 3 can be made shorter than that of the power supply system 100 (the controller 110 of the power supply system 100) according to Embodiment 3.

Next, the operation executed when stopping the power generation of the power supply system 100 of Modification Example 3 will be explained in reference to FIGS. 10C and 10D.

Figure 10C:
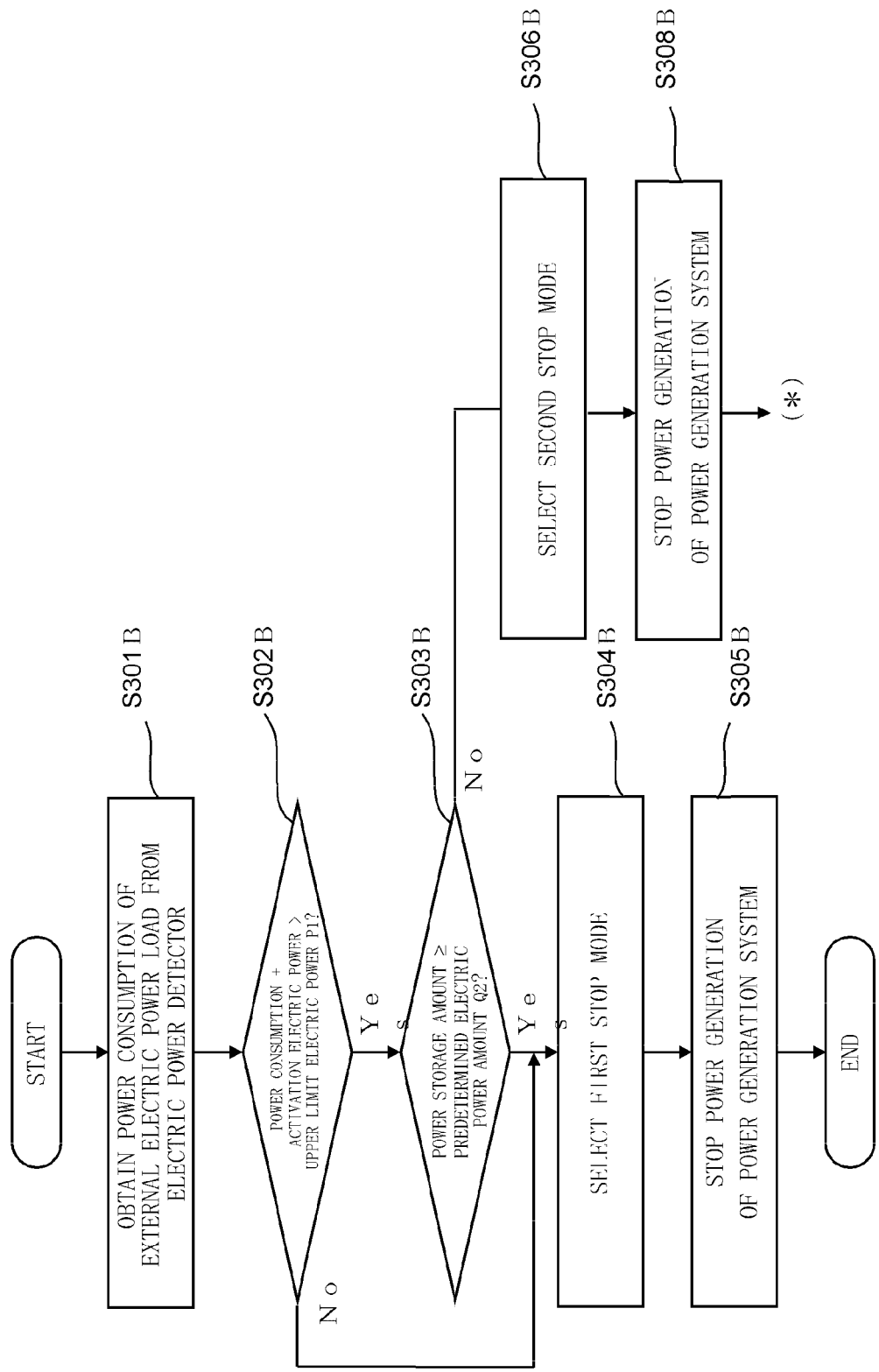
FIG. 10C is one example of a flow chart schematically showing the operation executed when stopping the power generation of the power generation system in the power supply system of Modification Example 3.
Figure 10D:
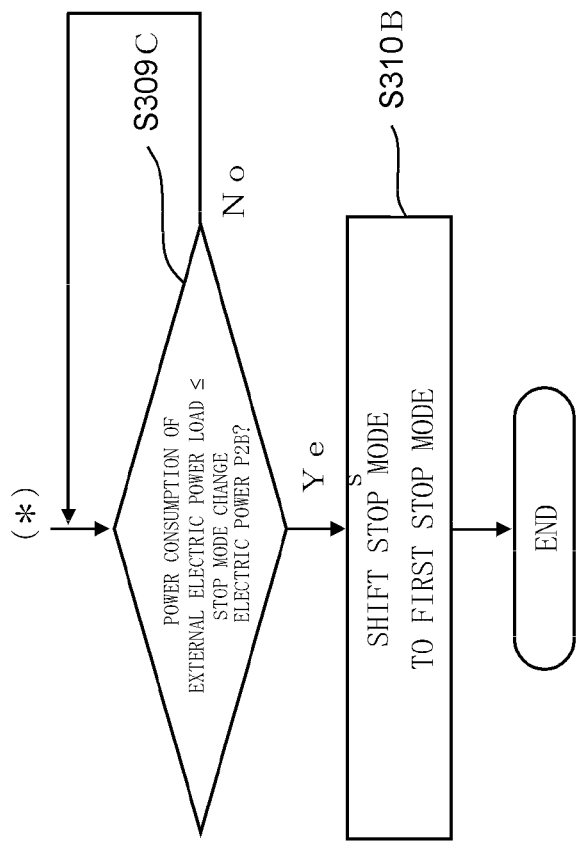
FIG. 10D is one example of a flow chart schematically showing the operation executed when stopping the power generation of the power generation system in the power supply system of Modification Example 3.

Each of FIGS. 10C and 10D is one example of a flow chart schematically showing the operation executed when stopping the power generation of the power generation system in the power supply system of Modification Example 3.

As shown in FIGS. 10C and 10D, the operation executed when stopping the power generation of the power generation system 101 in the power supply system 100 of Modification Example 3 is different from the operation executed when stopping the power generation of the power generation system 101 in the power supply system 100 according to Embodiment 3 regarding the operation executed when the second stop mode is selected.

Specifically, the operation executed when stopping the power generation of the power generation system 101 in the power supply system 100 of Modification Example 3 is the same as the operation executed when stopping the power generation of the power generation system 101 in the power supply system 100 according to Embodiment 3 up to the step (Step S308B) in which the controller 110 outputs a signal for permitting the power generation stop of the power generation system 101 and stops the power generation of the power generation system 101.

In the power supply system 100 of Modification Example 3, the controller 110 outputs a command for permitting the power generation stop of the power generation system 101 in Step S308B and then obtains from the electric power detector 106 the electric power (power consumption) consumed by the power generation system 101 and the external electric power load 105. Next, the controller 110 determines whether or not the power consumption of the external electric power load 105 in the obtained power consumption is equal to or higher than a stop mode change electric power P2B (Step S309C).

Here, the stop mode change electric power P2B is set as a power consumption value of the external electric power load 105, the power consumption value being a value which does not exceed the upper limit electric power P1B even if the processing operation executed after the power generation stop is switched to the first stop mode. Specifically, the stop mode change electric power P2B is set as an electric power value that is smaller than a value obtained by subtracting the stop electric power of the first stop mode from the upper limit electric power P1B. It is preferable that the stop electric power of the first stop mode be a maximum value of the electric power consumed by the internal electric power load 102 after the stop mode is switched to the first stop mode.

Then, when the power consumption of the external electric power load 105 becomes equal to or lower than the stop mode change electric power P2B (Yes in Step S309C), the controller 110 causes the control unit 103 to shift to the first stop mode (Step S310B).

As above, in the power supply system 100 (the controller 110 of the power supply system 100) of Modification Example 3, when the power storage unit 107 is charged and the power storage amount of the power storage unit 107 becomes equal to or larger than a predetermined electric power amount, the stop mode is switched to the first stop mode. Therefore, the execution time of the processing operation executed after the power generation stop of the power generation system 101 of the power supply system 100 (the controller 110 of the power supply system 100) of Modification Example 3 can be made shorter than that of the power supply system 100 (the controller 110 of the power supply system 100) according to Embodiment 3.

In the power supply system 100 of Modification Example 3, the controller 110 may be configured to execute at least one of the control operation of the power storage unit 107 when activating the power generation system 101 and the control operation of the power storage unit 107 when stopping the power generation of the power generation system 101. To be specific, the controller 110 may be configured to execute only one of the control operation of the power storage unit 107 when activating the power generation system 101 and the control operation of the power storage unit 107 when stopping the power generation of the power generation system 101 or may be configured to execute both the control operation of the power storage unit 107 when activating the power generation system 101 and the control operation of the power storage unit 107 when stopping the power generation of the power generation system 101.

Embodiment 4

In the power supply system according to Embodiment 4, the controller is configured to determine, based on the electric power which can be supplied from the power storage unit, whether to permit or deny the activation of the power generation system. Here, the expression "based on the electric power which can be supplied from the power storage unit" denotes "based on whether or not the electric power obtained by subtracting the electric power which can be supplied by the power storage unit from the sum of the power consumption of the external electric power load and the activation electric power of the power generation system is equal to or lower than the upper limit electric power.

In addition, in the power supply system according to Embodiment 4, the controller may be configured to determine, based on the electric power which can be supplied from the power storage unit, whether to permit or deny the stop of the power generation of the power generation system.

Since the power supply system 100 according to Embodiment 4 is the same in basic configuration as the power supply system 100 according to Embodiment 1, an explanation of the configuration thereof is omitted.

Figure 11A:
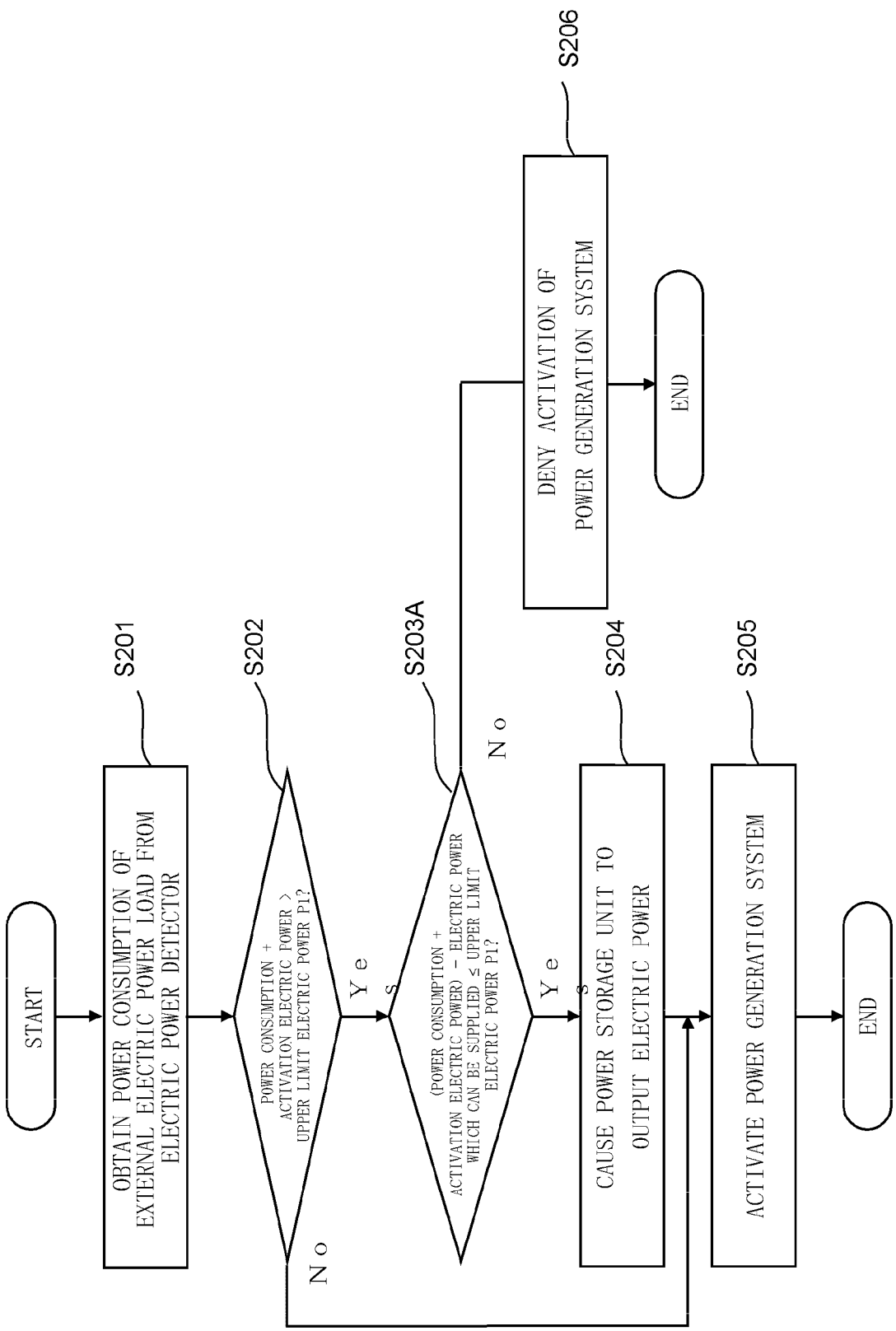
FIG. 11A is one example of a flow chart schematically showing the operation executed when activating the power generation system in the power supply system according to Embodiment 4.

FIG. 11A is one example of a flow chart schematically showing the operation executed when activating the power generation system in the power supply system according to Embodiment 4.

As shown in FIG. 11A, in the activation operation of the power generation system 101 in the power supply system 100 according to Embodiment 4, Step S203A is executed instead of Step S203 in the activation operation of the power generation system 101 in the power supply system 100 according to Embodiment 2.

Specifically, when the sum of the power consumption and the activation electric power exceeds the upper limit electric power P1 (Yes in Step S202), the controller 110 determines whether or not the electric power obtained by subtracting the electric power which can be supplied by the power storage unit 107 from the sum of the power consumption of the external electric power load 105 and the activation electric power of the power generation system 101 (to be specific, power consumption+activation electric power–electric power which can be supplied) is equal to or lower than the upper limit electric power P1 (Step S203A). The electric power which can be supplied from the power storage unit 107 is prestored in the storage portion of the controller 200.

When the electric power obtained by subtracting the electric power which can be supplied by the power storage unit 107 from the sum of the power consumption and the activation electric power is equal to or lower than the upper limit electric power P1 (Yes in Step S203A), the controller 110 causes the electric power control unit 108 of the power storage unit 107 to output the electric power from the power storage unit 107 (Step S204). In contrast, when the electric power obtained by subtracting the electric power which can be supplied by the power storage unit 107 from the sum of the power consumption and the activation electric power is higher than the upper limit electric power P1 (No in Step S203A), the controller 110 denies the activation of the power generation system 101 (Step S206).

When the activation of the power generation system 101 is denied in Step S206, the power supply system 100 (the controller 110 of the power supply system 100) according to Embodiment 4 stops the flow shown in FIG. 10. However, the present embodiment is not limited to this. The power supply system 100 (the controller 110 of the power supply system 100) according to Embodiment 4 may return to Step S201 and repeat the above flow until the power generation system is activated in Step S205 (to be specific, may cause the power generation system 101 to stand by for the activation).

The power supply system 100 (the controller 110 of the power supply system 100) according to Embodiment 4 configured as above has the same operational advantages as the power supply system 100 (the controller 110 of the power supply system 100) according to Embodiment 2. Moreover, when the upper limit electric power P1 or lower cannot be realized by the output electric power output from the power storage unit 107, the power generation system 101 is not activated. Therefore, the activation operation of the power generation system 101 is prevented from being stopped. To be specific, the activation performance of the power supply system 100 (the controller 110 of the power supply system 100) according to Embodiment 4 improves more than that of the power supply system 100 (the controller 110 of the power supply system 100) according to Embodiment 2.

Next, the operation executed when stopping the power generation of the power supply system 100 according to Embodiment 4 will be explained in reference to FIG. 11B.

Figure 11B:
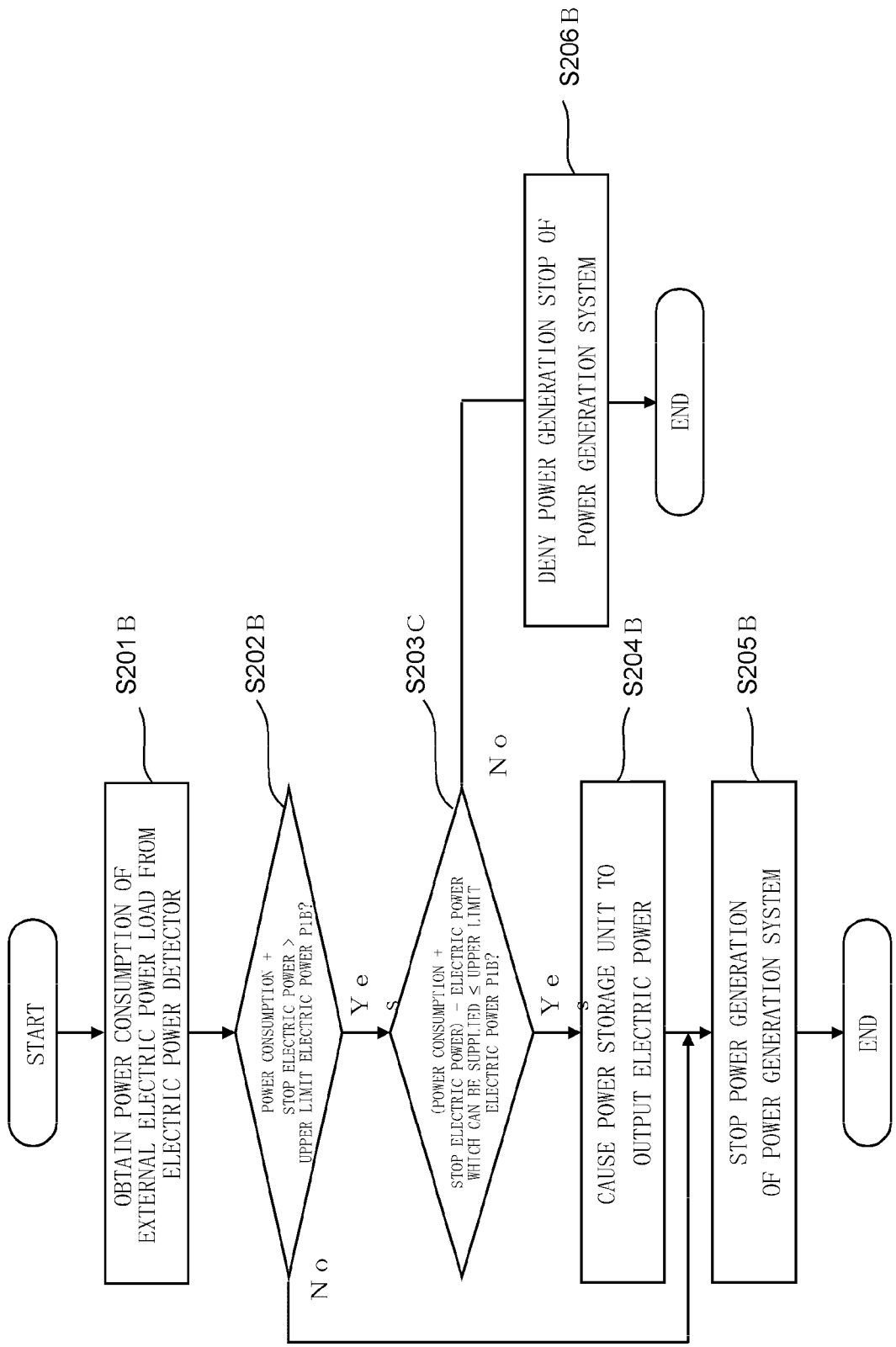
FIG. 11B is one example of a flow chart schematically showing the operation executed when stopping the power generation of the power generation system in the power supply system according to Embodiment 4.

FIG. 11B is one example of a flow chart schematically showing the operation executed when stopping the power generation of the power generation system in the power supply system according to Embodiment 4.

As shown in FIG. 11B, the operation executed when stopping the power generation of the power generation system 101 in the power supply system 100 according to Embodiment 4 is basically the same as the operation executed when stopping the power generation of the power generation system 101 in the power supply system 100 according to Embodiment 2 but is different from the operation executed when stopping the power generation of the power generation system 101 in the power supply system 100 according to Embodiment 2 in that Step S203C is executed instead of Step S203B in the operation executed when stopping the power generation of the power generation system 101 in the power supply system 100 according to Embodiment 2.

Specifically, in Step S203C, the controller 110 determines whether or not the electric power obtained by subtracting the electric power which can be supplied by the power storage unit 107 from the sum of the power consumption of the external electric power load 105 and the stop electric power of the power generation system 101 (to be specific, power consumption+stop electric power−electric power which can be supplied) is equal to or lower than the upper limit electric power P1B. With this, when the upper limit electric power P1B or lower can be realized by the output electric power output from the power storage unit 107, the power generation of the power generation system 101 is stopped, and the subsequent processing operation is executed.

As above, in the power supply system 100 (the controller 110 of the power supply system 100) according to Embodiment 4, when the upper limit electric power P1B or lower can be realized by the output electric power output from the power storage unit 107, the power generation of the power generation system 101 is stopped, and the subsequent processing operation is executed. Therefore, the stop performance of the power supply system 100 (the controller 110 of the power supply system 100) according to Embodiment 4 improves more than that of the power supply system 100 (the controller 110 of the power supply system 100) according to Embodiment 2.

In the power supply system 100 according to Embodiment 4, the controller 110 may be configured to execute at least one of the control operation of the power storage unit 107 when activating the power generation system 101 and the control operation of the power storage unit 107 when stopping the power generation of the power generation system 101. To be specific, the controller 110 may be configured to execute only one of the control operation of the power storage unit 107 when activating the power generation system 101 and the control operation of the power storage unit 107 when stopping the power generation of the power generation system 101 or may be configured to execute both the control operation of the power storage unit 107 when activating the power generation system 101 and the control operation of the power storage unit 107 when stopping the power generation of the power generation system 101.

Embodiment 5

In the power supply system according to Embodiment 5, the controller is configured to switch, based on the electric power which can be supplied from the power storage unit, the activation mode of the power generation system between the first activation mode in which the activation electric power is relatively high and the second activation mode in which the activation electric power is relatively low.

In addition, in the power supply system according to Embodiment 5, the controller may be configured to switch, based on the electric power which can be supplied from the power storage unit, the stop mode of the power generation system between the first stop mode in which the stop electric power is relatively high and the second stop mode in which the stop electric power is relatively low.

Since the power supply system 100 according to Embodiment 5 is the same in basic configuration as the power supply system 100 according to Embodiment 1, an explanation of the configuration thereof is omitted.

Figure 12A:
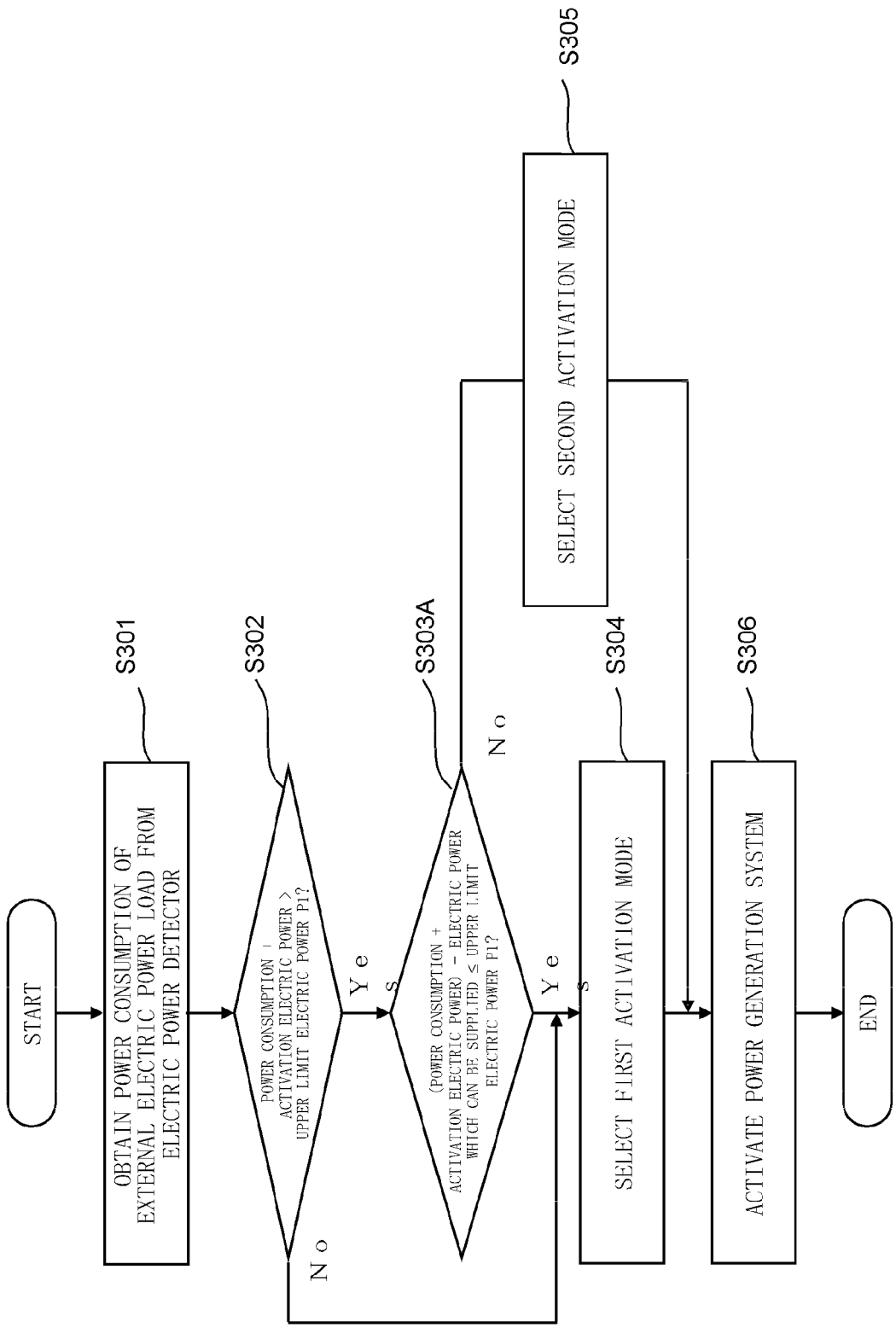
FIG. 12A is one example of the flow chart schematically showing the operation executed when activating the power generation system in the power supply system according to Embodiment 5.

FIG. 12A is one example of a flow chart schematically showing the operation executed when activating the power generation system in the power supply system according to Embodiment 5.

As shown in FIG. 12A, as with the power supply system 100 according to Embodiment 3, when the power generation system 101 is about to be activated, the controller 110 obtains from the electric power detector 106 the electric power (power consumption) consumed by the external electric power load 105 (Step S301).

Next, the controller 110 determines whether or not the sum of the power consumption of the external electric power load 105 obtained in Step S301 and the activation electric power of the power generation system 101 exceeds the consumable upper limit electric power P1 supplied from the electric power system 104 (Step S302). Then, when the sum of the power consumption and the activation electric power exceeds the upper limit electric power P1 (Yes in Step S302), the controller 110 determines whether or not the electric power obtained by subtracting the electric power which can be supplied by the power storage unit 107 from the sum of the power consumption of the external electric power load 105 and the activation electric power of the power generation system 101 (to be specific, power consumption+activation electric power−electric power which can be supplied) is equal to or lower than the upper limit electric power P1 (Step S303A). As with Step S302, used as the activation electric power in Step S303A is the activation electric power used when the power generation system 101 is activated by the first activation mode.

When the electric power obtained by subtracting the electric power which can be supplied by the power storage unit 107 from the sum of the power consumption of the external electric power load 105 and the activation electric power of the power generation system 101 is equal to or lower than the upper limit electric power P1 (Yes in Step S303A), the controller 110 selects the first activation mode (Step S304). In contrast, when the electric power obtained by subtracting the electric power which can be supplied by the power storage unit 107 from the sum of the power consumption of the external electric power load 105 and the activation electric power of the power generation system 101 is higher than the upper limit electric power P1 (No in Step S303A), the controller 110 selects the second activation mode (Step S305).

The power supply system 100 (the controller 110 of the power supply system 100) according to Embodiment 5 configured as above has the same operational advantages as the power supply system 100 (the controller 110 of the power supply system 100) according to Embodiment 4. Moreover, in the power supply system 100 (the controller 110 of the power supply system 100) according to Embodiment 5, even if the upper limit electric power P1 or lower is not realized even by utilizing the output electric power output from the power storage unit 107, the power generation system 101 is activated by the second activation mode in which the activation electric power is relatively low. Therefore, the activation performance of the power supply system 100 (the controller 110 of the power supply system 100) according to Embodiment 5 improves more than that of the power supply system 100 (the controller 110 of the power supply system 100) according to Embodiment 4.

Next, the operation executed when stopping the power generation of the power supply system 100 according to Embodiment 5 will be explained in reference to FIG. 12B.

Figure 12B:
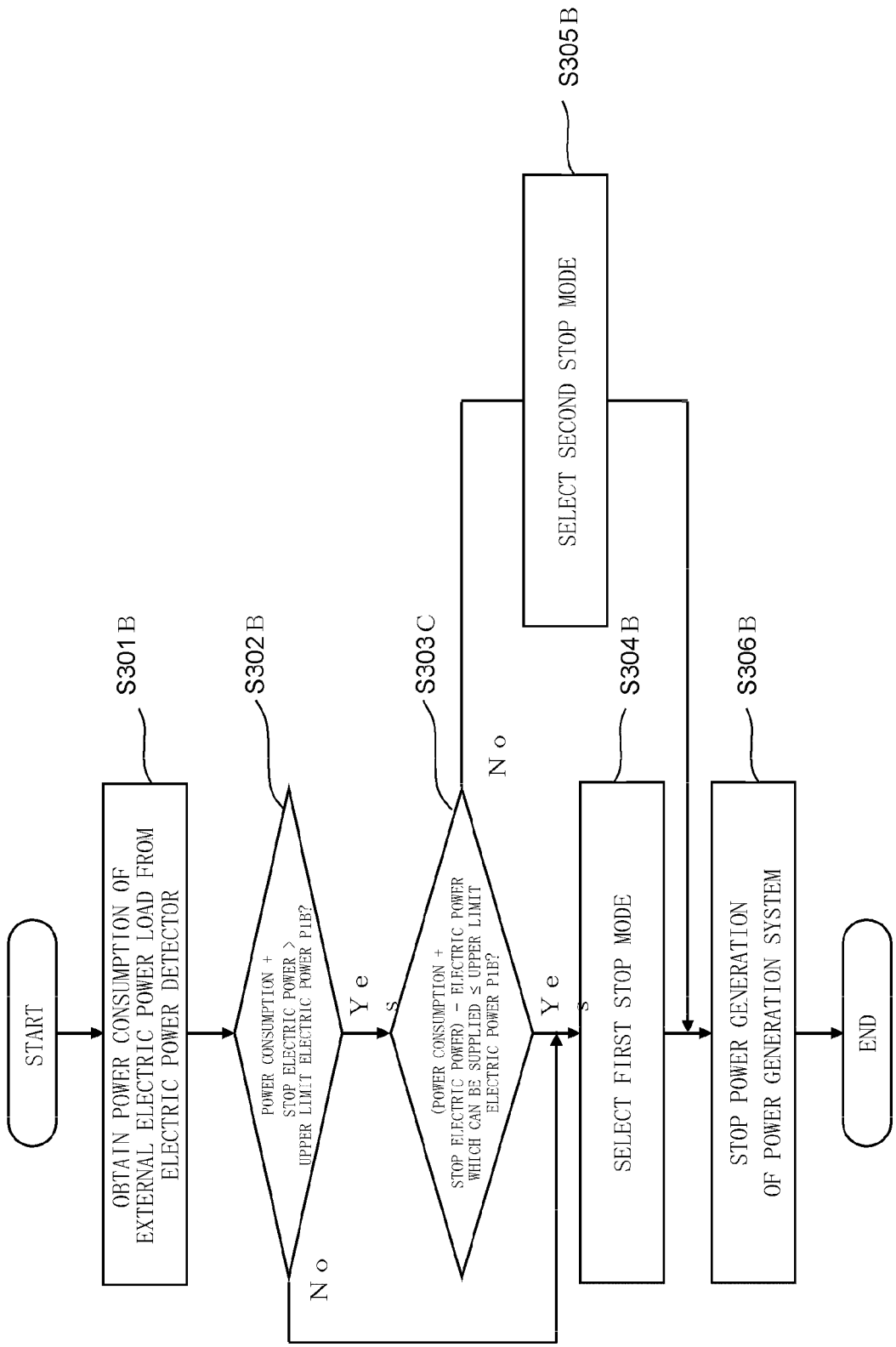
FIG. 12B is one example of a flow chart schematically showing the operation executed when stopping the power generation of the power generation system in the power supply system according to Embodiment 5.

FIG. 12B is one example of a flow chart schematically showing the operation executed when stopping the power generation of the power generation system in the power supply system according to Embodiment 5.

As shown in FIG. 12B, the operation executed when stopping the power generation of the power generation system 101 in the power supply system 100 according to Embodiment 5 is basically the same as the operation executed when stopping the power generation of the power generation system 101 in the power supply system 100 according to Embodiment 3 but is different from the operation executed when stopping the power generation of the power generation system 101 in the power supply system 100 according to Embodiment 3 in that Step S303C is executed instead of Step S303B in the operation executed when stopping the power generation of the power generation system 101 in the power supply system 100 according to Embodiment 3.

Specifically, in Step S303C, the controller 110 determines whether or not the electric power obtained by subtracting the electric power which can be supplied by the power storage unit 107 from the sum of the power consumption of the external electric power load 105 and the stop electric power of the power generation system 101 (to be specific, power consumption+stop electric power–electric power which can be supplied) is equal to or lower than the upper limit electric power P1B. With this, when the upper limit electric power P1B or lower can be realized by the output electric power output from the power storage unit 107, the processing operation executed after the power generation stop of the power generation system 101 is executed by the first stop mode. In contrast, when the upper limit electric power P1B or lower cannot be realized by the output electric power output from the power storage unit 107, the processing operation executed after the power generation stop of the power generation system 101 is executed by the second stop mode.

As above, in the power supply system 100 (the controller 110 of the power supply system 100) according to Embodiment 5, even if the upper limit electric power P1B or lower is not realized even by utilizing the output electric power output from the power storage unit 107, the processing operation executed after the power generation stop is executed by the second stop mode in which the stop electric power is relatively low. Therefore, the stop performance of the power supply system 100 according to Embodiment 5 improves more than that of the power supply system 100 according to Embodiment 4.

In the power supply system 100 according to Embodiment 5, the controller 110 may be configured to execute at least one of the control operation of the power storage unit 107 when activating the power generation system 101 and the control operation of the power storage unit 107 when stopping the power generation of the power generation system 101. To be specific, the controller 110 may be configured to execute only one of the control operation of the power storage unit 107 when activating the power generation system 101 and the control operation of the power storage unit 107 when stopping the power generation of the power generation system 101 or may be configured to execute both the control operation of the power storage unit 107 when activating the power generation system 101 and the control operation of the power storage unit 107 when stopping the power generation of the power generation system 101.

Embodiment 6

In the power supply system according to Embodiment 6, the controller is configured to execute at least one of the first control operation in which in a case where it is predicted that the sum of the activation electric power of the power generation system and the power consumption of the external electric power load exceeds the upper limit electric power receivable from the electric power system when activating the power generation system, the electric power of the power storage unit is supplied to at least one of the power generation system and the external electric power load such that the electric power supplied from the electric power system does not exceed the upper limit electric power and the second control operation in which in a case where it is predicted that the sum of the stop electric power of the power generation system and the power consumption of the external electric power load exceeds the upper limit electric power receivable from the electric power system when stopping the power generation of the power generation system, the electric power of the power storage unit is supplied to at least one of the power generation system and the external electric power load such that the electric power supplied from the electric power system does not exceed the upper limit electric power.

Embodiment 6 will explain a case where the expression "when activating the power generation system" denotes "when the activation operation of the power generation system is being executed". Similarly, Embodiment 6 will explain a case where the expression "when stopping the power generation system" denotes "when the processing operation executed after the power generation stop of the power generation system is being executed".

In Embodiment 6, the prediction regarding whether or not the sum of the activation electric power of the power generation system and the power consumption of the external electric power load exceeds the upper limit electric power receivable from the electric power system when activating the power generation system is executed as below.

To be specific, the above is predicted in such a manner that when the activation operation of the power generation system is being executed, the electric power detector detects the power consumption of the power generation system and the power consumption of the external electric power load, and the controller determines whether or not the sum of the power consumption of the power generation system and the power consumption of the external electric power load detected by the electric power detector (the sum of the activation electric power of the power generation system and the power consumption of the external electric power load) exceeds the upper limit electric power receivable from the electric power system.

Similarly, in Embodiment 6, the prediction regarding whether or not the sum of the activation electric power of the power generation system and the power consumption of the external electric power load exceeds the upper limit electric power receivable from the electric power system when stopping the power generation system is executed as below.

To be specific, the above is predicted in such a manner that when the processing operation executed after the power generation stop of the power generation system is being executed, the electric power detector detects the power consumption of the power generation system and the power consumption of the external electric power load, and the controller determines whether or not the sum of the power consumption of the power generation system and the power consumption of the external electric power load detected by the electric power detector (the sum of the stop electric power of the power generation system and the power consumption of the external electric power load) exceeds the upper limit electric power receivable from the electric power system.

The power consumption of the power generation system is specifically the power consumption of the internal electric power load of the power generation system. Moreover, the prediction by the controller regarding whether or not the sum of the activation electric power of the power generation system and the power consumption of the external electric power load exceeds the upper limit electric power receivable from the electric power system may be executed based, for example, on an increased amount of the power consumption of the internal electric power load and an increased amount of the power consumption of the external electric power load or on a past use history, and may be executed in any manner as long as the prediction can be executed.

Similarly, the prediction by the controller regarding whether or not the sum of the stop electric power of the power generation system and the power consumption of the external electric power load exceeds the upper limit electric power receivable from the electric power system may be executed based, for example, on the increased amount of the power consumption of the internal electric power load and the increased amount of the power consumption of the external electric power load or on the past use history, and may be executed in any manner as long as the prediction can be executed.

Since the power supply system 100 according to Embodiment 6 is the same in basic configuration as the power supply system 100 according to Embodiment 1, an explanation of the configuration thereof is omitted.

Figure 13A:
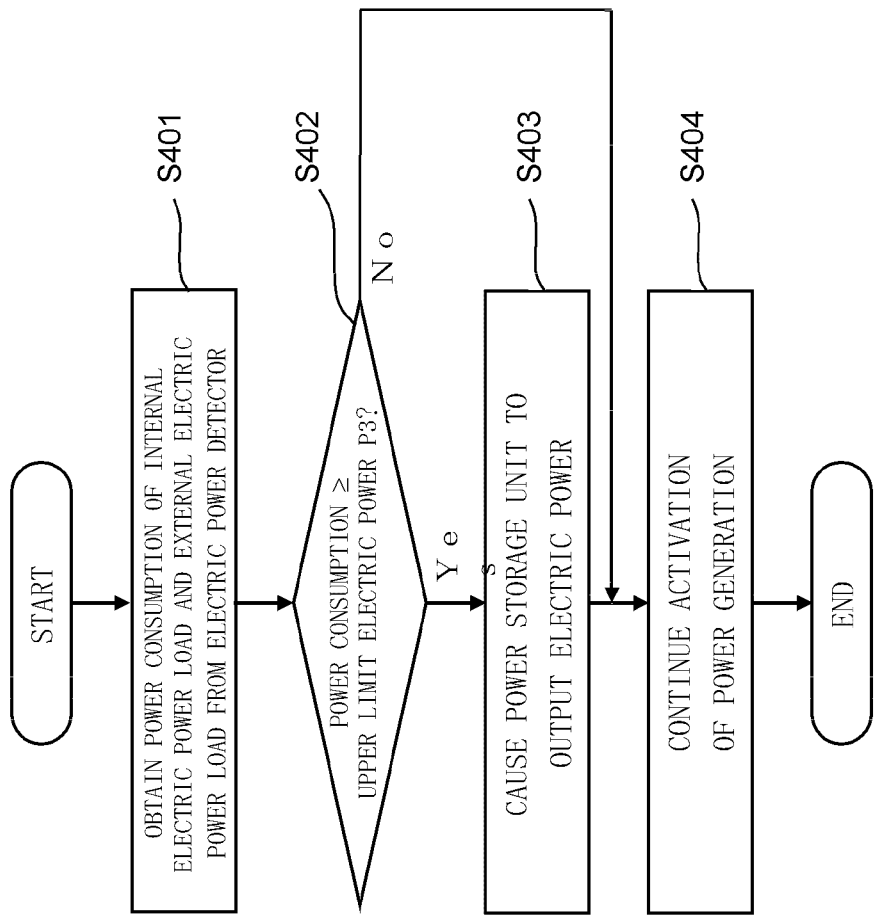
FIG. 13A is one example of a flow chart schematically showing the operation executed when activating the power generation system in the power supply system according to Embodiment 6.

FIG. 13A is one example of a flow chart schematically showing the operation executed when activating the power generation system in the power supply system according to Embodiment 6.

First, when the power generation system 101 starts the activation and is executing the activation operation, as shown in FIG. 13A, the controller 110 obtains from the electric power detector 106 the electric power (power consumption) consumed by the power generation system 101 (specifically, the internal electric power load 102) and the external electric power load 105 (Step S401).

Next, the controller 110 determines whether or not the sum of the power consumption of the external electric power load 105 and the power consumption of the power generation system 101 obtained in Step S401 exceeds consumable upper limit electric power P3 supplied from the electric power system 104 (Step S402). When the sum of the power consumption and the activation electric power is equal to or high than the upper limit electric power P3 (Yes in Step S402), the controller 110 proceeds to Step S403. When the above sum is lower than the upper limit electric power P3 (No in Step S402), the controller 110 proceeds to Step S404. Here, it is preferable that the upper limit electric power P3 be electric power that is lower than the upper limit electric power P1 in order to prevent the activation operation of the power generation system 101 from being stopped (in order to continue the activation operation of the power generation system 101).

In Step S403, the controller 110 causes the electric power control unit 108 of the power storage unit 107 to output the electric power from the power storage unit 107. With this, the electric power control unit 108 supplies the electric power from the power storage unit 107 to the external electric power load 105 and the power generation system 101 (specifically, the internal electric power load 102). At this time, the electric power control unit 108 controls the power storage unit 107 such that the electric power consumed by the power generation system 101 and the external electric power load 105 and detected by the electric power detector 106 becomes lower than the upper limit electric power P3. In this control of the power storage unit 107, the electric power control unit 108 may cause the power storage unit 107 to supply the electric power to at least the external electric power load 105.

Next, the controller 110 proceeds to Step S404 and outputs an activation continuation signal of the power generation system 101 to the control unit 103. With this, the control unit 103 continues the activation of the power generation system 101.

As above, in the power supply system 100 (the controller 110 of the power supply system 100) according to Embodiment 6, even in a case where it is predicted that in the activation operation of the power generation system 101, the power consumption of the external electric power load 105 becomes large and exceeds the upper limit electric power P3 supplied from the electric power system 104, the activation operation of the power generation system 101 can be continued. With this, in the power supply system 100 (the controller 110 of the power supply system 100) according to Embodiment 6, the power consumption of the external electric power load 105 is prevented from exceeding the upper limit electric power supplied from the electric power system 104 while improving the activation performance more than those of the conventional power generation systems.

Next, the operation executed when stopping the power generation of the power supply system 100 according to Embodiment 6 will be explained in reference to FIG. 13B.

Figure 13B:
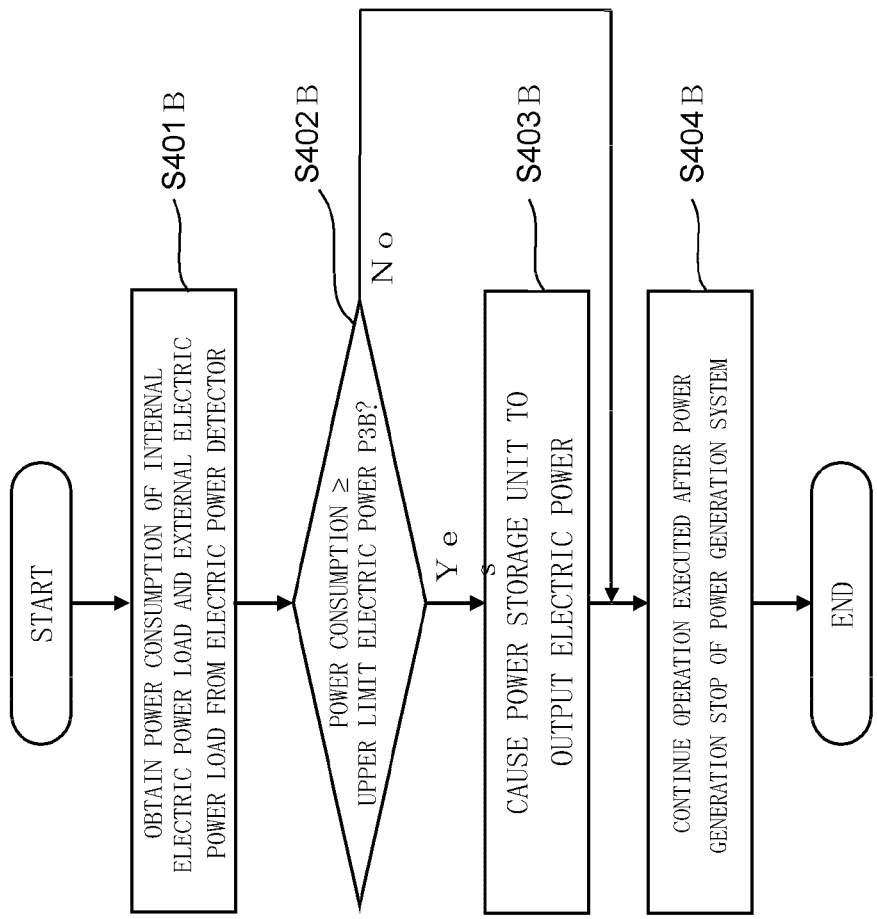
FIG. 13B is one example of a flow chart schematically showing the operation executed when stopping the power generation of the power generation system in the power supply system according to Embodiment 6.

FIG. 13B is one example of a flow chart schematically showing the operation executed when stopping the power generation of the power generation system in the power supply system according to Embodiment 6.

First, when the power generation of the power generation system 101 is stopped and then the processing operation executed after the power generation stop of the power generation system 101 is being executed, as shown in FIG. 13B, the controller 110 obtains from the electric power detector 106 the electric power (power consumption) consumed by the power generation system 101 (specifically, the internal electric power load 102) and the external electric power load 105 (Step S401B).

Next, the controller 110 determines whether or not the sum of the power consumption of the external electric power load 105 and the power consumption of the power generation system 101 obtained in Step S401B exceeds consumable upper limit electric power P3B supplied from the electric power system 104 (Step S402B). When the sum of the power consumption and the activation electric power is equal to or higher than the upper limit electric power P3B (Yes in Step S402B), the controller 110 proceeds to Step S403B. When the above sum is lower than the upper limit electric power P3B (No in Step S402B), the controller 110 proceeds to Step S404B. Here, it is preferable that the upper limit electric power P3B be electric power that is lower than the upper limit electric power P1B in order to prevent the processing operation executed after the power generation stop of the power generation system 101 from being stopped (in order to continue the processing operation executed after the power generation stop of the power generation system 101).

In Step S403B, the controller 110 causes the electric power control unit 108 of the power storage unit 107 to output the electric power from the power storage unit 107. With this, the electric power control unit 108 supplies the electric power from the power storage unit 107 to the external electric power load 105 and the power generation system 101 (specifically, the internal electric power load 102). At this time, the electric power control unit 108 controls the power storage unit 107 such that the electric power consumed by the power generation system 101 and the external electric power load 105 and detected by the electric power detector 106 becomes lower than the upper limit electric power P3B. In the control of the power storage unit 107, the electric power control unit 108 may cause the power storage unit 107 to supply the electric power to at least the external electric power load 105.

Next, the controller 110 proceeds to Step S404B and outputs to the control unit 103 a signal for continuing the processing operation executed after the power generation stop of the power generation system 101. With this, the control unit 103 continues the processing operation executed after the power generation stop of the power generation system 101.

As above, in the power supply system 100 (the controller 110 of the power supply system 100) according to Embodiment 6, even in a case where it is predicted that in the processing operation executed after the power generation stop of the power generation system 101, the power consumption of the external electric power load 105 becomes large and the above sum exceeds the upper limit electric power P3B supplied from the electric power system 104, the processing operation executed after the power generation stop of the power generation system 101 can be continued. With this, as compared to the conventional power generation systems, in the power supply system 100 (the controller 110 of the power supply system 100) according to Embodiment 6, the processing operation executed after the power generation stop of the power generation system 101 can be executed while preventing the above sum from exceeding the upper limit electric power supplied from the electric power system 104.

In the power supply system 100 according to Embodiment 6, in order to stably continue the activation operation of the power generation system 101, the upper limit electric power P3 is set as a threshold in Steps S402 and S403. However, the present embodiment is not limited to this. The upper limit electric power P1 may be set as the threshold in Steps S402 and S403 in a case where the supply of the electric power from the electric power system 104 is not stopped even if the electric power received from the electric power system 104 reaches the upper limit electric power P1.

Similarly, in order to stably continue the processing operation executed after the power generation stop of the power generation system 101, the upper limit electric power P3B is set as a threshold in Steps S402B and S403B. However, the present embodiment is not limited to this. The upper limit electric power P1B may be set as the threshold in Steps S402B and S403B in a case where the supply of the electric power from the electric power system 104 is not stopped even if the electric power received from the electric power system 104 reaches the upper limit electric power P1B.

In the power supply system 100 according to Embodiment 6, the controller 110 may be configured to execute at least one of the control operation of the power storage unit 107 when activating the power generation system 101 and the control operation of the power storage unit 107 when stopping the power generation of the power generation system 101. To be specific, the controller 110 may be configured to execute only one of the control operation of the power storage unit 107 when activating the power generation system 101 and the control operation of the power storage unit 107 when stopping the power generation of the power generation system 101 or may be configured to execute both the control operation of the power storage unit 107 when activating the power generation system 101 and the control operation of the power storage unit 107 when stopping the power generation of the power generation system 101.

Embodiment 7

In the power supply system according to Embodiment 7, the controller is configured to switch, based on the electric power which can be supplied from the power storage unit, the activation mode of the power generation system between the first activation mode in which the activation electric power is relatively high and the second activation mode in which the activation electric power is relatively low.

In addition, in the power supply system according to Embodiment 7, the controller may be configured to switch, based on the electric power which can be supplied from the power storage unit, the stop mode of the power generation system between the first stop mode in which the stop electric power is relatively high and the second stop mode in which the stop electric power is relatively low.

Since the power supply system 100 according to Embodiment 7 is the same in basic configuration as the power supply system 100 according to Embodiment 1, an explanation of the configuration thereof is omitted.

Figure 14A:
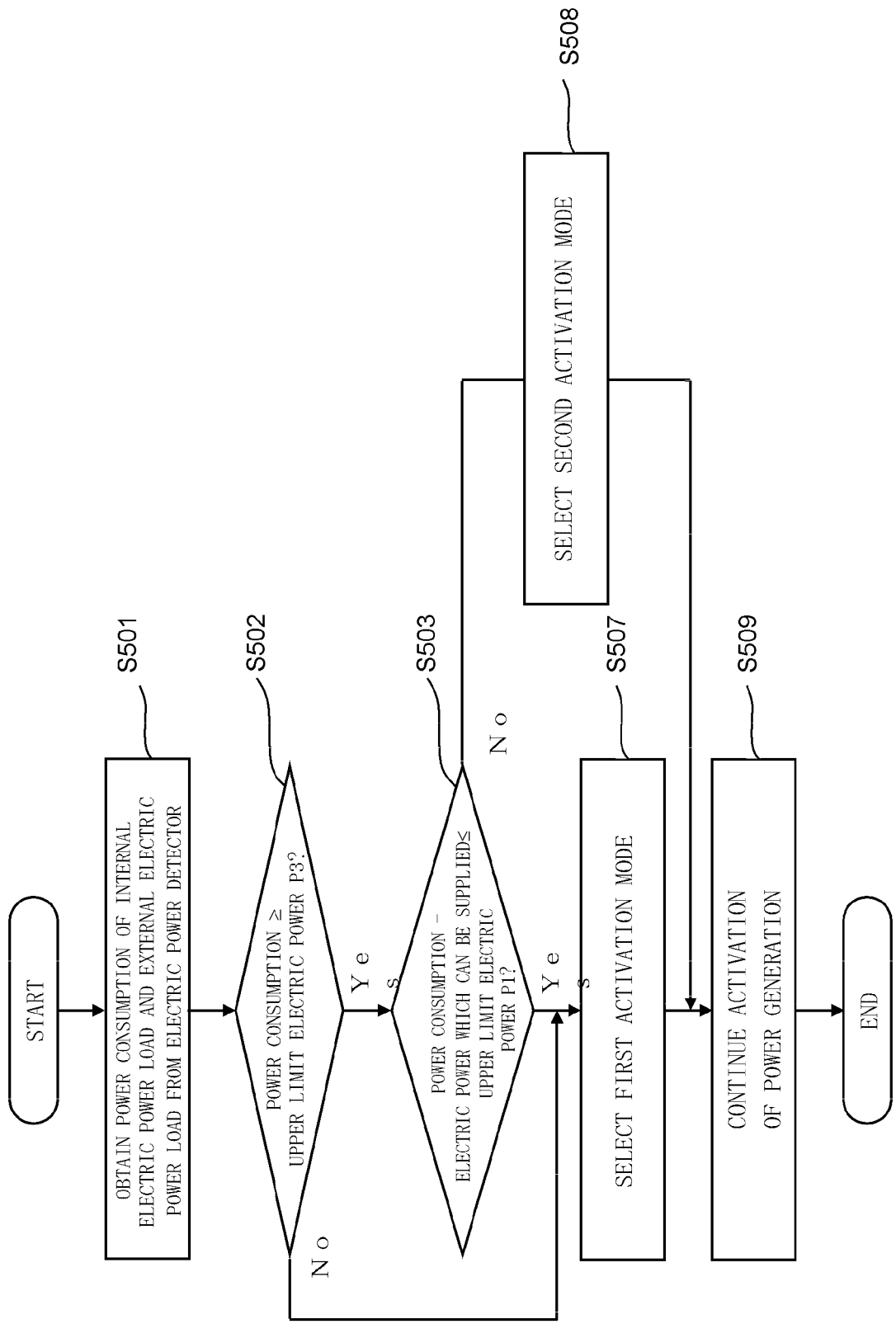
FIG. 14A is one example of a flow chart schematically showing the operation executed when activating the power generation system in the power supply system according to Embodiment 7.

FIG. 14A is one example of a flow chart schematically showing the operation executed when activating the power generation system in the power supply system according to Embodiment 7.

First, when the power generation system 101 starts the activation and is executing the activation operation, as shown in FIG. 14A, the controller 110 obtains from the electric power detector 106 the electric power (power consumption) consumed by the power generation system 101 (specifically, the internal electric power load 102) and the external electric power load 105 (Step S501).

Next, the controller 110 determines whether or not the power consumption obtained in Step S501 is equal to or higher than the upper limit electric power P3 (Step S502). When the power consumption of the external electric power load 105 is equal to or higher than the upper limit electric power P3 (Yes in Step S502), the controller 110 proceeds to Step S503. When the power consumption of the external electric power load 105 is lower than the upper limit electric power P3 (No in Step S502), the controller 110 proceeds to Step S507.

In Step S503, the controller 110 determines whether or not the electric power obtained by subtracting the electric power supplied to the external electric power load 105 and the power generation system 101 from the sum of the power consumption of the external electric power load 105 and the power consumption of the power generation system 101 obtained in Step S501 (to be specific, power consumption+activation electric power−supplied electric power) is equal to or lower than the consumable upper limit electric power P1 supplied from the electric power system 104. When the electric power obtained by a formula "power consumption+activation electric power−supplied electric power" is equal to or lower than the upper limit electric power P1 (Yes in Step S503), the controller 110 proceeds to Step S507. When the above electric power is higher than the upper limit electric power P1 (No in Step S503), the controller 110 proceeds to Step S508. In the control of the power storage unit 107, the electric power control unit 108 may cause the power storage unit 107 to supply the electric power to at least the external electric power load 105.

In Step S508, the controller 110 causes the control unit 103 to select the second activation mode. Then, the controller 110 outputs the activation continuation signal of the power generation system 101 to the control unit 103 (Step S509). With this, the control unit 103 continues the activation of the power generation system 101 by the second activation mode.

In contrast, when the power consumption of the power generation system 101 and the external electric power load 105 is lower than the upper limit electric power P3 in Step S502 or when the power consumption of the power generation system 101 and the external electric power load 105 is equal to or lower than the upper limit electric power P3 in Step S503, the controller 110 causes the control unit 103 to select the first activation mode (Step S507).

Then, the controller 110 outputs the activation continuation signal of the power generation system 101 to the control unit 103 (Step S509). With this, the control unit 103 continues the activation of the power generation system 101 by the first activation mode. In the case of continuing the activation of the power generation system 101 even if the power consumption obtained in Step S501 is equal to or higher than the upper limit electric power P3, the electric power control unit 108 controls the output electric power output from the power storage unit 107 such that the above power consumption becomes equal to or lower than the upper limit electric power P1.

The power supply system 100 (the controller 110 of the power supply system 100) according to Embodiment 7 configured as above has the same operational advantages as the power supply system 100 (the controller 110 of the power supply system 100) according to Embodiment 6. Moreover, in the power supply system 100 (the controller 110 of the power supply system 100) according to Embodiment 7, even if the upper limit electric power P1 or lower is not realized even by utilizing the output electric power output from the power storage unit 107, the second activation mode in which the activation electric power is relatively low is selected, and the activation operation is prevented from being stopped. Therefore, the activation performance of the power supply system 100 (the controller 110 of the power supply system 100) according to Embodiment 7 improves more than that of the power supply system 100 (the controller 110 of the power supply system 100) according to Embodiment 6.

Next, the operation executed when stopping the power generation of the power supply system 100 according to Embodiment 7 will be explained in reference to FIG. 14B.

Figure 14B:
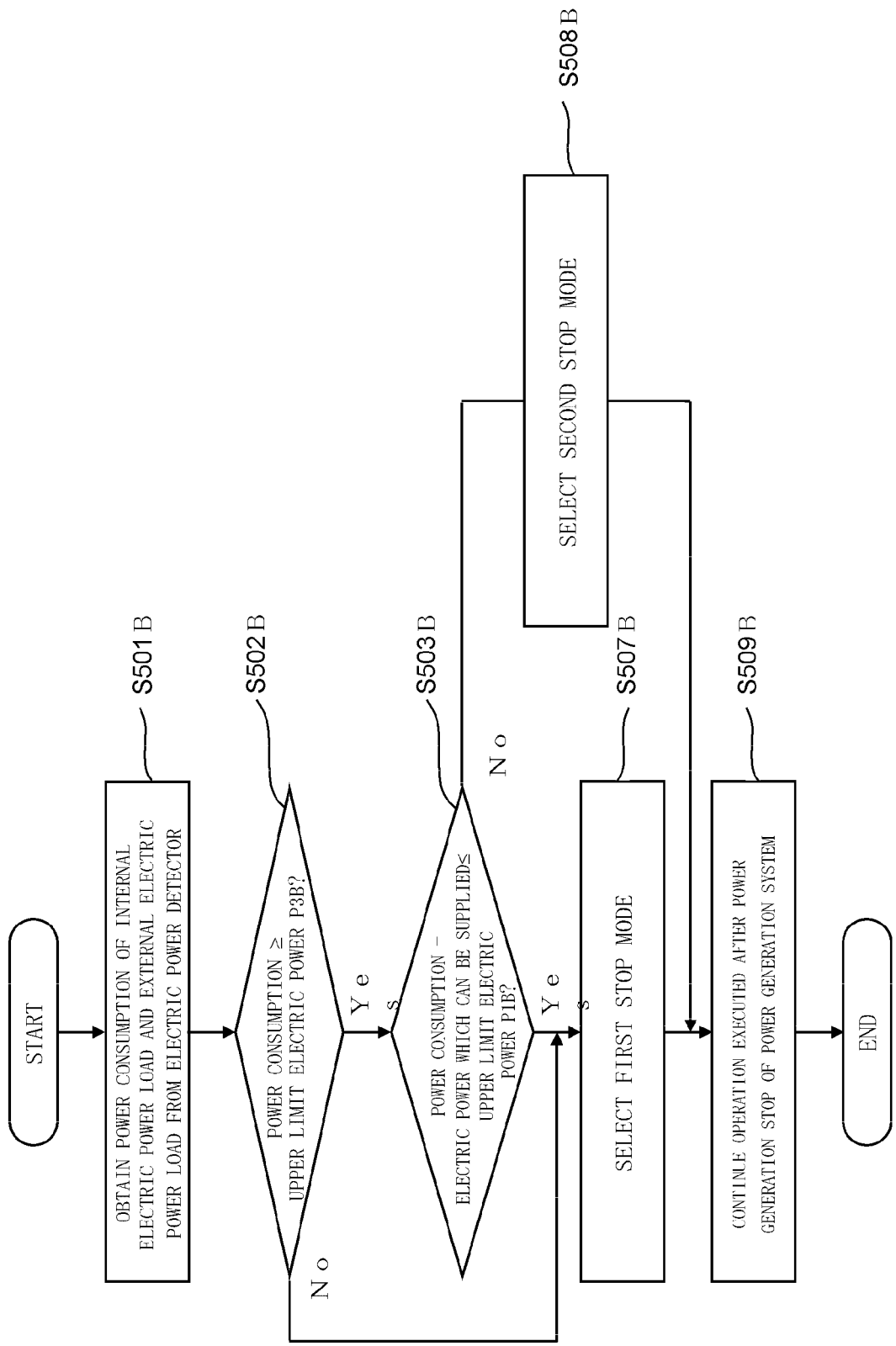
FIG. 14B is one example of a flow chart schematically showing the operation executed when stopping the power generation of the power generation system in the power supply system according to Embodiment 7.

FIG. 14B is one example of a flow chart schematically showing the operation executed when stopping the power generation of the power generation system in the power supply system according to Embodiment 7.

As shown in FIG. 14B, as with Embodiment 6, in the power supply system according to Embodiment 7, the operation executed when stopping the power generation of the power generation system 101 is executed, and respective steps of the operation executed when stopping the power generation may be the same as those of the above-described operation executed when activating the power generation system 101. Therefore, the following will explain steps in which operations different from the operations explained in Embodiment 6 and the above-described operation executed when activating the power generation system 101 are executed. Specifically, Steps S503B, S507B, and S508B will be explained.

In Step S503B, the controller 110 determines whether or not the electric power obtained by subtracting the electric power supplied to the external electric power load 105 and the power generation system 101 from the sum of the power consumption of the external electric power load 105 and the power consumption of the power generation system 101 obtained in Step S501B (to be specific, power consumption+activation electric power−supplied electric power) is equal to or lower than the consumable upper limit electric power P1 supplied from the electric power system 104. When the electric power obtained by a formula "power consumption+activation electric power−supplied electric power" is equal to or lower than the upper limit electric power P1B (Yes in Step S503B), the controller 110 proceeds to Step S507B. When the above electric power is higher than the upper limit electric power P1B (No in Step S503B), the controller 110 proceeds to Step S508B.

In Step S508B, the controller 110 causes the control unit 103 to select the second stop mode. In contrast, when the power consumption of the power generation system 101 and the external electric power load 105 is lower than the upper limit electric power P3B in Step S502B or when the power consumption of the power generation system 101 and the external electric power load 105 is equal to or lower than the upper limit electric power P3B in Step S503B, the controller 110 causes the control unit 103 to select the first stop mode (Step S507B).

As above, in the power supply system 100 (the controller 110 of the power supply system 100) according to Embodiment 7, even if the upper limit electric power P1B or lower is not realized even by utilizing the output electric power output from the power storage unit 107, the second stop mode in which the stop electric power is relatively low is selected, and the processing operation executed after the power generation stop is prevented from being stopped. Therefore, the stop performance of the power supply system 100 (the controller 110 of the power supply system 100) according to Embodiment 7 improves more than that of the power supply system 100 (the controller 110 of the power supply system 100) according to Embodiment 6.

In the power supply system 100 (the controller 110 of the power supply system 100) according to Embodiment 7, the activation of the power generation system 101 is continued after the second activation mode is selected (Step S508). However, the present embodiment is not limited to this. After the second activation mode is selected and a control signal for charging the power storage unit 107 is output to the electric power control unit 108, the activation of the power generation system 101 may be continued.

Similarly, in the power supply system 100 (the controller 110 of the power supply system 100) according to Embodiment 7, the processing operation executed after the power generation stop of the power generation system 101 is continued after the second stop mode is selected (Step S508B). However, the present embodiment is not limited to this. After the second stop mode is selected and the control signal for charging the power storage unit 107 is output to the electric power control unit 108, the processing operation executed after the power generation stop of the power generation system 101 may be continued.

In the power supply system 100 according to Embodiment 7, the controller 110 may be configured to execute at least one of the control operation of the power storage unit 107 when activating the power generation system 101 and the control operation of the power storage unit 107 when stopping the power generation of the power generation system 101. To be specific, the controller 110 may be configured to execute only one of the control operation of the power storage unit 107 when activating the power generation system 101 and the control operation of the power storage unit 107 when stopping the power generation of the power generation system 101 or may be configured to execute both the control operation of the power storage unit 107 when activating the power generation system 101 and the control operation of the power storage unit 107 when stopping the power generation of the power generation system 101.

Embodiment 8

In the power supply system according to Embodiment 8, the controller is configured to switch the activation mode of the power generation system based on the power storage amount of the power storage unit between the first activation mode in which the activation electric power of the power generation system is relatively high and the second activation mode in which the activation electric power of the power generation system is relatively low.

In addition, in the power supply system according to Embodiment 8, the controller may be configured to switch the stop mode of the power generation system based on the power storage amount of the power storage unit between the first stop mode in which the stop electric power of the power generation system is relatively high and the second stop mode in which the stop electric power of the power generation system is relatively low.

Since the power supply system 100 according to Embodiment 8 is the same in basic configuration as the power supply system 100 according to Embodiment 1, an explanation of the configuration thereof is omitted.

Figure 15A:
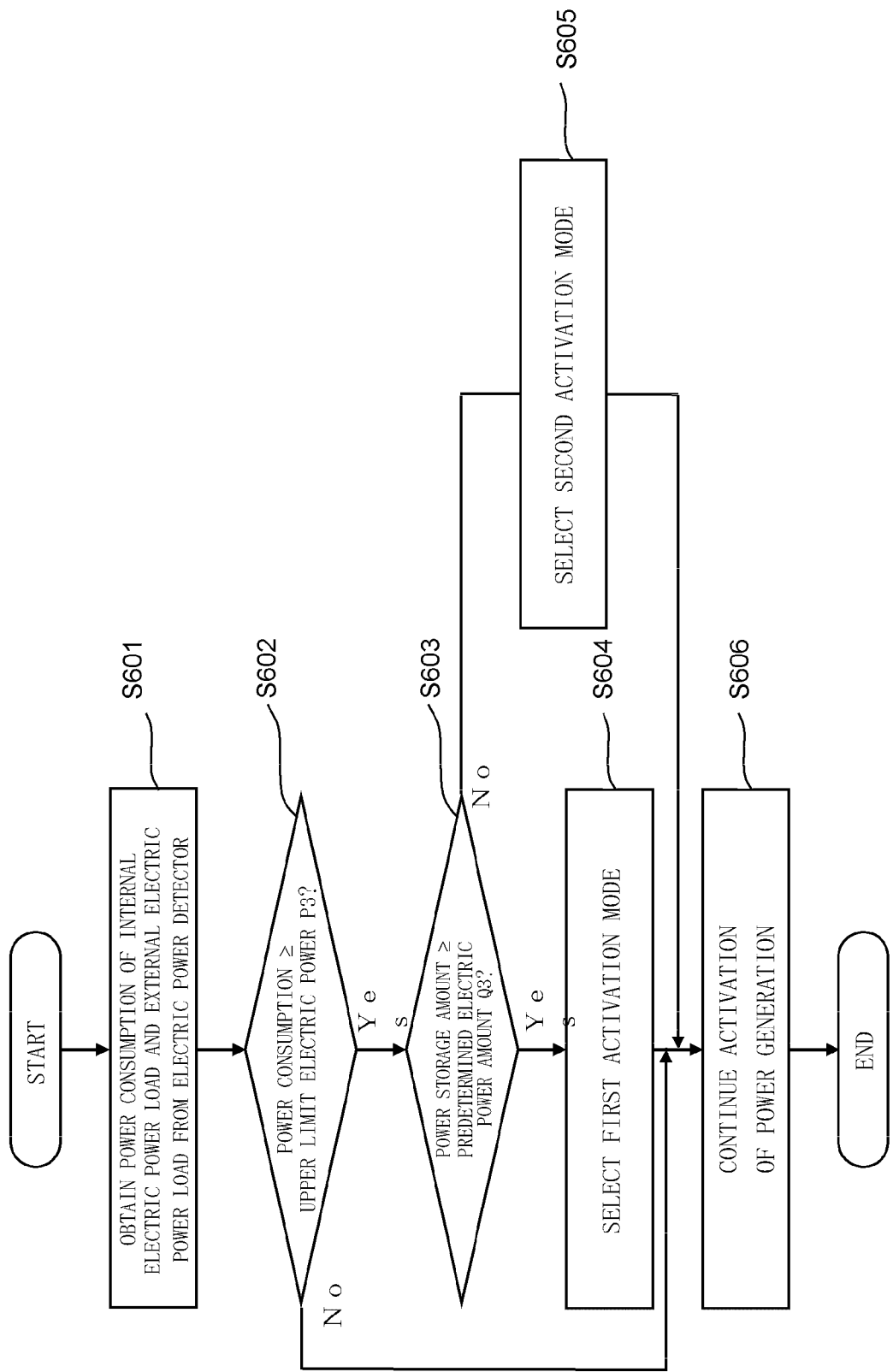
FIG. 15A is one example of a flow chart schematically showing the operation executed when activating the power generation system in the power supply system according to Embodiment 8.

FIG. 15A is one example of a flow chart schematically showing the operation executed when activating the power generation system in the power supply system according to Embodiment 8.

First, as with Embodiment 7, when the power generation system 101 starts the activation and is executing the activation operation, as shown in FIG. 15A, the controller 110 obtains from the electric power detector 106 the electric power (power consumption) consumed by the power generation system 101 (specifically, the internal electric power load 102) and the external electric power load 105 (Step S601).

Next, the controller 110 determines whether or not the sum of the power consumption of the external electric power load 105 and the power consumption of the power generation system 101 obtained in Step S601 is equal to or higher than the upper limit electric power P3 (Step S602). When the sum of the power consumption of the external electric power load 105 and the power consumption of the power generation system 101 is equal to or higher than the upper limit electric power P3 (Yes in Step S602), the controller 110 proceeds to Step S603. When the above sum is lower than the upper limit electric power P3 (No in Step S602), the controller 110 proceeds to Step S606.

In Step S603, the controller 110 determines whether or not the power storage amount of the power storage unit 107 is equal to or larger than the predetermined electric power amount Q3. When the power storage amount of the power storage unit 107 is equal to or larger than the predetermined electric power amount Q3 (Yes in Step S603), the controller proceeds to Step S604. When the power storage amount of the power storage unit 107 is smaller than the predetermined electric power amount Q3 (No in Step S603), the controller 110 proceeds to Step S605. The predetermined electric power amount Q3 may be set arbitrarily. For example, the predetermined electric power amount Q3 may be an electric power amount necessary to continue the activation operation of the power generation system 101 by the first activation mode. The electric power amount necessary to continue the activation operation by the first activation mode may be, for example, a cumulative power consumption amount consumed by the internal electric power load in a period until the completion of the activation operation continuously executed by the first activation mode.

The controller 110 selects the first activation mode in Step S604 and proceeds to Step S606. In contrast, the controller 110 selects the second activation mode in Step S605 and proceeds to Step S606.

Then, in Step S606, the controller 110 outputs the activation continuation signal of the power generation system 101 to the control unit 103. With this, the control unit 103 continues the activation of the power generation system 101.

The power supply system 100 (the controller 110 of the power supply system 100) according to Embodiment 8 configured as above has the same operational advantages as the power supply system 100 (the controller 110 of the power supply system 100) according to Embodiment 6. Moreover, in the power supply system 100 (the controller 110 of the power supply system 100) according to Embodiment 8, even if the power storage amount of the power storage unit 107 is not an amount by which the first activation mode can be continued, the activation operation is prevented from being stopped by changing to the second activation mode in which the activation electric power is relatively low. Therefore, the activation performance of the power supply system 100 (the controller 110 of the power supply system 100) according to Embodiment 8 improves more than that of the power supply system 100 (the controller 110 of the power supply system 100) according to Embodiment 6.

Next, the operation executed when stopping the power generation of the power supply system 100 according to Embodiment 8 will be explained in reference to FIG. 15B.

Figure 15B:
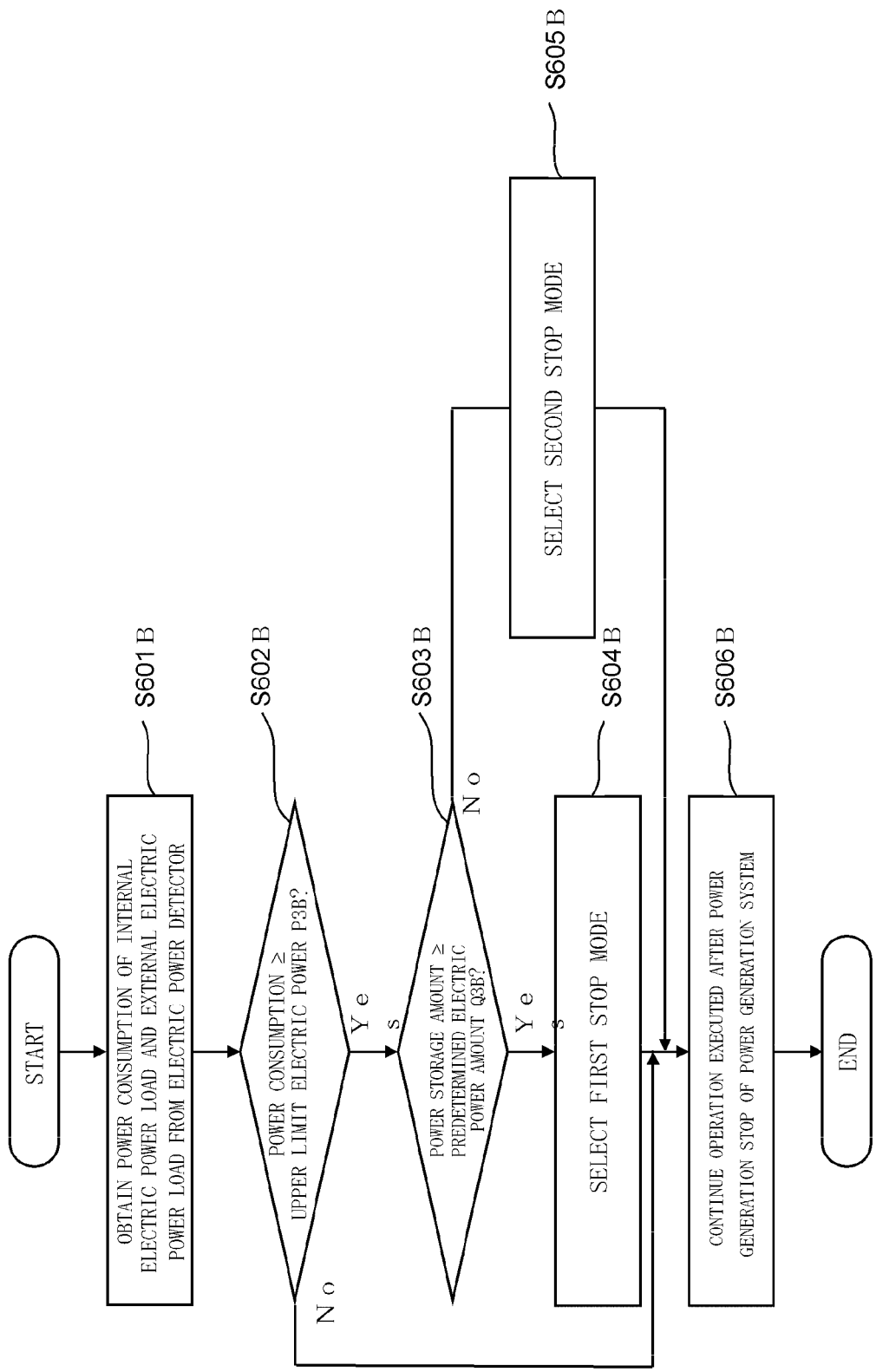
FIG. 15B is one example of a flow chart schematically showing the operation executed when stopping the power generation of the power generation system in the power supply system according to Embodiment 8.

FIG. 15B is one example of a flow chart schematically showing the operation executed when stopping the power generation of the power generation system in the power supply system according to Embodiment 8.

As shown in FIG. 15B, as with Embodiment 6, in the power supply system 100 according to Embodiment 8, the operation executed when stopping the power generation of the power generation system 101 is executed, and respective steps of the operation executed when stopping the power generation may be the same as those of the above-described operation executed when activating the power generation system 101. Therefore, the following will explain Step S603B in which an operation different from the operations explained in Embodiment 6 and the above-described operation executed when activating the power generation system 101 is executed.

In Step S603B, the controller 110 determines whether or not the power storage amount of the power storage unit 107 is equal to or larger than the predetermined electric power amount Q3B. When the power storage amount of the power storage unit 107 is equal to or larger than the predetermined electric power amount Q3B (Yes in Step S603B), the controller 110 proceeds to Step S604B. When the power storage amount of the power storage unit 107 is smaller than the predetermined electric power amount Q3B (No in Step S603B), the controller 110 proceeds to Step S605B. The predetermined electric power amount Q3B may be set arbitrarily. For example, the predetermined electric power amount Q3B may be an electric power amount necessary to continue by the first stop mode the processing operation executed after the power generation stop of the power generation system 101. The electric power amount necessary to continue by the first stop mode the processing operation executed after the power generation stop may be, for example, a cumulative power consumption amount consumed by the internal electric power load in a period until the completion of the processing operation executed after the power generation stop, the processing operation being continuously executed by the first stop mode.

As above, in the power supply system 100 (the controller 110 of the power supply system 100) according to Embodiment 8, even if the upper limit electric power P1B or lower is not realized even by utilizing the output electric power output from the power storage unit 107, the second stop mode in which the stop electric power is relatively low is selected, and the processing operation executed after the power generation stop is prevented from being stopped. Therefore, the stop performance of the power supply system 100 (the controller 110 of the power supply system 100) according to Embodiment 8 improves more than that of the power supply system 100 (the controller 110 of the power supply system 100) according to Embodiment 6.

In the power supply system 100 according to Embodiment 8, the controller 110 may be configured to execute at least one of the control operation of the power storage unit 107 when activating the power generation system 101 and the control operation of the power storage unit 107 when stopping the power generation of the power generation system 101. To be specific, the controller 110 may be configured to execute only one of the control operation of the power storage unit 107 when activating the power generation system 101 and the control operation of the power storage unit 107 when stopping the power generation of the power generation system 101 or may be configured to execute both the control operation of the power storage unit 107 when activating the power generation system 101 and the control operation of the power storage unit 107 when stopping the power generation of the power generation system 101.

Modification Example 1

Figure 16A:
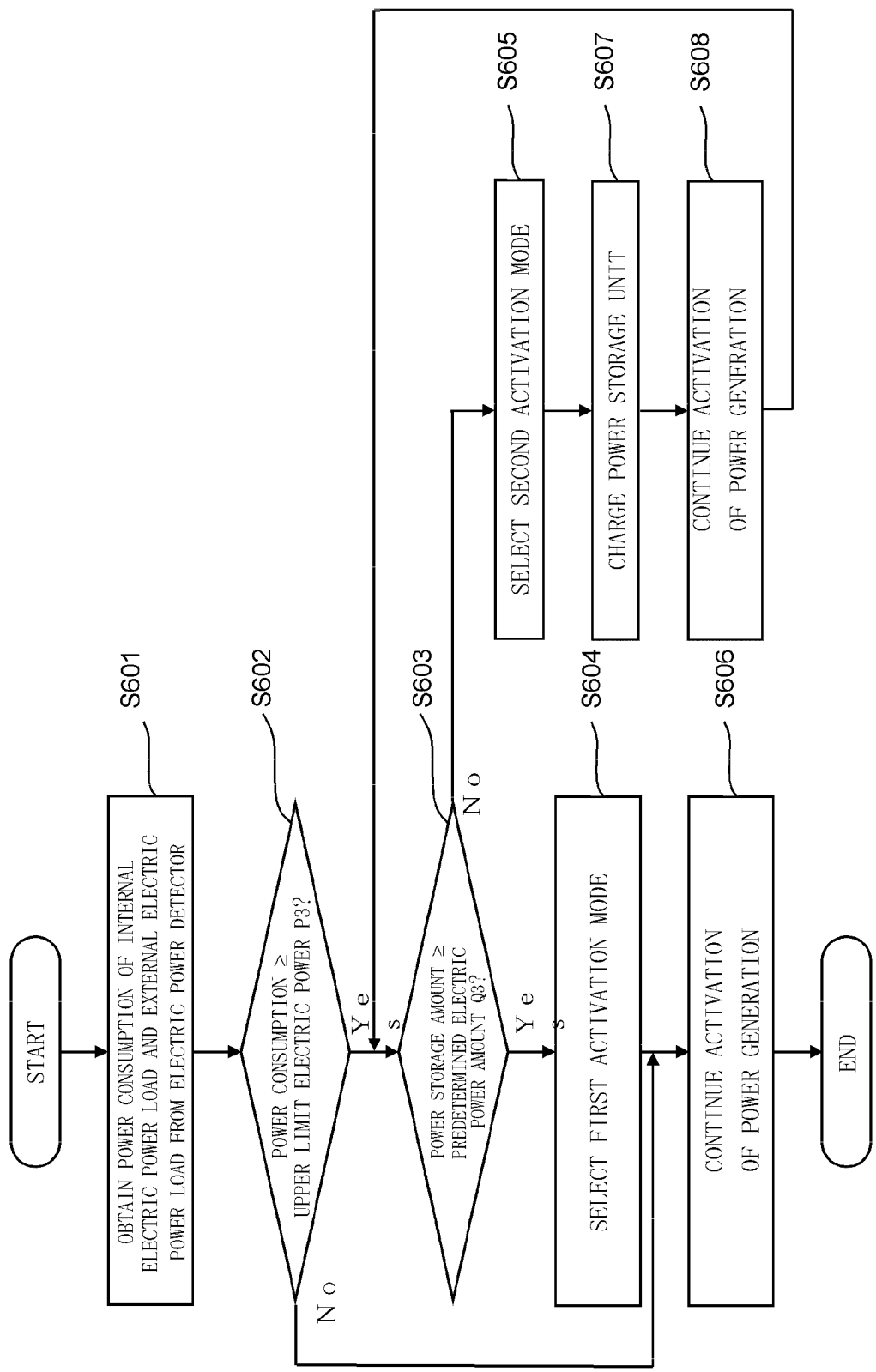
FIG. 16A is one example of a flow chart schematically showing the operation executed when activating the power generation system in the power supply system of Modification Example 1 of the power supply system according to Embodiment 8.

FIG. 16A is one example of a flow chart schematically showing the operation executed when activating the power generation system in Modification Example 1 of the power supply system according to Embodiment 8.

As shown in FIG. 16A, the activation operation of the power generation system 101 in the power supply system 100 of Modification Example 1 is different from the activation operation of the power generation system 101 in the power supply system 100 according to Embodiment 8 regarding the operation executed when the second activation mode is selected.

Specifically, when the power storage amount of the power storage unit 107 is smaller than the predetermined electric power amount Q3 (No in Step S603), the controller 110 selects the second activation mode and switches the activation mode of the power generation system 101 from the first activation mode to the second activation mode (Step S605). Then, the controller 110 outputs to the electric power control unit 108 of the power storage unit 107 the control signal for charging the power storage unit 107 (Step S607). With this, the electric power control unit 108 supplies the electric power from the electric power system 104 to the cells of the storage battery constituting the power storage unit 107 or the assembled batteries of the storage battery constituting the power storage unit 107 such that the supplied electric power does not exceed the upper limit electric power P3. Thus, the power storage unit 107 is charged. Next, the controller 110 continues the activation of the power generation system 101 by the second activation mode (Step S608) and returns to Step S603.

Thus, in Modification Example 1, Steps S603, S605, S607, and S608 are repeated until the power storage amount of the power storage unit 107 becomes equal to or larger than the predetermined electric power amount Q3. Then, when the power storage amount of the power storage unit 107 becomes equal to or larger than the predetermined electric power amount Q3, the controller 110 selects the first activation mode and switches the activation mode of the power generation system 101 from the second activation mode to the first activation mode (Step S604). Then, the controller 110 continues the activation of the power generation system 101 by the first activation mode (Step S606).

The power supply system 100 (the controller 110 of the power supply system 100) of Modification Example 1 configured as above has the same operational advantages as the power supply system 100 (the controller 110 of the power supply system 100) according to Embodiment 8. Moreover, in the power supply system 100 (the controller 110 of the power supply system 100) of Modification Example 1, even if the activation mode shifts to the second activation mode, it is switched to the first activation mode when the power storage amount of the power storage unit 107 becomes equal to or larger than the predetermined electric power amount Q3. Therefore, the activation time of the power generation system 101 of the power supply system 100 (the controller 110 of the power supply system 100) of Modification Example 1 can be made shorter than that of the power supply system 100 (the controller 110 of the power supply system 100) of Embodiment 8.

Next, the operation when stopping the power generation of the power supply system 100 of Modification Example 1 will be explained in reference to FIG. 16B.

Figure 16B:
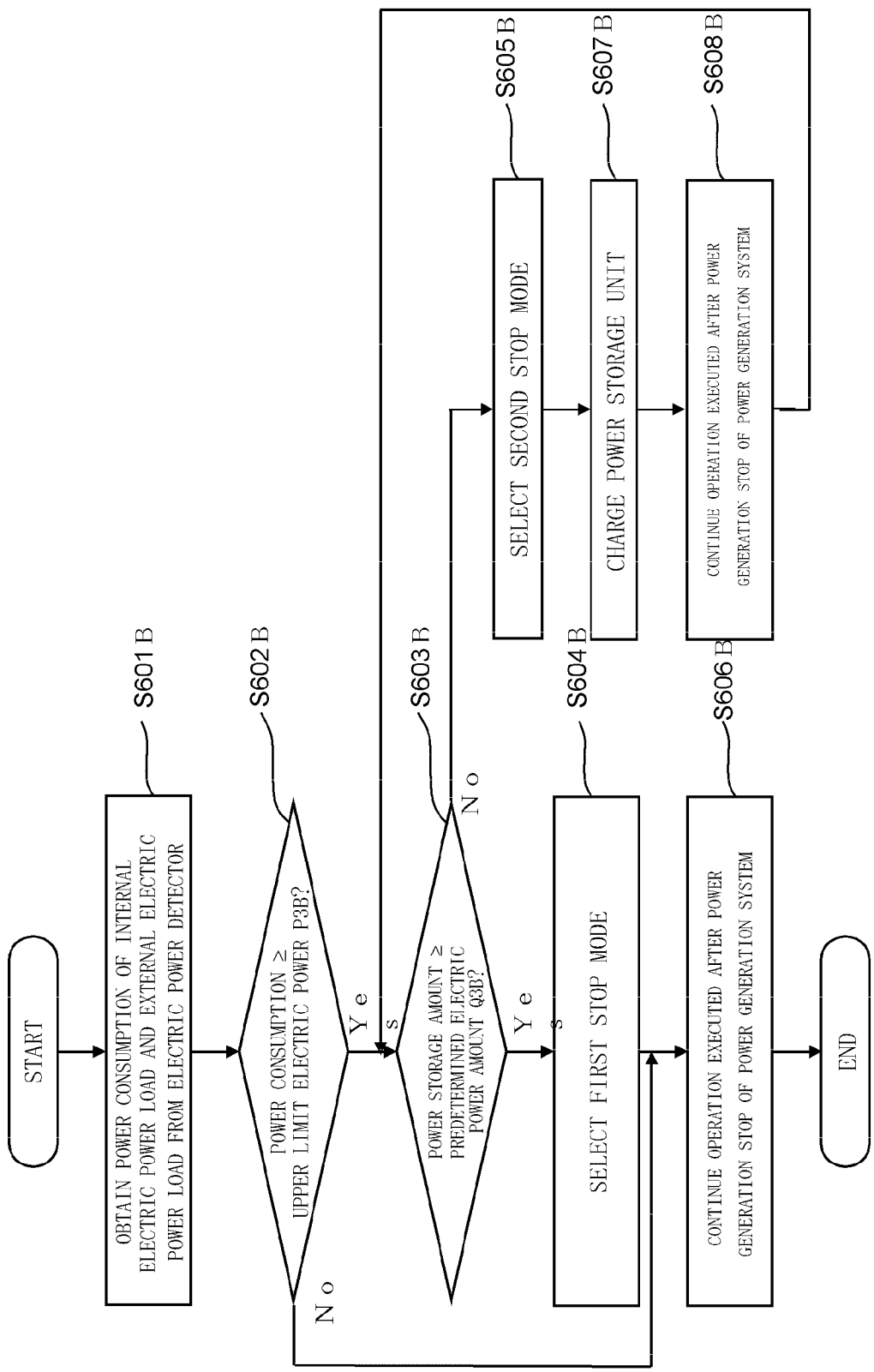
FIG. 16B is one example of a flow chart schematically showing the operation executed when stopping the power generation of the power generation system in the power supply system of Modification Example 1.

FIG. 16B is one example of a flow chart schematically showing the operation executed when stopping the power generation of the power generation system in the power supply system of Modification Example 1.

As shown in FIG. 16B, the operation executed when stopping the power generation of the power generation system 101 in the power supply system 100 of Modification Example 1 is different from the operation executed when stopping the power generation of the power generation system 101 in the power supply system 100 according to Embodiment 8 regarding the operation executed when the second stop mode is selected.

Specifically, when the power storage amount of the power storage unit 107 is smaller than the predetermined electric power amount Q3B (No in Step S603B), the controller 110 selects the second stop mode and switches the stop mode of the power generation system 101 from the first stop mode to the second stop mode (Step S605B). Then, the controller 110 outputs to the electric power control unit 108 of the power storage unit 107 the control signal for charging the power storage unit 107 (Step S607B). With this, the electric power control unit 108 supplies the electric power from the electric power system 104 to the cells of the storage battery constituting the power storage unit 107 or the assembled batteries of the storage battery constituting the power storage unit 107 such that the supplied electric power does not exceed the upper limit electric power P3B. Thus, the power storage unit 107 is charged. Next, the controller 110 continues by the second stop mode the processing operation executed after the power generation stop of the power generation system 101 (Step S608B) and returns to Step S603B.

Thus, in Modification Example 1, Steps S603B, S605B, S607B, and S608B are repeated until the power storage amount of the power storage unit 107 becomes equal to or larger than the predetermined electric power amount Q3B.

Then, when the power storage amount of the power storage unit 107 becomes equal to or larger than the predetermined electric power amount Q3B, the controller 110 selects the first stop mode and switches the stop mode of the power generation system 101 from the second stop mode to the first stop mode (Step S604B). Then, the controller 110 continues by the first stop mode the processing operation executed after the power generation stop of the power generation system 101 (Step S606B).

As above, in the power supply system 100 (the controller 110 of the power supply system 100) of Modification Example 1, even if the stop mode is switched to the second stop mode, it is switched to the first stop mode when the power storage amount of the power storage unit 107 becomes equal to or larger than the predetermined electric power amount Q3. Therefore, the execution time of the processing operation executed after the power generation stop of the power generation system 101 of the power supply system 100 (the controller 110 of the power supply system 100) of Modification Example 1 can be made shorter than that of the power supply system 100 (the controller 110 of the power supply system 100) of Embodiment 8.

In the power supply system 100 of Modification Example 1, the controller 110 may be configured to execute at least one of the control operation of the power storage unit 107 when activating the power generation system 101 and the control operation of the power storage unit 107 when stopping the power generation of the power generation system 101. To be specific, the controller 110 may be configured to execute only one of the control operation of the power storage unit 107 when activating the power generation system 101 and the control operation of the power storage unit 107 when stopping the power generation of the power generation system 101 or may be configured to execute both the control operation of the power storage unit 107 when activating the power generation system 101 and the control operation of the power storage unit 107 when stopping the power generation of the power generation system 101.

Modification Example 2

Figure 17A:
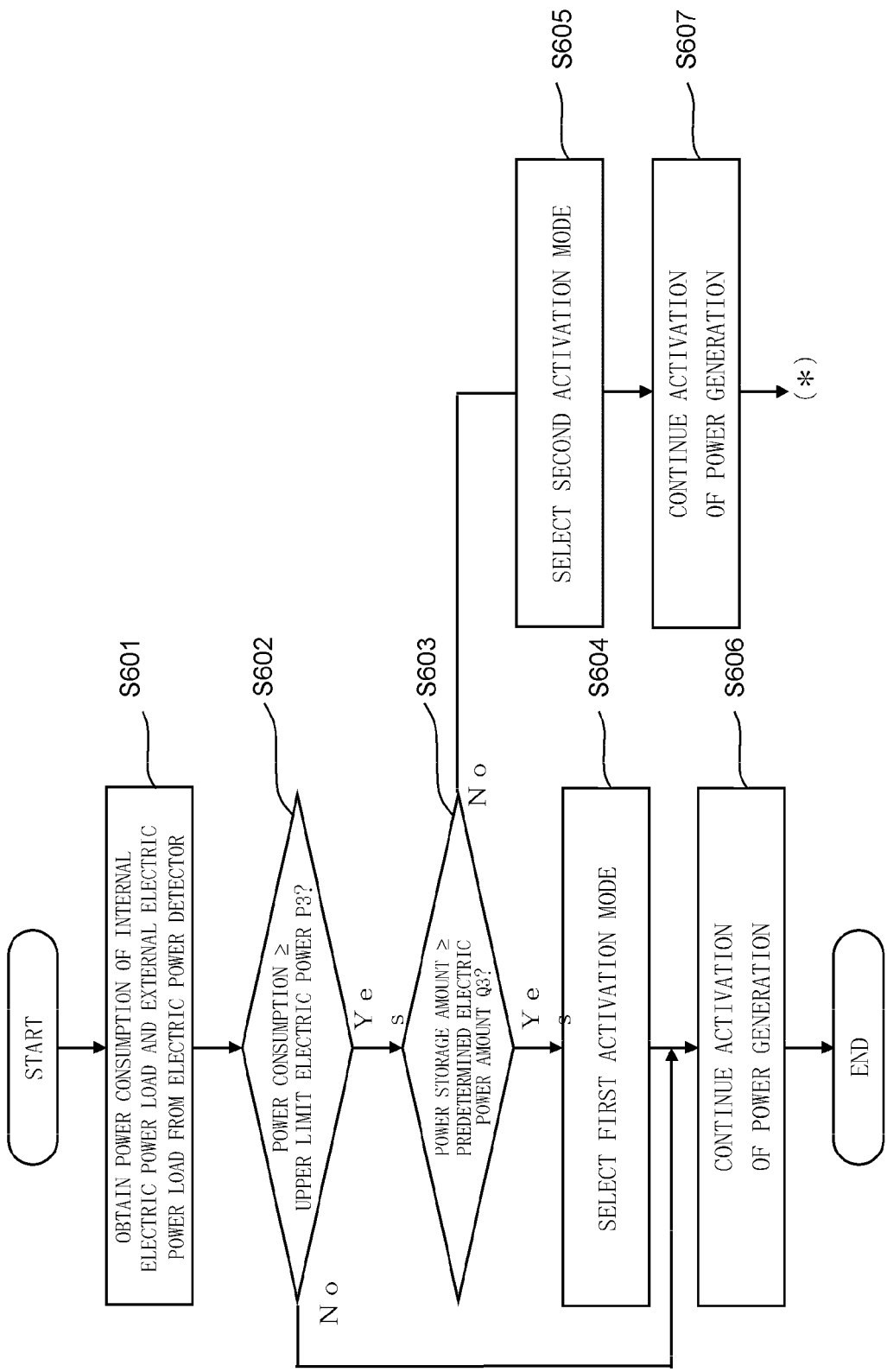
FIG. 17A is one example of a flow chart schematically showing the operation executed when activating the power generation system in Modification Example 2 of the power supply system according to Embodiment 8.
Figure 17B:
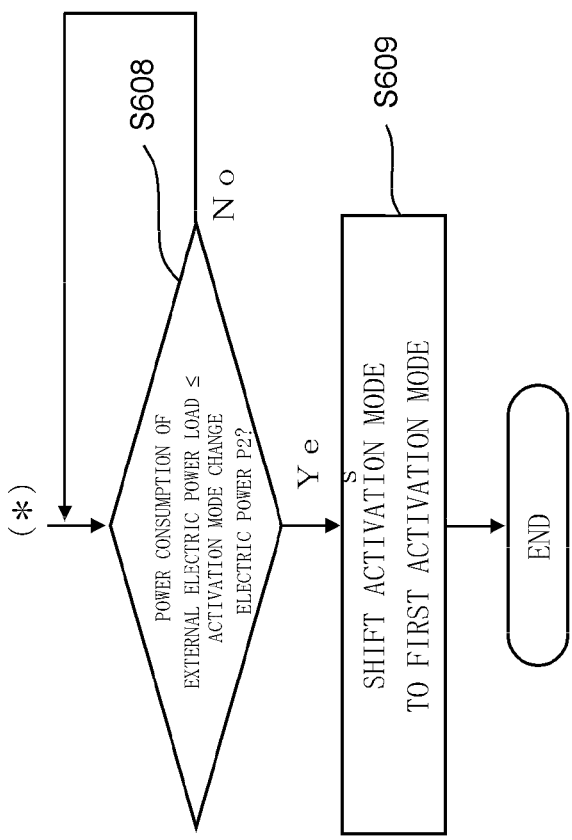
FIG. 17B is one example of a flow chart schematically showing the operation executed when activating the power generation system in Modification Example 2 of the power supply system according to Embodiment 8.

Each of FIGS. 17A and 17B is one example of a flow chart schematically showing the operation executed when activating the power generation system in Modification Example 2 of the power supply system according to Embodiment 8.

As shown in FIGS. 17A and 17B, the activation operation of the power generation system 101 in the power supply system 100 of Modification Example 2 is different from the activation operation of the power generation system 101 in the power supply system 100 according to Embodiment 8 regarding the operation executed when the second activation mode is selected.

Specifically, the controller 110 selects the second activation mode (Step S605) and outputs the activation continuation signal of the power generation system 101 to the control unit 103 (Step S607).

Next, the controller 110 obtains from the electric power detector 106 the electric power (power consumption) consumed by the power generation system 101 and the external electric power load 105. Next, the controller 110 determines whether or not the power consumption of the external electric power load 105 in the obtained power consumption is equal to or higher than the activation mode change electric power P2 (Step S608).

Then, when the power consumption of the external electric power load 105 becomes lower than the activation mode change electric power P2 (Yes in Step S608), the controller 110 causes the control unit 103 to shift to the first activation mode (Step S609).

The power supply system 100 (the controller 110 of the power supply system 100) of Modification Example 2 configured as above has the same operational advantages as the power supply system 100 (the controller 110 of the power supply system 100) according to Embodiment 8. Moreover, in the power supply system 100 (the controller 110 of the power supply system 100) of Modification Example 2, when the power consumption of the external electric power load 105 decreases, the activation mode is switched to the first activation mode. With this, the activation time of the power generation system 101 of the power supply system 100 (the controller 110 of the power supply system 100) of Modification Example 2 can be made shorter than that of the power supply system 100 (the controller 110 of the power supply system 100) according to Embodiment 8.

Next, the operation executed when stopping the power generation of the power supply system 100 of Modification Example 2 will be explained in reference to FIGS. 17C and 17D.

Figure 17C:
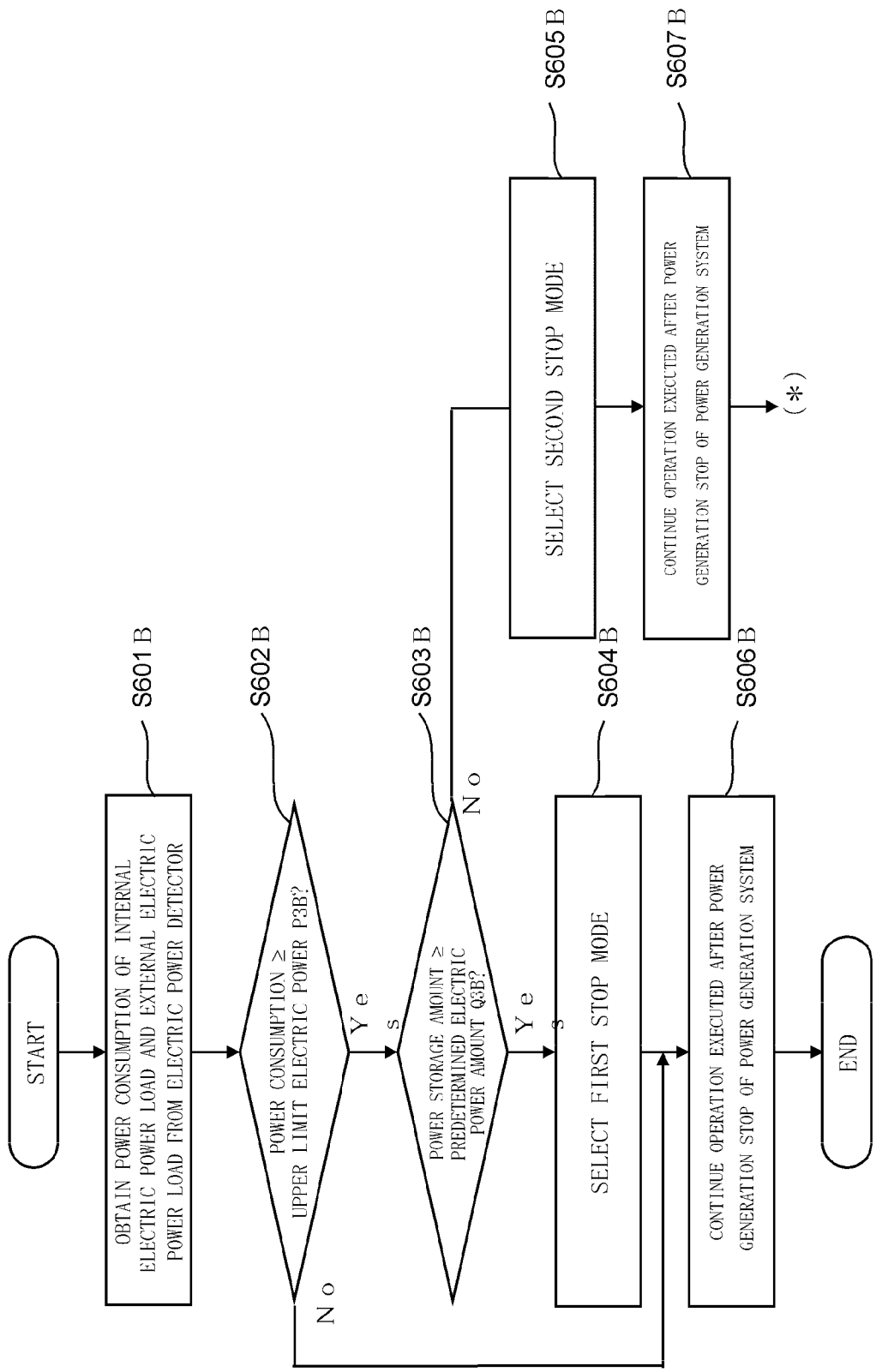
FIG. 17C is one example of a flow chart schematically showing the operation executed when stopping the power generation of the power generation system in the power supply system of Modification Example 2.
Figure 17D:
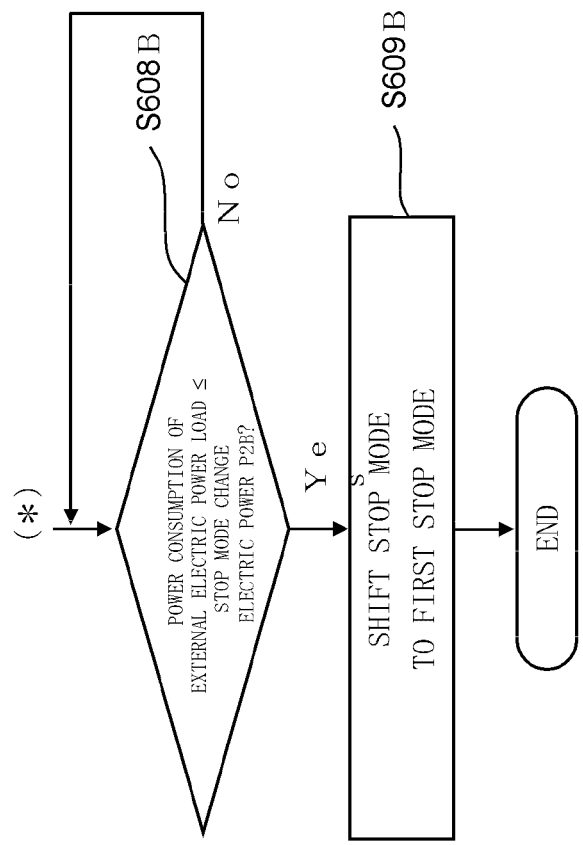
FIG. 17D is one example of a flow chart schematically showing the operation executed when stopping the power generation of the power generation system in the power supply system of Modification Example 2.

Each of FIGS. 17C and 17D is one example of a flow chart schematically showing the operation executed when stopping the power generation of the power generation system in the power supply system of Modification Example 2.

As shown in FIGS. 17C and 17D, the operation executed when stopping the power generation of the power generation system 101 in the power supply system 100 of Modification Example 2 is different from the operation executed when stopping the power generation of the power generation system 101 in the power supply system 100 according to Embodiment 8 regarding the operation executed when the second stop mode is selected.

Specifically, the controller 110 selects the second stop mode (Step S605B) and outputs to the control unit 103 the signal for continuing the processing operation executed after the power generation stop of the power generation system 101 (Step S607B).

Next, the controller 110 obtains from the electric power detector 106 the electric power (power consumption) consumed by the power generation system 101 and the external electric power load 105. Next, the controller 110 determines whether or not the power consumption of the external electric power load 105 in the obtained power consumption is equal to or higher than the stop mode change electric power P2B (Step S608B).

Then, when the power consumption of the external electric power load 105 becomes lower than the stop mode change electric power P2B (Yes in Step S608B), the controller 110 causes the control unit 103 to shift to the first stop mode (Step S609B).

As above, in the power supply system 100 (the controller 110 of the power supply system 100) of Modification Example 2, when the power consumption of the external electric power load 105 decreases, the stop mode is switched to the second stop mode. With this, the execution time of the processing operation executed after the power generation stop of the power generation system 101 of the power supply system 100 (the controller 110 of the power supply system 100) of Modification Example 2 can be made shorter than that of the power supply system 100 (the controller 110 of the power supply system 100) according to Embodiment 8.

In the power supply system 100 of Modification Example 2, the controller 110 may be configured to execute at least one of the control operation of the power storage unit 107 when activating the power generation system 101 and the control operation of the power storage unit 107 when stopping the power generation of the power generation system 101. To be specific, the controller 110 may be configured to execute only one of the control operation of the power storage unit 107 when activating the power generation system 101 and the control operation of the power storage unit 107 when stopping the power generation of the power generation system 101 or may be configured to execute both the control operation of the power storage unit 107 when activating the power generation system 101 and the control operation of the power storage unit 107 when stopping the power generation of the power generation system 101.

Embodiment 9

In the power supply system according to Embodiment 9, the controller causes the electric power system to charge the power storage unit before a scheduled activation time of the power generation system.

In addition, in the power supply system according to Embodiment 9, the controller may cause at least one of the electric power system and the power generation system to charge the power storage unit before a scheduled stop time of the power generation of the power generation system.

Since the power supply system 100 according to Embodiment 9 is the same in basic configuration as the power supply system 100 according to Embodiment 1, an explanation of the configuration thereof is omitted.

Figure 18A:
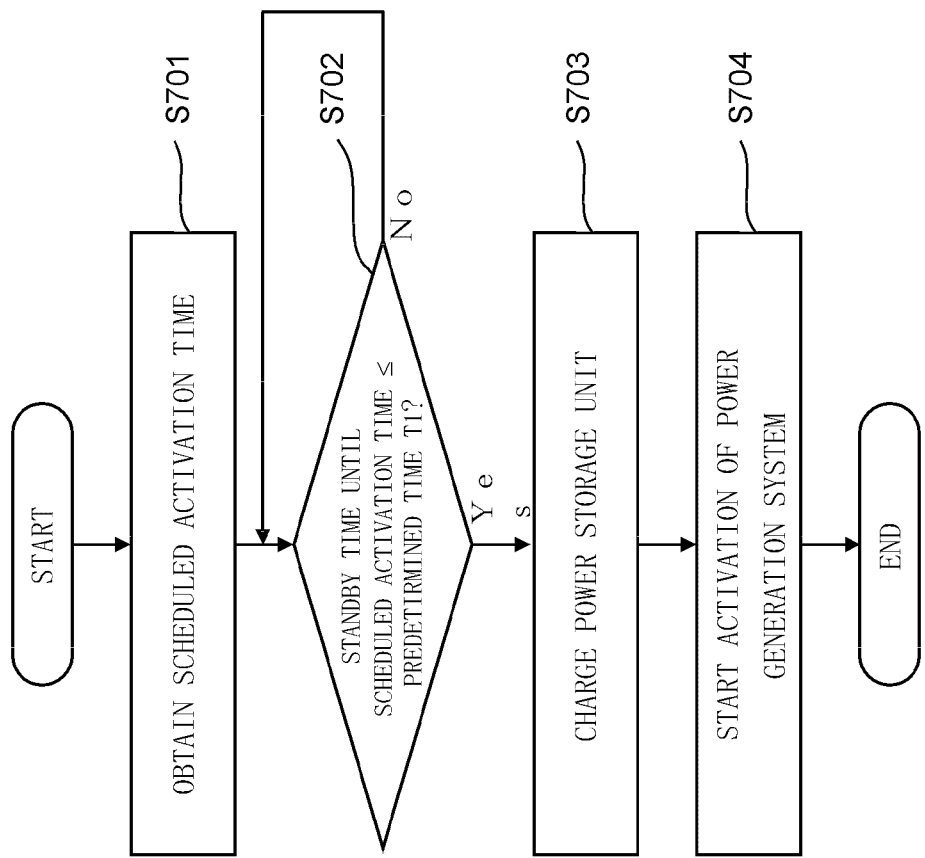
FIG. 18A is one example of a flow chart schematically showing the operation executed when activating the power generation system in the power supply system according to Embodiment 9.

FIG. 18A is one example of a flow chart schematically showing the operation executed when activating the power generation system in the power supply system according to Embodiment 9.

First, the power generation system 101 is not being activated, and the supply of the electric power to the external electric power load 105 is being executed by the electric power system 104. In this case, as shown in FIG. 18A, the controller 110 obtains the scheduled activation time (Step S701). Specifically, the controller 110 obtains scheduled activation time information from the control unit 103.

Next, the controller 110 calculates a standby time from the scheduled activation time obtained in Step S701 and a current time, the standby time being a time until the scheduled activation time, and determines whether or not the standby time is equal to or shorter than a predetermined time T1 (Step S702). Here, the predetermined time T1 may be set arbitrarily. However, it is preferable to set the predetermined time T1 such that the charging control operation of the power storage unit is executed before the determination as to whether or not the supply of the electric power from the power storage unit is necessary, the determination being is executed in each of Embodiments 1 to 5 (including Modification Examples).

When the standby time is longer than the predetermined time T1 (No in Step S702), the controller 110 returns to Step S701 and repeats Steps S701 and S702 until the standby time becomes equal to or shorter than the predetermined time T1. In contrast, when the standby time becomes equal to or shorter than the predetermined time T1 (Yes in Step S702), the controller 110 proceeds to Step S703.

In Step S703, the controller 110 outputs to the electric power control unit 108 of the power storage unit 107 the control signal for charging the power storage unit 107. With this, the electric power control unit 108 supplies the electric power from the electric power system 104 to the cells of the storage battery constituting the power storage unit 107 or the assembled batteries of the storage battery constituting the power storage unit 107. Thus, the power storage unit 107 is charged. The control operation shown by the flow of Steps S701 to S703 is applicable to the power supply system 100 (the controller 110 of the power supply system 100) of any of Embodiments 1 to 5 (including Modification Examples).

As above, in the power supply system 100 (the controller 110 of the power supply system 100) according to Embodiment 9, since the power storage unit 107 is charged before starting the activation of the power generation system 101, the performance of supplying the electric power by the power storage unit 107 improves. Therefore, the activation performance of the power supply system 100 (the controller 110 of the power supply system 100) according to Embodiment 9 improves more than that of the power supply system 100 (the controller 110 of the power supply system 100) according to Embodiment 1.

Next, when the scheduled activation time gets closer, the controller 110 executes the determination as to whether or not the output of the electric power from the power storage unit 107 is necessary and the determination as to whether the activation start of the power generation system 101 is permitted or denied, the determinations being executed in any of Embodiments 1 to 5 (including Modification Examples). When the activation is permitted, the controller 110 starts the activation of the power generation system 101 (Step S704).

Next, the operation executed when stopping the power generation of the power supply system 100 according to Embodiment 9 will be explained in reference to FIG. 18B.

Figure 18B:
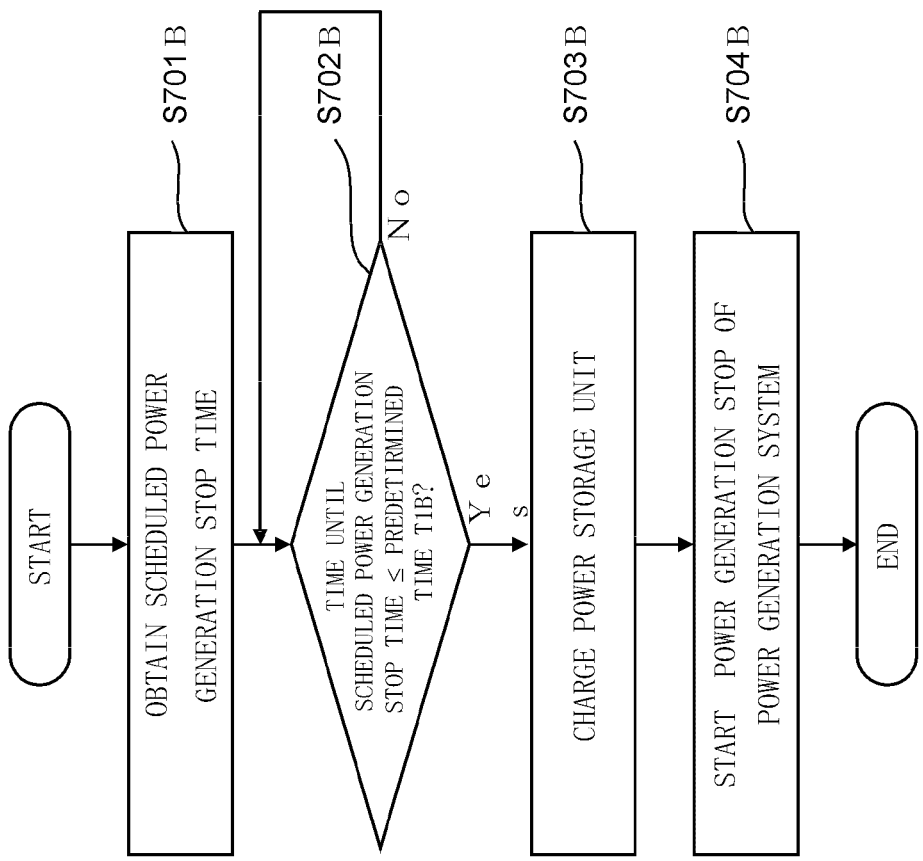
FIG. 18B is one example of a flow chart schematically showing the operation executed when stopping the power generation of the power generation system in the power supply system according to Embodiment 9.

FIG. 18B is one example of a flow chart schematically showing the operation executed when stopping the power generation of the power generation system in the power supply system according to Embodiment 9.

First, the power generation system 101 is executing the power generating operation. In this case, as shown in FIG. 18B, the controller 110 obtains a scheduled power generation stop time of the power generation system 101 (Step S701B). Specifically, the controller 110 obtains scheduled power generation stop time information from the control unit 103.

Next, the controller 110 calculates a time from the scheduled power generation stop time obtained in Step S701B and a current time, the time being a time until the scheduled power generation stop time, and determines whether or not the calculated time (hereinafter referred to as a "calculation time") is equal to or shorter than a predetermined time T1B (Step S702B). Here, the predetermined time T1B may be set arbitrarily. It is preferable to set the predetermined time T1B such that the charging control operation of the power storage unit 107 is executed before the determination as to whether or not the supply of the electric power from the power storage unit 107 is necessary, the determination being executed in each of Embodiments 1 to 5 (including Modification Examples).

When the calculation time is longer than the predetermined time T1 (No in Step S702B), the controller 110 returns to Step S701 and repeats Steps S701B and S702B until the calculation time becomes equal to or shorter than the predetermined time T1B. In contrast, when the calculation time becomes equal to or shorter than the predetermined time T1B (Yes in Step S702B), the controller 110 proceeds to Step S703B.

In Step S703B, the controller 110 outputs to the electric power control unit 108 of the power storage unit 107 the control signal for charging the power storage unit 107. With this, the electric power control unit 108 supplies the electric power from at least one of the electric power system 104 and the power generation system 101 to the cells of the storage battery constituting the power storage unit 107 or the assembled batteries of the storage battery constituting the power storage unit 107. Thus, the power storage unit 107 is charged. The control operation shown by the flow of Steps S701B to S703B is applicable to the power supply system 100 (the controller 110 of the power supply system 100) of any of Embodiments 1 to 5 (including Modification Examples).

Next, when the scheduled power generation stop time of the power generation system 101 gets closer, the controller 110 executes the determination as to whether or not the output of the electric power from the power storage unit 107 is necessary and the determination as to whether the start of the power generation stop of the power generation system 101 is permitted or denied, the determinations being executed in any of Embodiments 1 to 5 (including Modification Examples). When the power generation stop is permitted, the controller 110 starts the power generation stop of the power generation system 101 (Step S704B).

As above, in the power supply system 100 (the controller 110 of the power supply system 100) according to Embodiment 9, since the power storage unit 107 is charged before starting the power generation stop of the power generation system 101, the performance of supplying the electric power by the power storage unit 107 improves. Therefore, the stop performance of the power supply system 100 (the controller 110 of the power supply system 100) according to Embodiment 9 improves more than those of the conventional power generation systems.

In the power supply system 100 according to Embodiment 9, the controller 110 may be configured to execute at least one of the control operation of the power storage unit 107 when activating the power generation system 101 and the control operation of the power storage unit 107 when stopping the power generation of the power generation system 101. To be specific, the controller 110 may be configured to execute only one of the control operation of the power storage unit 107 when activating the power generation system 101 and the control operation of the power storage unit 107 when stopping the power generation of the power generation system 101 or may be configured to execute both the control operation of the power storage unit 107 when activating the power generation system 101 and the control operation of the power storage unit 107 when stopping the power generation of the power generation system 101.

Modification Example

The power supply system according to Modification Example is configured such that in the charging control operation explained in Embodiment 9, the controller determines based on the power storage amount of the power storage unit whether charging the power storage unit is permitted or denied.

Since the power supply system 100 according to Modification Example is the same in basic configuration as the power supply system 100 according to Embodiment 1, an explanation of the configuration thereof is omitted.

Figure 19A:
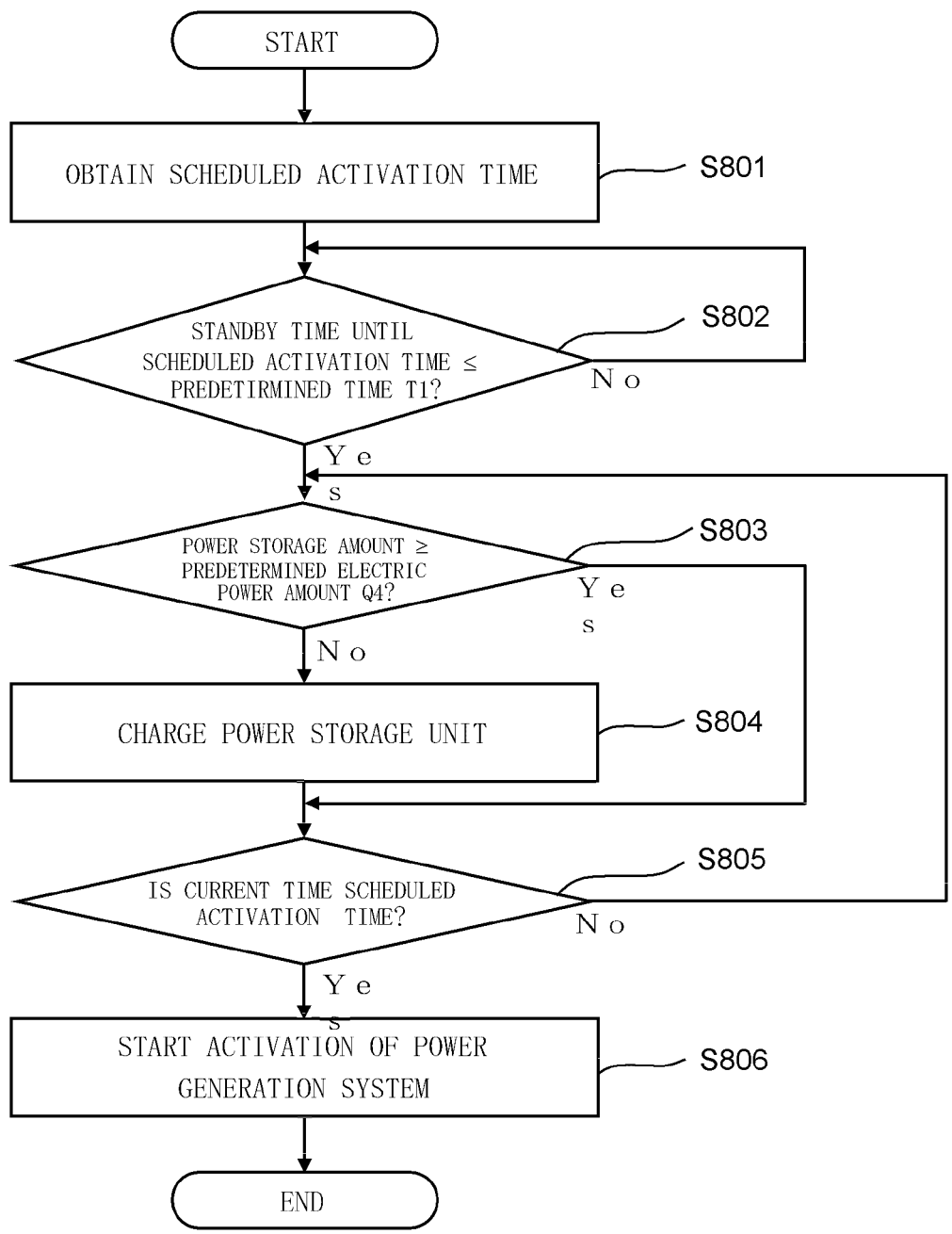
FIG. 19A is one example of a flow chart schematically showing the operation executed when activating the power generation system in the power supply system according to Modification Example.

FIG. 19A is one example of a flow chart schematically showing the operation executed when activating the power generation system in the power supply system according to the present modification example.

As shown in FIG. 19A, as with the power supply system 100 according to Embodiment 9, in the power supply system 100 according to the present modification example, the controller 110 obtains the scheduled activation time (Step S801) and determines whether or not the standby time is equal to or shorter than the predetermined time T1 (Step S802). Then, when the standby time is equal to or shorter than the predetermined time T1 (Yes in Step S802), the controller 110 proceeds to Step S803.

In Step S803, the controller 110 determines whether or not the power storage amount of the power storage unit 107 is equal to or larger than a predetermined electric power amount Q4. When the power storage amount of the power storage unit 107 is equal to or larger than the predetermined electric power amount Q4 (Yes in Step S803), the controller 110 proceeds to Step S805. When the power storage amount of the power storage unit 107 is smaller than the predetermined electric power amount Q4 (No in Step S803), the controller 110 proceeds to Step S804. The predetermined electric power amount Q4 may be set arbitrarily. For example, it is preferable that the predetermined electric power amount Q4B be an electric power amount necessary for the activation of the power generation system 101. The electric power amount necessary for the activation of the power generation system 101 may be, for example, a cumulative power consumption amount consumed by the internal electric power load in a period from the start of the activation operation to the completion thereof.

In Step S804, the controller 110 outputs to the electric power control unit 108 of the power storage unit 107 the control signal for charging the power storage unit 107. With this, the electric power control unit 108 supplies the electric power from the electric power system 104 to the cells of the storage battery constituting the power storage unit 107 or the assembled batteries of the storage battery constituting the power storage unit 107. Thus, the power storage unit 107 is charged. Then, the controller 110 proceeds to Step S805.

In Step S805, the controller 110 determines whether or not the current time is the scheduled activation time. When the current time is not the scheduled activation time (No in Step S805), the controller 110 repeats Steps S803 to S805 until the current time becomes the scheduled activation time and operates such that the power storage amount of the power storage unit 107 becomes equal to or larger than the predetermined electric power amount Q4B by the scheduled activation time. In contrast, when the current time reaches the scheduled activation time (Yes in Step S805), the controller 110 executes the determination as to whether or not the output of the electric power from the power storage unit 107 is necessary and the determination as to whether the activation start of the power generation system 101 is permitted or denied, the determinations being executed in any of Embodiments 1 to 5 (including Modification Examples). When the activation is permitted, the controller 110 proceeds to Step S806.

Then, in Step S806, the controller 110 starts the activation of the power generation system 101.

The power supply system 100 (the controller 110 of the power supply system 100) of the present modification example configured as above has the same operational advantages as the power supply system 100 (the controller 110 of the power supply system 100) according to Embodiment 9. Moreover, the power supply system 100 (the controller 110 of the power supply system 100) of Modification Example controls the charging of the power storage unit 107 in a period until the scheduled activation time based on the power storage amount of the power storage unit 107. Therefore, as compared to the power supply system 100 (the controller 110 of the power supply system 100) according to Embodiment 9, the power storage unit 107 is prevented from being charged beyond necessity or the power storage unit 107 is prevented from being charged inadequately.

Next, the operation executed when stopping the power generation of the power supply system 100 of Modification Example 1 will be explained in reference to FIG. 19B.

Figure 19B:
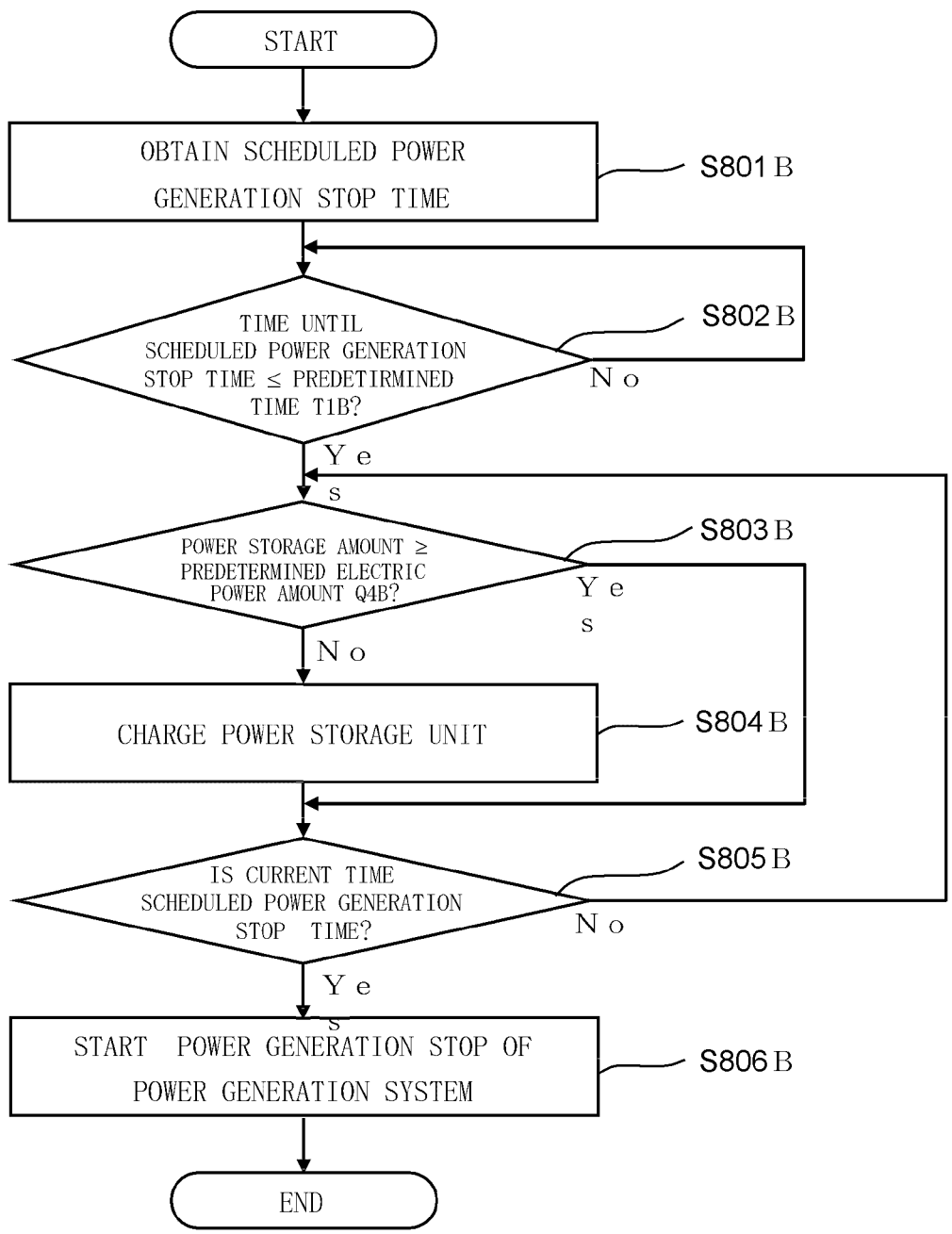
FIG. 19B is one example of a flow chart schematically showing the operation executed when stopping the power generation of the power generation system in the power supply system of Modification Example.

FIG. 19B is one example of a flow chart schematically showing the operation executed when stopping the power generation of the power generation system in the power supply system of the present modification example.

As shown in FIG. 19B, as with the power supply system 100 according to Embodiment 9, in the power supply system 100 according to the present modification example, the controller 110 obtains the scheduled power generation stop time (Step S801B), calculates a time from the scheduled power generation stop time obtained in Step S801B and the current time, the time being a time until the scheduled power generation stop time, and determines whether or not the calculated time (hereinafter referred to as a "calculation time") is equal to or shorter than the predetermined time T1B (Step S802B). When the calculation time becomes equal to or shorter than the predetermined time T1B (Yes in Step S802B), the controller 110 proceeds to Step S803B.

In Step S803B, the controller 110 determines whether or not the power storage amount of the power storage unit 107 is equal to or larger than a predetermined electric power amount Q4B. When the power storage amount of the power storage unit 107 is equal to or larger than the predetermined electric power amount Q4B (Yes in Step S803B), the controller 110 proceeds to Step S805B. When the power storage amount of the power storage unit 107 is smaller than the predetermined electric power amount Q4B (No in Step S803B), the controller 110 proceeds to Step S804B.

The predetermined electric power amount Q4B may be set arbitrarily. For example, it is preferable that the predetermined electric power amount Q4B be an electric power amount necessary for the operation executed when stopping the power generation of the power generation system 101. The electric power amount necessary for the operation executed when stopping the power generation may be, for example, a cumulative power consumption amount consumed by the internal electric power load in a period from the start of the processing operation executed after the power generation stop to the completion thereof.

In Step S804B, the controller 110 outputs to the electric power control unit 108 of the power storage unit 107 the control signal for charging the power storage unit 107. With this, the electric power control unit 108 supplies the electric power from at least one of the electric power system 104 and the power generation system 101 to the cells of the storage battery constituting the power storage unit 107 or the assembled batteries of the storage battery constituting the power storage unit 107. Thus, the power storage unit 107 is charged. Then, the controller 110 proceeds to Step S805B.

In Step S805B, the controller 110 determines whether or not the current time is the scheduled power generation stop time. When the current time is not the scheduled power generation stop time (No in Step S805B), the controller 110 repeats Steps S803B to S805B until the current time becomes the scheduled power generation stop time and operates such that the power storage amount of the power storage unit 107 becomes equal to or larger than the predetermined electric power amount Q4B by the scheduled power generation stop time. In contrast, when the current time becomes the scheduled power generation stop time (Yes in Step S805B), the controller 110 executes the determination as to whether or not the output of the electric power from the power storage unit 107 is necessary and the determination as to whether or not the start of the power generation stop of the power generation system 101 is permitted or denied, the determinations being executed in any of Embodiments 1 to 5 (including Modification Examples). When the power generation stop is permitted, the controller 110 proceeds to Step S806B.

Then, in Step S806B, the controller 110 starts the power generation stop of the power generation system 101 and then executes the processing operation executed after the power generation stop.

As above, the power supply system 100 (the controller 110 of the power supply system 100) of the present modification example controls the charging of the power storage unit 107 in a period until the scheduled power generation stop time based on the power storage amount of the power storage unit 107. Therefore, as compared to the power supply system 100 (the controller 110 of the power supply system 100) according to Embodiment 9, the power storage unit 107 is prevented from being charged beyond necessity or the power storage unit 107 is prevented from being charged inadequately.

In the power supply system 100 of Modification Example, the controller 110 may be configured to execute at least one of the control operation of the power storage unit 107 when activating the power generation system 101 and the control operation of the power storage unit 107 when stopping the power generation of the power generation system 101. To be specific, the controller 110 may be configured to execute only one of the control operation of the power storage unit 107 when activating the power generation system 101 and the control operation of the power storage unit 107 when stopping the power generation of the power generation system 101 or may be configured to execute both the control operation of the power storage unit 107 when activating the power generation system 101 and the control operation of the power storage unit 107 when stopping the power generation of the power generation system 101.

Embodiment 10

Here, the power supply system 100 according to each of Embodiments 1 to 9 (including Modification Examples) is configured such that in the case of outputting the electric power from the power storage unit 107 when activating the power generation system 101 and/or stopping the power generation of the power generation system 101, the electric power is supplied to both the internal electric power load and the external electric power load.

In contrast, the power supply system according to Embodiment 10 is configured such that the output electric power output from the power storage unit is supplied to at least one of the external electric power load and the internal electric power load.

Configuration of Power Supply System

Figure 20:
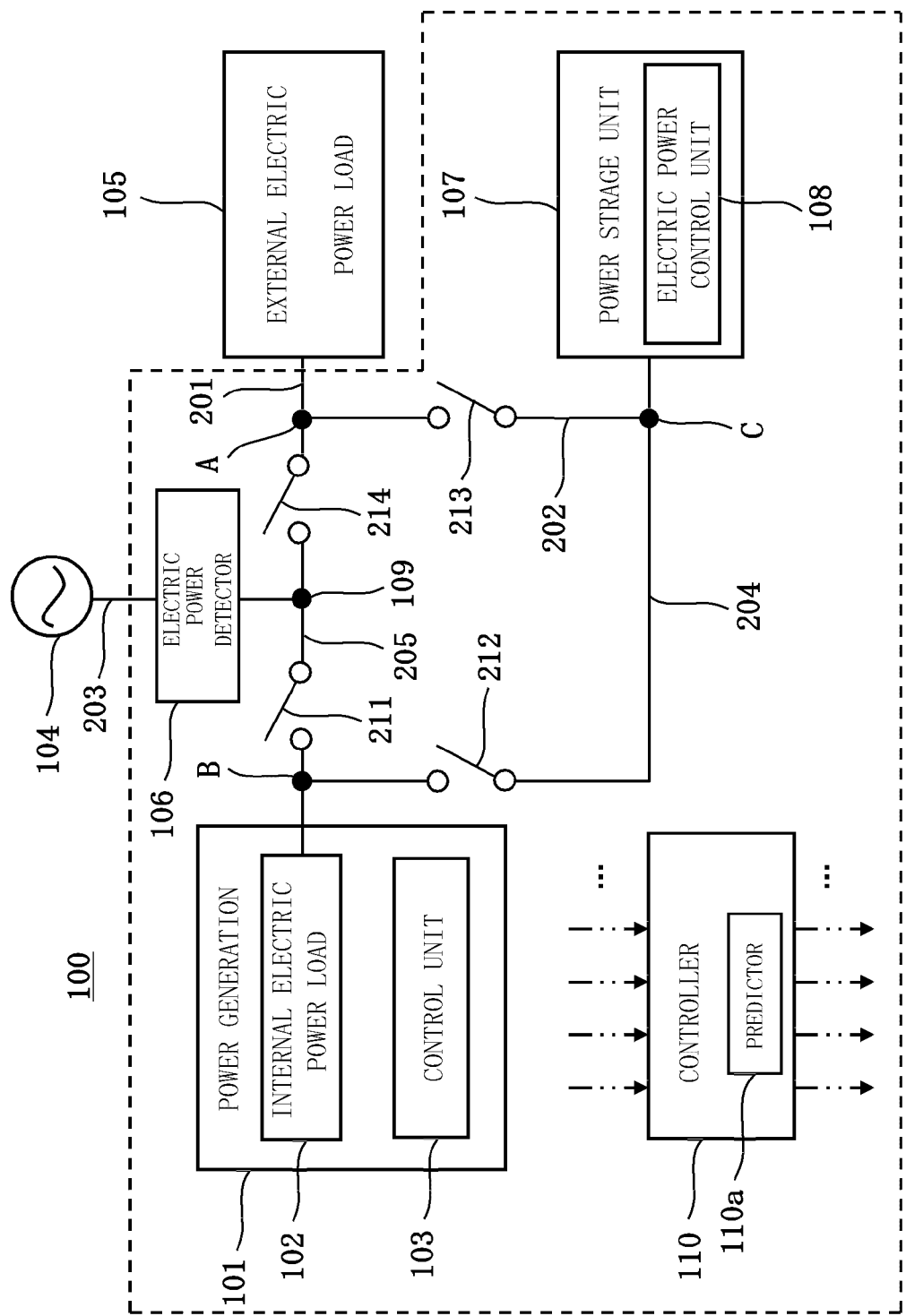
FIG. 20 is one example of a block diagram schematically showing the schematic configurations of the power supply system according to Embodiment 10 and the controller of the power supply system.

FIG. 20 is one example of a block diagram schematically showing the schematic configurations of the power supply system according to Embodiment 10 and the controller of the power supply system.

As shown in FIG. 20, the power supply system 100 according to Embodiment 10 is the same in basic configuration as the power supply system 100 according to Embodiment 1 but is configured such that the output electric power output from the power storage unit 107 is supplied to at least one of the external electric power load 105 and the internal electric power load 102 of the power generation system 101.

Specifically, a wire 202 is provided, which electrically connects the power storage unit 107 and an electric path (wire 201) at a connection point A, the electric path (wire 201) extending between the interconnection point 109 and the external electric power load 105. Moreover, a wire 204 is provided, which electrically connects the power storage unit 107 and an electric path (wire 205) at a connection point B, the electric path (wire 205) extending between the interconnection point 109 and the internal electric power load 102.

Here, an electric relay (relay) 213 is provided on a portion of the wire 202. An electric relay 212 is provided on the wire 204. An electric relay 214 is provided on the electric path (wire 201) extending between the interconnection point 109 and the connection point A. An electric relay 211 is provided on the electric path (wire 205) extending between the interconnection point 109 and the connection point B.

With this, the controller 110 can control the electric relays 211 to 214 to control the supply of the electric power from the power storage unit 107 to at least one of the internal electric power load 102 and the external electric power load 105. In addition, the controller 110 can control the electric relays 211 to 214 to control the supply of the electric power from the electric power system 104 to at least one of the internal electric power load 102 and the external electric power load 105. Specifically, the controller 110 controls the electric relays 211 to 214 as below.

(A) a Case where Electric Power is Supplied from Electric Power System 104 to External Electric Power Load 105 and Electric Power is Supplied from Power Storage Unit 107 to Internal Electric Power Load 102

The controller 110 closes the electric relays 212 and 214 and opens the electric relays 211 and 213. With this, the electric power is supplied from the electric power system 104 through the wires 203 and 201 to the external electric power load 105, and the electric power is supplied from the power storage unit 107 through the wires 204 and 201 to the internal electric power load 102.

(B) a Case where Electric Power is Supplied from Electric Power System 104 to Internal Electric Power Load 102 and Electric Power is Supplied from Power Storage Unit 107 to External Electric Power Load 105

The controller 110 closes the electric relays 211 and 213 and opens the electric relays 212 and 214. With this, the electric power is supplied from the electric power system 104 through the wires 203 and 201 to the internal electric power load 102, and the electric power is supplied from the power storage unit 107 through the wires 202 and 201 to the external electric power load 105.

(C) a Case where Each of Electric Power System 104 and Power Storage Unit 107 Supplies Electric Power to Both Internal Electric Power Load 102 and External Electric Power Load 105

The controller 110 closes the electric relays 211, 212, and 214 and opens the electric relay 213. With this, the electric power can be supplied from the electric power system 104 through the wires 203 and 201 to both the internal electric power load 102 and the external electric power load 105. In addition, the electric power can be supplied from the power storage unit 107 through the wires 204 and 201 to both the internal electric power load 102 and the external electric power load 105. The controller 110 may close the electric relays 211, 213, and 214 and open the electric relay 212 or may close the electric relays 211, 212, 213, and 214.

The power supply system 100 (the controller 110 of the power supply system 100) according to Embodiment 10 configured as above executes the same control operations as the power supply system 100 (the controller 110 of the power supply system 100) according to each of Embodiments 1 to 9 (including Modification Examples). With this, the power supply system 100 (the controller 110 of the power supply system 100) according to Embodiment 10 has the same operational advantages as the power supply system 100 (the controller 110 of the power supply system 100) according to each of Embodiments 1 to 9 (including Modification Examples).

In Embodiment 10, the supply of the electric power from the power storage unit 107 is controlled by using the electric relays 211 to 214. However, the present embodiment is not limited to this. Embodiment 10 may have any configuration as long as the electric power from the power storage unit 107 is supplied to at least one of the external electric power load 105 and the internal electric power load 102.

Here, in the power supply system 100 according to each of Embodiments 1 to 10 (including Modification Examples), the electric power detector 106 is provided between the electric power system 104 and the interconnection point 109. However, the electric power detector 106 may be provided between the interconnection point 109 and the external electric power load 105. In this case, the electric power detector 106 detects the power consumption of the external electric power load 105. Therefore, the sum of the power consumption of the power generation system 101 (the internal electric power load 102) and the power consumption of the external electric power load 105 becomes equal to the sum of a detected value of the electric power detector 106 and a detected value of an electric power detector (not shown) configured to detect the power consumption of the internal electric power load 102.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention. In addition, various inventions can be made by suitable combinations of a plurality of components disclosed in the above embodiments.

INDUSTRIAL APPLICABILITY

In the power supply system according to the present invention, the controller of the power supply system, the method of operating the power supply system, and the method of controlling the power supply system, the above-described sum is prevented from exceeding the upper limit electric power supplied from the electric power system while improving at least one of the activation performance and stop performance of the power generation system more than those of the conventional power generation systems. Therefore, the power supply system according to the present invention, the controller of the power supply system, the method of operating the power supply system, and the method of controlling the power supply system are useful.

REFERENCE SIGNS LIST 1 reformer
2 CO reducer
3 electric heater
11 hydrogen generator
12 oxidizing gas supply unit
13 fuel cell
14 cooling medium tank
15 electric heater
31 fuel gas supply passage
33 cooling medium passage
100 power supply system
101 power generation system (fuel cell system)
102 internal electric power load
103 control unit
104 electric power system
105 external electric power load
106 electric power detector 107 power storage unit
108 electric power control unit
109 interconnection point
110 controller
110a predictor
111 power storage amount detector
201 wire
202 wire
203 wire
204 wire
211 electric relay
212 electric relay
213 electric relay
214 electric relay

The invention claimed is:

1. A method of controlling a power supply system by executing a control operation, the control operation comprising steps of:
predicting whether or not a sum of activation electric power to activate a power generation system and power consumption of an external electric power load exceeds upper limit electric power receivable from an outside electric power system when activating the power generation system, the upper limit electric power being electric power receivable from the outside electric power system when the outside electric power system is connected to the power supply system; and
when it is predicted that the sum exceeds the upper limit electric power, supplying electric power of a power storage unit, while electric power of the outside electric power system is supplied to at least one of the power generation system and the external electric power load, to at least one of the power generation system and the external electric power load such that the electric power supplied from the electric power system does not exceed the upper limit electric power.

2. The method according to claim 1, wherein in the control operation, whether to permit or deny activation of the power generation system is determined based on a power storage amount of the power storage unit.

3. The method according to claim 1, wherein the control operation includes a step of switching, based on a power storage amount of the power storage unit, an activation mode of the power generation system between a first activation mode which requires first activation electric power and a second activation mode which requires second activation electric power lower than the first activation electric power.

4. The method according to claim 3, wherein the electric power system is caused to charge the power storage unit in the second activation mode.

5. The method according to claim 4, wherein an activation mode of the power generation system is switched to the first activation mode when the power storage amount of the power storage unit increases by the charging.

6. The method according to claim 3, wherein the activation mode of the power generation system is switched to the first activation mode when the power consumption of the external electric power load decreases.

7. The method according to claim 1, wherein in the control operation, whether to permit or deny activation of the power generation system is determined based on the electric power which is able to be supplied from the power storage unit.

8. The method according to claim 1, wherein the control operation includes a step of determining, based on the electric power which is able to be supplied from the power storage unit, whether to permit or deny continuation of an activation process of the power generation system.

9. The method according to claim 1, wherein the control operation includes a step of switching, based on the electric power which is able to be supplied from the power storage unit, an activation mode of the power generation system between a first activation mode which requires first activation electric power and a second activation mode which requires second activation electric power lower than the first activation electric power.

10. The method according to claim 1, wherein the control operation includes a step of causing the electric power system to charge the power storage unit before a scheduled activation time of the power generation system.

11. The method according to claim 1, wherein when executing the control operation, the electric power of the power storage unit is supplied to the external electric power load such that the electric power supplied from the electric power system does not exceed the upper limit electric power.

12. A method of controlling a power supply system by executing a control operation, the control operation comprising steps of:
predicting whether or not a sum of stop electric power to stop a power generation system and power consumption of an external electric power load exceeds an upper limit electric power receivable from an outside electric power system when stopping power generation of the power generation system, the upper limit electric power being electric power receivable from the outside electric power system when the outside electric power system is connected to the power supply system; and
when it is predicted that the sum exceeds the upper limit electric power, supplying electric power of a power storage unit, while electric power of the outside electric power system is supplied to at least one of the power generation system and the external electric power load, to at least one of the power generation system and the external electric power load such that the electric power supplied from the electric power system does not exceed the upper limit electric power.

13. The method according to claim 12, wherein in the control operation, whether to permit or deny power generation stop of the power generation system is determined based on a power storage amount of the power storage unit.

14. The method according to claim 12, wherein the control operation includes a step of switching, based on a power storage amount of the power storage unit, a stop mode of the power generation system between a first stop mode which requires first stop electric power and a second stop mode which requires second stop electric power lower than the first stop electric power.

15. The method according to claim 14, wherein the electric power system is caused to charge the power storage unit in the second stop mode.

16. The method according to claim 15, wherein the stop mode of the power generation system is switched to the first stop mode when the power storage amount of the power storage unit increases by the charging.

17. The method according to claim 14, wherein the stop mode of the power generation system is switched to the first stop mode when the power consumption of the external electric power load decreases.

18. The method according to claim 12, wherein in the control operation, whether to permit or deny power generation stop of the power generation system is determined based on the electric power which is able to be supplied from the power storage unit.

19. The method according to claim 12, wherein the control operation includes a step of determining, based on the electric power which is able to be supplied from the power storage unit, whether to permit or deny continuation of a processing operation executed after power generation stop of the power generation system.

20. The method according to claim 12, wherein the control operation includes a step of switching, based on the electric power which is able to be supplied from the power storage unit, a stop mode of the power generation system between a first stop mode which requires first stop electric power and a second stop mode which requires second stop electric power lower than the first stop electric power.

21. The method according to claim 12, wherein the control operation includes a step of causing at least one of the electric power system and the power generation system to charge the power storage unit before a scheduled stop time of the power generation of the power generation system.

22. The method according to claim 12, wherein when executing the control operation, the electric power of the power storage unit is supplied to the external electric power load such that the electric power supplied from the electric power system does not exceed the upper limit electric power.

\* \* \* \* \*